(12) United States Patent
Beale

(10) Patent No.: US 10,011,067 B2
(45) Date of Patent: *Jul. 3, 2018

(54) PET BLOW MOULDING MACHINES

(71) Applicant: Glenn Robert Beale, Kings-Langley (AU)

(72) Inventor: Glenn Robert Beale, Kings-Langley (AU)

(73) Assignee: B & R INDUSTRIES PTY. LTD., Balmain NSW (AU)

( * ) Notice: Subject to any disclaimer, the term of this patent is extended or adjusted under 35 U.S.C. 154(b) by 766 days.

This patent is subject to a terminal disclaimer.

(21) Appl. No.: 14/461,466

(22) Filed: Aug. 18, 2014

(65) Prior Publication Data

US 2014/0353885 A1  Dec. 4, 2014

Related U.S. Application Data

(63) Continuation of application No. 12/282,082, filed as application No. PCT/AU2007/000290 on Mar. 9, 2007, now Pat. No. 8,807,986.

(30) Foreign Application Priority Data

Mar. 9, 2006 (AU) ................................ 2006901213

(51) Int. Cl.
  *B29C 49/06* (2006.01)
  *B29C 49/64* (2006.01)
  (Continued)

(52) U.S. Cl.
  CPC ...... *B29C 49/6463* (2013.01); *B29C 49/0073* (2013.01); *B29C 49/061* (2013.01); *B29C 49/08* (2013.01); *B29C 49/12* (2013.01); *B29C 49/4205* (2013.01); *B29C 49/4252* (2013.01); *B29C 49/6409* (2013.01); *B29C 49/6418* (2013.01); *B65G 17/005* (2013.01); *B29B 2911/1402* (2013.01); *B29B 2911/1404* (2013.01); *B29B 2911/14026* (2013.01); *B29B 2911/1433* (2015.05); *B29B 2911/14033* (2013.01); *B29B 2911/1444* (2013.01); *B29B 2911/14053* (2013.01);
  (Continued)

(58) Field of Classification Search
  None
  See application file for complete search history.

(56) References Cited

U.S. PATENT DOCUMENTS 4,311,246 A   1/1982  Saito et al.
4,693,375 A   9/1987  Schweers
(Continued)

FOREIGN PATENT DOCUMENTS

EP    0835736        4/1998
WO    9912715  A1   3/1999
(Continued)

*Primary Examiner* — Monica Huson
(74) *Attorney, Agent, or Firm* — Mark M. Friedman

(57) ABSTRACT

A blow molding machine for blow molding a container having an integrally formed handle; said container blow molded from a previously injection molded preform; said preform comprising a body portion and said integrally formed handle; said machine including a preform loading station at which said preform is oriented by a preform orienting apparatus.

7 Claims, 63 Drawing Sheets

(51) Int. Cl.
  *B29C 49/00*   *(2006.01)*
  *B29C 49/42*   *(2006.01)*
  *B29C 49/08*   *(2006.01)*
  *B29C 49/12*   *(2006.01)*
  *B65G 17/00*   *(2006.01)*
  *B29L 31/46*   *(2006.01)*
  *B29K 67/00*   *(2006.01)*
  *B29K 105/00*   *(2006.01)*
  *B29L 31/00*   *(2006.01)*
  *B29C 45/26*   *(2006.01)*
  *B29C 45/44*   *(2006.01)*

(52) U.S. Cl.
  CPC ............... *B29B 2911/1458* (2013.01); *B29B 2911/14066* (2013.01); *B29B 2911/1478* (2013.01); *B29B 2911/14106* (2013.01); *B29B 2911/14113* (2013.01); *B29B 2911/14133* (2013.01); *B29B 2911/14326* (2013.01); *B29B 2911/14328* (2015.05); *B29B 2911/14331* (2015.05); *B29B 2911/14332* (2015.05); *B29B 2911/14333* (2013.01); *B29B 2911/14335* (2015.05); *B29B 2911/14336* (2015.05); *B29B 2911/14337* (2015.05); *B29B 2911/14373* (2013.01); *B29B 2911/14466* (2013.01); *B29B 2911/14473* (2013.01); *B29B 2911/14513* (2013.01); *B29C 45/2612* (2013.01); *B29C 45/44* (2013.01); *B29C 49/06* (2013.01); *B29C 2049/4231* (2013.01); *B29K 2067/003* (2013.01); *B29K 2105/258* (2013.01); *B29K 2995/0053* (2013.01); *B29L 2031/463* (2013.01); *B29L 2031/712* (2013.01); *B29L 2031/7158* (2013.01)

(56) References Cited

U.S. PATENT DOCUMENTS

| | | | |
|---|---|---|---|
| 5,035,603 | A | 7/1991 | Unterlander et al. |
| 5,282,526 | A | 2/1994 | Gibbemeyer |
| 5,910,326 | A | 6/1999 | Oas et al. |
| 6,146,134 | A | 11/2000 | Kresak et al. |
| 6,428,735 | B1 | 8/2002 | Deemer et al. |
| 6,789,689 | B1 | 9/2004 | Beale |
| 6,896,943 | B1 * | 5/2005 | Beale ................. B29C 49/0073 215/398 |
| 8,807,986 | B2 * | 8/2014 | Beale ................. B29C 49/0073 264/519 |
| 2004/0009258 | A1 | 1/2004 | Romanski et al. |

FOREIGN PATENT DOCUMENTS

| | | |
|---|---|---|
| WO | 9930883 A1 | 6/1999 |
| WO | 0023254 A1 | 4/2000 |
| WO | 0238353 A2 | 5/2002 |
| WO | 2005042230 A1 | 5/2005 |

* cited by examiner

PET BLOW MOULDING MACHINES

This invention relates to a container with an integrally connected handle, preform from which the container is biaxially blown and a method of manufacture thereof and more particularly to a preform and resulting container having a handle integrally connected at at least two separate points.

BACKGROUND OF THE INVENTION

Attempts have been made to incorporate integral handles in PET and like injection blow moulded containers—for example see U.S. Pat. No. 4,629,598 to Thompson, assigned to Tri-Tech Systems International, Inc. The parison or preform from which the handled bottles of U.S. Pat. No. 4,629,598 are produced is illustrated in FIG. 1. To date, however, attempts to produce a practical, mass produced version of this arrangement have been unsuccessful. Instead, the best that appears to have been done in commercial practice is an arrangement whereby the blown containers are arranged to accept a clip on or snap on handle in a separate production step after the container itself is formed. See for example WO82/02371 and WO82/02370, both to Thompson.

Injection-stretch-blow moulding is a process in which the parison is stretched both axially and radially, resulting in biaxial orientation.

Biaxial orientation provides increased tensile strength (top load), less permeation due to tighter alignment of the molecules, and improved drop impact, clarity, and light-weighting of the container.

Not all thermoplastics can be oriented. The major thermoplastics used are polyethylene terephthalate (PET), polyacrylonitrile (PAN), polyvinyl chloride (PVC), and polypropylene (PP). PET is by far the largest volume material, followed by PVC, PP, and PAN.

The amorphous materials, e.g., PET, with a wide range of thermoplasticity are easier to stretch-blow than the partially crystalline types such as PP. Approximate melt and stretch temperatures to yield maximum container properties are:

| Material | Melt, Degrees C. | Stretch, Degrees C. |
|---|---|---|
| PET | 280 | 107 |
| PVC | 180 | 120 |
| PAN | 210 | 120 |
| PP | 240 | 160 |

There are basically two types of processes for stretch-blow moulding: 1) single-stage in which preforms are made and bottles blown on the same machine, and 2) two-stage in which preforms are made on one machine and blown later on another machine.

Single-stage equipment is capable of processing PVC, PET, and PP. Once the parison is formed (either extruded or injection moulded), it passes through conditioning stations which bring it to the proper orientation temperature. The single-stage system allows the process to proceed from raw material to finished product in one machine, but since tooling cannot be easily changed, the process is best suited for dedicated applications and low volumes.

Oriented PVC containers most commonly are made on single-stage, extrusion-type machines. The parison is extruded on either single- or double-head units. Temperature conditioning, stretching, and thread forming are done in a variety of ways depending on the design of the machine. Many of the processes presently in use are proprietary.

Many oriented PET containers are produced on single-stage machines. Preforms are first injection moulded, then transferred to a temperature conditioning station, then to the blow moulding operation where the preforms are stretch-blown into bottles, and finally to an eject station.

With the two-stage process, processing parameters for both preform manufacturing and bottle blowing can be optimized. A processor does not have to make compromises for preform design and weight, production rates, and bottle quality as he does on single-stage equipment. He can either make or buy preforms. And if he chooses to make them, he can do so in one or more locations suitable to his market. Both high-output machines and low output machines are available. Heretofor two stage extrusion-type machines generally have been used to make oriented PP bottles. In a typical process, preforms are re-extruded, cooled, cut to length, reheated, stretched while the neck finish is being trimmed, and ejected.

It is an object of the present invention to produce a practical, readily implementable injection, stretch blow moulded container made from an orientable plastics preform material incorporating a handle joined in a loop at at least two points to the preform.

SUMMARY OF THE INVENTION

In a first broad form of the invention there is provided a preform for a container comprised of orientable plastics material and arranged so that the resultant blown container will include a handle or like support structure; said preform comprising a moulded structure having a neck portion and an expandable portion below the neck, at least one loop of orientable plastics material integrally connected at least a first end to a respective first location on said preform which when the container is formed constitutes said handle.

In another broad form of the invention there is provided a method of forming a container having an integral handle; said method comprising:
 (a) forming a preform having a neck portion and an expandable portion below the neck portion, said preform having at least one loop of orientable plastics material integrally connected at least a first end to a respective first location on said preform, and
 (b) performing a blow moulding operation on said preform to expand the expandable portion to form the body of the container.

Preferably, the neck portion includes a locating ring above the expandable portion.

Preferably, said container is formed from said preform in a two stage operation.

Preferably, said at least one loop of orientable plastics material is integrally connected at said first end to said first location and at a second end at a second location on said preform.

Preferably, the handle allows at least two fingers of the adult human hand to pass therethrough.

Preferably, the loop is formed so as to have an I-shaped cross-section at least throughout that portion of the stem where it projects from the external side of said tube.

In a further broad form of the invention there is provided a parison or preform as claimed in claim 1 for an injection stretch blow moulding process, said parison formed by an injection process including two separate points of injection.

Preferably, a first point of injection permits injection of non-recycled PET or like plastics material.

Preferably, a second point of injection permits injection of PET or like plastics material incorporating at least a portion of recycled material.

Preferably, said first point of injection is for the formation of that part of the preform which will be stretched during a stretch blow moulding operation on the preform.

Preferably, said second point of injection is for the formation of those parts of said preform which will remain unexpanded or substantially unexpanded in a stretch blow moulding operation on said preform.

In still a further broad form of the invention there is provided a container manufactured from a two stage injection stretch blow moulding process, said container including a graspable handle integrally affixed at at least a first point to said container so as to form an area between the handle and the container and through which the fingers of a human hand may be passed.

Preferably, said first point of connection comprises an integral connection between the handle and the neck portion of the container and is formed in a first stage of said two stage process.

Preferably, said graspable handle is integrally affixed at said at least a first point and a second point of interconnection to said container so as to form an enclosed area between the handle and the container and through which the finger of a human hand may be passed.

Preferably, said second point of connection is located on an expandable portion of said container.

Preferably, said second point of interconnection is located on a lower neck portion of said container at a substantially non-expanding part.

Preferably, said first and second points of connection are located on a substantially non-expanding part of said container.

Preferably, the container includes an elongated substantially non-expanding neck portion to which said loop is affixed.

Preferably, the preform further includes a locating ring immediately below which is a first non-expanding region and below which is a second non-expanding region.

Preferably, the first non-expanding region is formed so as to be slightly raised or otherwise differentiated from the expandable portion of said preform.

Preferably, the second non-expanding region is not differentiated from the expandable portion of said preform.

Preferably, the loop includes a first rib integrally moulded therewith.

Preferably, said loop includes a second rib integrally moulded with and extending from said second non-expanding region.

Preferably, the preform further includes a rib connector integrally moulded with and extending from first non-expanding region and forming a continuous connection between said first rib and said second rib throughout the length of said loop.

Preferably, said second non-expanding region forms part of a temperature transition zone.

Preferably, said first non-expanding region forms part of said temperature transition zone.

Preferably, deformation of said temperature transition zone takes place during a stretch blow moulding process.

Preferably, the preform is manufactured by a two stage injection moulding process wherein material is injected at different locations in the die to form a preform adapted to be composed from more than one type of material.

Preferably, during at least one stage of said two stage process an inner wall and outer wall of said preform is formed, said inner wall adapted to be made from a different material from said outer wall.

In a further broad form of the invention, there is provided a container stretch blow moulded as described above.

In yet a further broad form of the invention there is provided a method of production as a two step process of an integral handle PET container from a preform which has a loop of orientable plastics material at least one loop of orientable plastics material integrally connected at least a first end to a respective first location on said preform; said method including the step of shielding said loop of said preform during preheating of said preform preparatory to a stretch blow moulding step.

Preferably, said at least one loop of orientable plastics material is integrally connected at said at least a first end to said first location and at a second end to a second location on said preform.

Preferably, said at least a first end and said second end are substantially supported in a mould cavity against movement during the stretch blow moulding operation.

In still another broad form of the invention there is provided a container comprised of biaxially orientable plastics material manufactured from a two stage injection stretch blow moulding process; said two stage process comprising a first stage in which a preform is manufactured and a second stage in which said preform is reheated and biaxially stretched to form said container; said container including a graspable handle integrally affixed at at least a first point of connection to said container so as to form an area between said handle and said container and through which at least two fingers of a human hand can pass.

Preferably, said graspable handle is integrally affixed at said at least a first point of interconnection and a second point of interconnection to said container so as to form an enclosed area between the handle and the container and through which the finger of a human hand may be passed.

Preferably, said first point of interconnection and said second point of connection comprises an integral interconnection between the handle and the container and is formed in said first stage of said two stage process.

Preferably, the container further includes a locating ring at a neck portion thereof.

Preferably, the container further includes a first non-expanding region immediately below said locating ring.

Preferably, the container of further includes a second non-expanding region below said first non-expanding region.

Preferably, said first non-expanding region is formed so as to be slightly raised or otherwise differentiated from that portion of said container which is fully biaxially oriented during said second stage of said two stage process.

Preferably, said second non-expanding region is not differentiated from that portion of said container which is fully biaxially oriented during said second stage of said two stage process.

Preferably, minor expansion of said second non-expanding region takes place during said second stage of said two stage process.

Preferably, said handle includes a first rib integrally moulded with and extending from said locating ring.

Preferably, said handle includes a second rib integrally moulded with and extending from said second non-expanding region.

Preferably, the container further includes a rib connector integrally moulded with and extending from said first non-expanding region and forming a continuous connection between said first rib and said second rib throughout the length of said handle.

Preferably, said second non-expanding region forms part of a temperature transition zone.

Preferably, said first non-expanding region forms part of a temperature transition zone.

Preferably, deformation of said temperature transition zone takes place during a stretch blow moulding process.

Preferably, the container is manufactured by said two stage injection moulding process and wherein material is injected at different locations during formation of said preform during said first stage of said two stage process whereby said container can be composed from more than one type of material.

Preferably, during said first stage of said two stage process an inner wall and outer wall of said preform is formed, said inner wall made from a different material from said outer wall.

Preferably, the container further includes a discontinuity region as defined in the specification.

Preferably, said discontinuity region lies in a plane which lies at an acute angle to the horizontal, said discontinuity region extending substantially throughout the circumference of said container.

Preferably, said discontinuity region at its point closest to said handle is located between a first end and a second end of said handle.

In a further broad form of the invention there is provided a preform from which the container is shown in a two stage process, said perform including more than one wall profile.

Preferably, said preform has a first wall profile closest to its neck followed by a second wall profile immediately there below and separated therefrom by a first transition zone.

Preferably, said preform further includes a third wall profile immediately below said second wall profile and separated therefrom by a second transition zone.

There is further provided an injection machine for the manufacture of a parison or preform as described above in a first stage of a two stage process.

There is further provided a stretch blow moulding machine for the manufacture of a container having an integral handle, said machine operable according to the method.

There is further provided an injection machine for the manufacture of preforms having integral handles incorporated therein; said machine including moulds having a channel which permits PET material to flow into a stem portion which constitutes a handle in a container blown from a preform produced by said injection moulding machine.

Preferably, said channel of said mould includes a return portion whereby said stem is connected integrally at two points on said preform.

In another broad form of the invention, there is provided a blow moulding machine for blow moulding a container having an integrally formed handle; said container blow moulded from a previously injection moulded preform; said preform comprising a body portion and said integrally formed handle; said machine including a preform loading station at which said preform is oriented by a preform orienting apparatus. Preferably, said machine further includes a preform loading station and a preform transporting system; said transporting system including a plurality of mandrels; each of said mandrels provide with a heat shield for at least partially covering said integrally formed handle. Preferably, said preform orienting apparatus is adapted to aligning said integrally formed, handle of a said preform, with said heat shield of said mandrel; the arrangement being such as to allow insertion of said handle into said heat shield when said preform is brought into engagement with said mandrel.

Preferably, said machine further includes apparatus for orienting said integrally formed handle of said preform for entry of said preform into a stretch blow moulding tool of said machine.

Preferably, said loading station includes an infeed rail; said infeed rail supplied with preforms from a preform supply source; an output end of said rail arranged to release individual ones of said preforms sequentially to said orienting apparatus.

Preferably, said body portion of said preform is presented to said orienting apparatus with the axis of said body portion substantially vertical.

Preferably, said orienting apparatus includes a cylindrical sleeve fixed relative to said output end of said infeed rail; said sleeve having an axis substantially vertical; said axis aligned with an axis of said body portion of a said preform when said preform is released from said infeed rail.

Preferably, said sleeve has an internal diameter adapted to allow passage through said sleeve of said body portion of said preform.

Preferably, said sleeve is provided with a slit in a wall of said sleeve; said slit having a width sufficient for passage therethrough of said integrally formed handle; said slit extending from a handle inlet opening at the upper end of said sleeve to a handle outlet opening at a lower end of said sleeve.

Preferably, said upper end of said sleeve is truncated so that at least portions of said upper edge of said sleeve are at a slope relative to said axis of said sleeve.

Preferably, said at least portions of said upper edge of said sleeve are arranged to slope from at least one high point on said upper edge to said handle inlet opening.

Preferably, said upper edge is divided into two sloping sections; each sloping section forming a sloping edge from said at least one high point to respective first and second sides of said inlet opening of said slit.

Preferably, respective said edges of said sloping sections meet said respective first side and second sides of said inlet opening in smoothly rounded corners.

Preferably, said slope of said sloping sections is sufficient to ensure said integrally formed handle of a said preform is forced by the weight of said preform to slide downwardly along a said sloping section; said preform rotating until said handle is aligned with said slit; said preform and said handle then free to fall through said sleeve and said slit.

Preferably, an indexing table is provided below said orienting apparatus; said indexing table provided with a plurality of nests spaced equally around the periphery of said table; each of said nests sequentially brought into alignment with said axis of said sleeve at successive indexes of said table.

Preferably, each of said nests, when in said alignment with said axis of said sleeve, is arranged to accept and retain a said preform falling into a nest from said orienting apparatus; said handle retained in said nest in an orientation imposed by said slit of said orienting apparatus.

Preferably, a said preform is ejected upwardly from a said nest at a suitable subsequent indexed location of said indexing table; said preform brought into engagement with one of a plurality of mandrels of a preform transportation system.

Preferably, each said preform is brought into engagement with a mandrel of said preform transportation system.

Preferably, each of said mandrels is provided with a handle protection shield; said shield partially enclosing said handle when a said preform is brought into engagement with a said mandrel.

Preferably, said mandrels are equally spaced along a recirculating conveying system; said conveying system driven incrementally in synchronisation with increments of said indexing table.

Preferably, each of said mandrels of said preform transportation system is adapted for rotation about the axis of said preform; each of said mandrels being brought into a predetermined orientation at said suitable subsequent indexed location of said indexing table such that said handle protection shield is correctly aligned to accept entry therein of a said integrally formed handle of said preform.

Preferably, length of said preform transportation system and said rotation of said mandrels is arranged so that the handle of each said preform is at said predetermined orientation when said preform is released from said mandrel.

Preferably, said mandrel and said handle of said preform are rotated into said predetermined orientation prior to said mandrel and said preform entering said blow moulding tool.

Preferably, said preforms are rotated during transportation by said preform transportation system past an array of preform heating elements.

Preferably, said handle and heat shield are nested in a cavity provided for said handle and said preform in said blow moulding tool.

Preferably, said handle and said heat shield are nested in separate cavities in said blow moulding tool.

In another broad form of the invention there is provided an apparatus for orienting a preform for stretch blow moulding a container; said preform comprising a substantially cylindrical body with an integrally attached handle; said apparatus including a sleeve provided with a slit and at least one sloping upper edge; said at least one sloping upper surface and said slit arranged so as to guide said integrally attached handle into alignment with said slit.

Preferably, said preform is dropped into said sleeve; the bore of said sleeve adapted to accept as a sliding fit said body of said preform; an underside of said handle coming into sliding contact with a said upper edge.

Preferably, slope of a said sloping upper edge is sufficient to induce rotation of said preform as said handle slides down said sloping upper edge; said rotation causing said integrally attached handle to come into said alignment with said slit.

Preferably, said slit is adapted to allow sliding passage of said handle when said handle is brought into alignment with said slit.

In another broad form of the invention, there is provided a heat shield for the protection of an integrally formed handle of a preform; said heat shield protecting said handle from excessive heat as a body portion of said preform is pre-heated prior to entry into a stretch blow moulding tool.

Preferably, said heat shield is attached to a mandrel of a preform transportation system; said heat shield adapted to at least partially enclose said handle.

Preferably, said shield comprises side portions extending substantially over opposing sides of said handle; said side portions extending from opposing edges of a spine element attached to said mandrel; said spine element conforming to upper portions of said handle.

Preferably, edges of said side portions are shaped to selectively protect interconnection points of said handle from said excessive heat; portions of said, side elements arranged to allow a sufficient gap for adequate heat penetration to a body region of said preform between said interconnection points.

In another broad form of the invention there is provide an apparatus for controlling the orientation of a mandrel of a stretch blow moulding machine; said mandrel adapted for supporting a preform comprising a body with an integrally attached handle; said apparatus adapted to lock said mandrel into an oriented state and unlock said mandrel into a freely rotating state.

Preferably, said mandrel is one of a plurality of mandrels of a preform transport system of said blow moulding machine.

Preferably, when said mandrel is in said oriented state said integrally attached handle may be inserted into a heat shield attached to said mandrel.

Preferably, when said mandrel is in said oriented state said integrally attached handle is correctly oriented for entry into a blow moulding tool of said machine.

Preferably, when said mandrel is in said freely rotating state said mandrel may be driven into rotation by a drive mechanism of said machine engaging a rotation driving sprocket of said mandrel during a preform preheating stage.

Preferably, said mandrel is provided with spring-loaded pawl; said spring-loaded pawl adapted to engage with a notch located on a boss of said rotation driving sprocket; said spring-loaded pawl activated and deactivated by a lever mechanism contacting fixed cams provided at predetermined locations along said preform transport system.

Preferably, said lever mechanism is activated to set said spring-loaded pawl into a potential locking state at a first of said predetermined locations; a rotary drive rotating said sprocket until said spring-loaded pawl engages said notch.

Preferably, said lever mechanism is activated to retract said spring-loaded pawl to return said sprocket to said freely rotating stage at a second of said predetermined locations.

In another broad form of the invention, there is provided an apparatus for controlling the orientation of an integrally formed handle of a preform during a preheating stage of a stretch blow moulding process; said, apparatus including a mandrel provided with a shield for protecting said handle from excessive heat during said preheating stage.

Preferably, said mandrel is one of a plurality of mandrels attached to a twin-strand conveyor system; each said mandrel rotatably mounted between strands of said twin-strand conveyor.

Preferably, said preform is inserted into said mandrel at a preform loading location such that said handle is located within said shield.

Preferably, said conveyor system extends between said preform loading location and a preform unloading location.

Preferably, each said mandrel is urged into rotation between said loading location and said unloading location; said rotation derived from contact between a toothed pulley of said mandrel and a rack extending between said loading location and said unloading location.

Preferably, said mandrel completes a whole number of rotations between said loading location and said unloading location such that orientation of said shield at said unloading location is substantially identical to orientation of said shield at said loading location. Preferably, orientation of said shield is maintained between the end of said rack before said unloading location and the start of said rack after said loading location; said orientation maintained by a guiding surface of said mandrel maintaining sliding contact with a fixed rail.

In another broad form of the invention there is provided a mandrel for support and selective heat shielding of a preform provided with an integral handle; said mandrel comprising a vertically oriented socket portion and a shield portion depending from said socket portion.

Preferably, said socket portion is adapted to accept insertion and retention therein of a neck portion of said preform; said shield portion adapted to accept insertion and at least partially shield said integral handle.

Preferably, said socket portion is provided with a resilient plug; said plug adapted to enter an open neck of said preform when an inverted said preform is urged upwardly to engage with said mandrel; said plug entering said open neck as a friction fit sufficient to support the weight of said preform.

In another broad form of the invention there is provided a method for controlling a preform for stretch blow moulding a container with an integrally formed handle; said preform comprising a body portion and said integrally formed handle; said preform transferred from a preform supply source to a blow moulding tool for blowing said container; said method including the steps of:
   a. passing said preform through a preform handle orienting apparatus,
   b. transferring said preform to a preform transportation system,
   c. transferring said preform from said, transportation system to said blow moulding tool.

Preferably, said method includes the further steps of:
   a. maintaining orientation of said preform handle imposed by said handle orienting apparatus during said transfer to said preform transportation system and said transfer to said blow moulding tool,
   b. rotating said preforms during transport along said transportation system past an array of preform heating elements,
   c. shielding said integrally formed handles from excessive exposure to heating from said heating elements.

Preferably, said preform handle orienting apparatus comprises a cylindrical sleeve provided with a slit along a wall of said sleeve; an internal diameter of said sleeve allowing passage through said sleeve of said body portion of said perform; width of said slit allowing passage therethrough of said integrally formed handle.

Preferably, an upper edge of said sleeve is sloped relative to an axis of said sleeve; said upper edge sloping from at least one high point to said slit.

Preferably, a said preform is presented to said orienting apparatus with an axis of said body portion substantially aligned with said axis of said sleeve.

Preferably, said slope of said upper edge is such as to ensure a said handle of a said preform is caused to slide downwardly along said slope until said preform and said handle rotate into alignment with said slit.

Preferably, transfer of said preform to said transportation system includes the steps of:
   a. receiving a preform passing through said sleeve of said orienting apparatus into a nest of an indexing table,
   b. retaining said preform in said nest with said handle retained in said orientation imposed by said orienting apparatus,
   c. ejecting said preform from a said nest so as to engage with a mandrel of said transportation system.

Preferably, each mandrel of said transportation system is provided with a preform handle protection shield; each said mandrel rotated to a position wherein said protection shield is aligned with said preform handle when said preform is ejected from a said nest.

Preferably, rotation of each said mandrel is controlled such that orientation of said handle is correctly aligned for entry into said blow moulding tool at a point where said preform is released from said transportation system.

In another broad form of the invention there is provided a method and apparatus for preheating a preform; said preform comprising a body portion and an integrally attached handle; said method including the steps of:
   a. orienting said preform so as to engage said preform with a transport system mandrel; said mandrel provided with a shield substantially covering said handle,
   b. arranging banks of heating elements into a pattern allowing for rotation of said handle and said shield,
   c. setting heat outputs of individual heating elements to deliver a required distribution of heat density to said body portion of said preform,
   d. rotating said preform during a preheating stage as said transport system carries said preform past said banks of heater elements.

BRIEF DESCRIPTION OF THE DRAWINGS

Embodiments of the present invention will now be described by way of example, with reference to the accompanying drawings, in which.

DETAILED DESCRIPTION OF PREFERRED EMBODIMENTS

First Preferred Embodiments of a Two Stage Process

Figure 1:
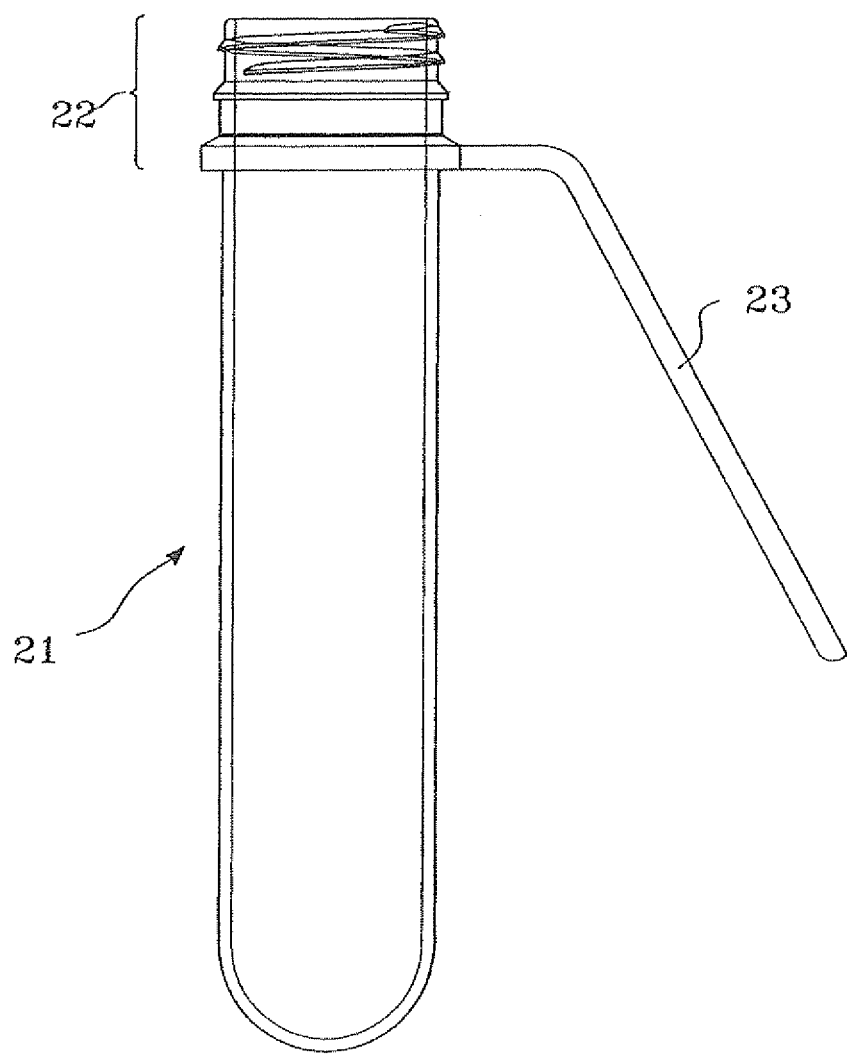
FIG. 1 is a side view of a prior art parison.

FIG. 1 illustrates a prior art preform or parison by way of introduction.

Figure 2:
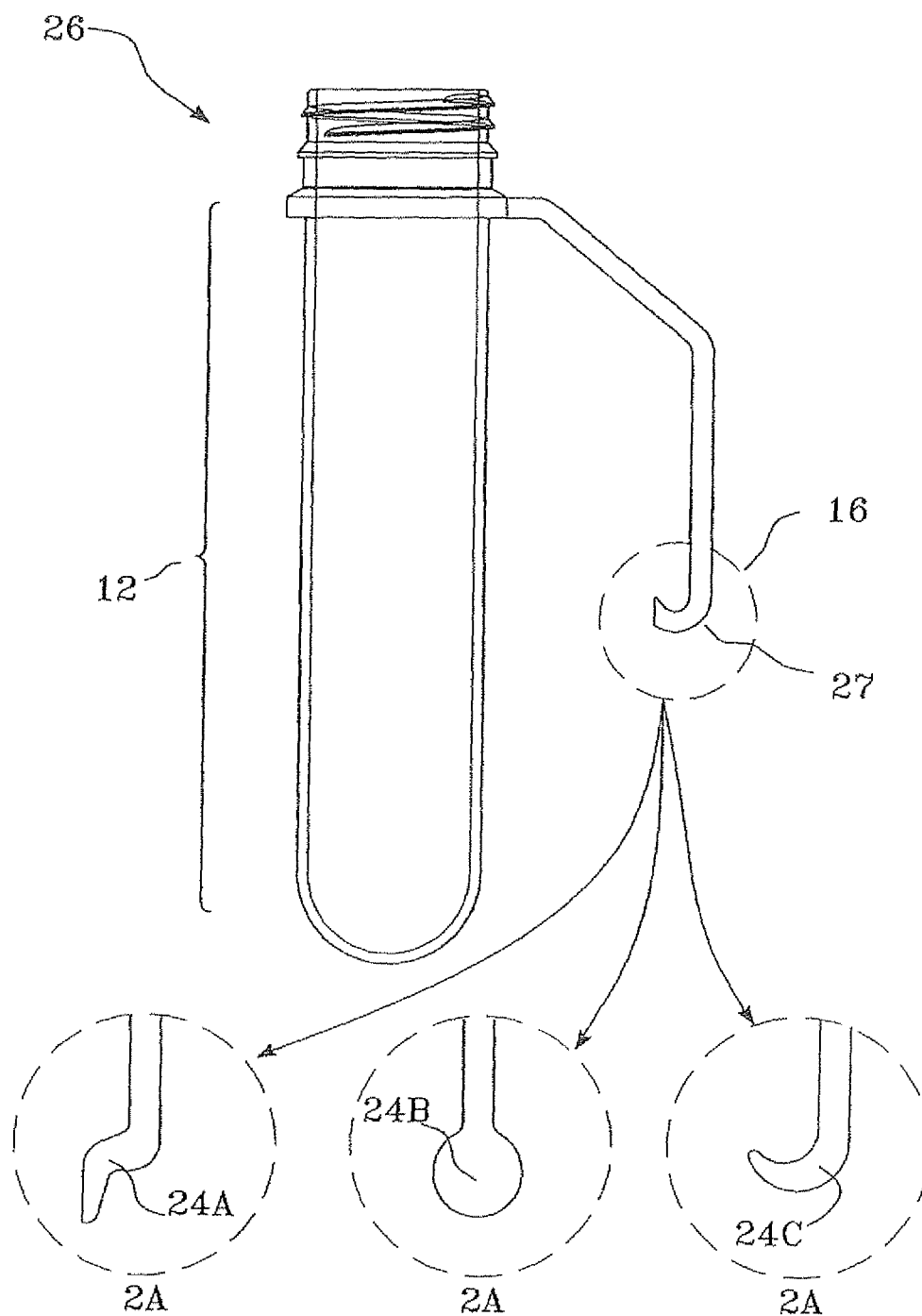
FIG. 2 is a side view of a parison incorporating features usable with embodiments of the present invention.

FIG. 2 through to 41 illustrate preform and resulting containers and methods of manufacture thereof and machinery for manufacture thereof which can be adapted according to embodiments of the invention to include multiple integral connection of the handle stem or loop to the preform and resulting container.

In this specification the term "integral connection" or "integrally connected" means a connection between the handle and the preform (and subsequently the corresponding connection on the container blown from the preform) which is made from the same material as the handle and the preform and is formed as an inherent part of an at the same time as the preform is formed.

All first embodiments of the invention are produced in a two stage process.

In particular forms, embodiments are produced in a modified two stage process as to be later described.

The two-stage process is the lowest-cost method to produce oriented PET containers. The two-stage process, which provides injection moulding of the preform and then shipping to blow moulding locations, allows companies to become preform producers and to sell to blow moulding producers. Thus companies that wish to enter the market with oriented PET containers can minimise their capital requirements. Two-stage stretch-blow moulding also can be used for production of oriented PVC containers. Preform design and its relationship to the final container remains the most critical factor. The proper stretch ratios in the axial and hoop directions are important if the container is to properly package its intended product. Exemplary ratios are as follows:

| Material | Stretch Ratios | Orientation Temp. Deg. F. |
| --- | --- | --- |
| PET | 16/1 | 195-240 |
| PVC | 7/1 | 210-240 |
| PAN | 9/1 | 220-260 |
| PP | 6/1 | 260-280 |

Figure 3:
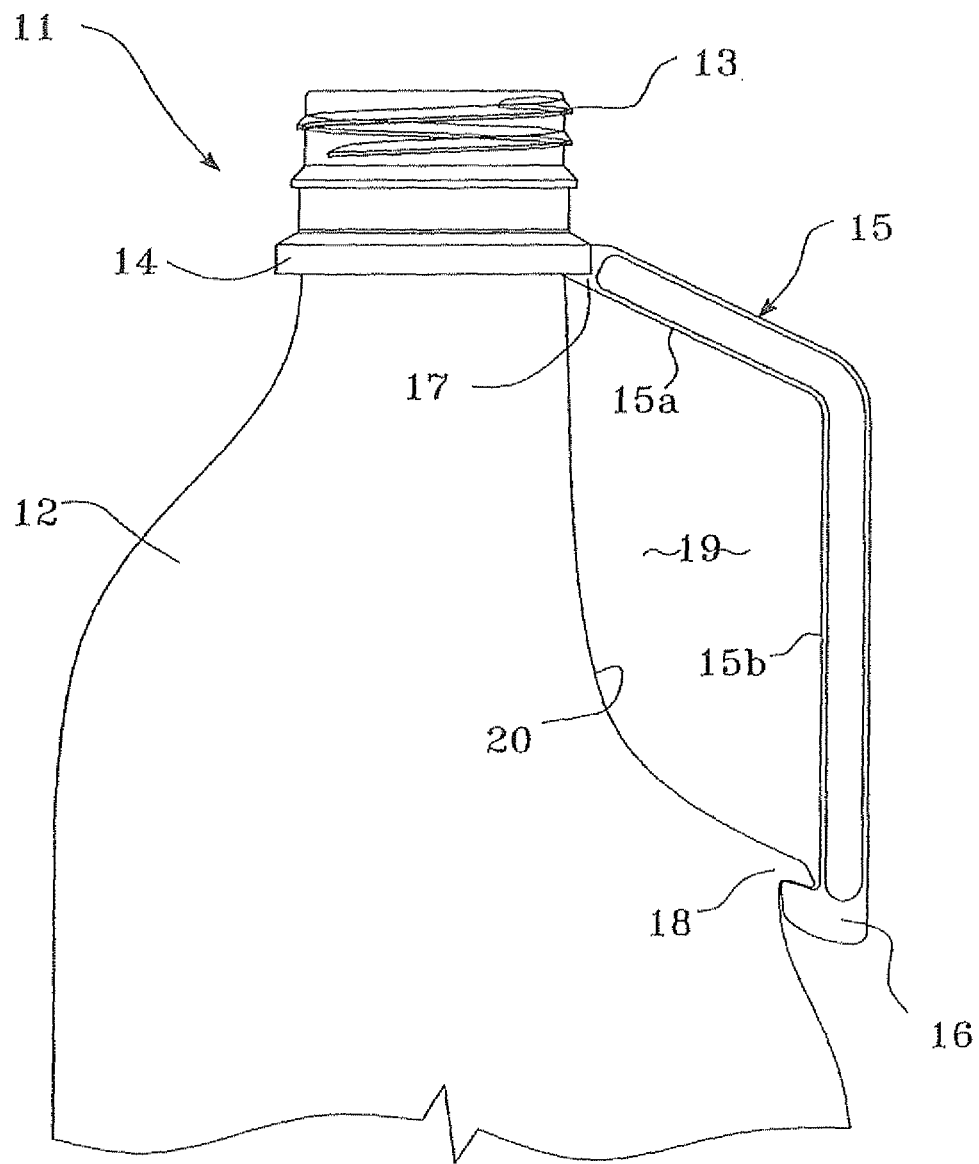
FIG. 3 is a partial side elevational view of a blow moulded PET container formed from a preform usable with one embodiment of the invention.

A container 10 usable with an embodiment of the invention is shown in FIG. 3. It includes a neck 11 and an expanded portion 12.

The neck 11 has a threaded portion 13 and a locating ring 14. Moulded integrally with the ring 14 is a stem having a first portion 15a extending outwardly from the ring 14 and a second portion 15b so inclined to the first portion 15a that it is nearly parallel to a vertical axis of the container 10. In this instance, the first portion 15a subtends an angle of slightly more than 45° to the wall 20 and the second portion subtends an angle of about 20° to the wall 20.

The particular shape of the stem 15 is selected so that when formed as a handle it may be grasped by fingers of the human hand.

The stem 15 terminates in a stem end 16 which faces generally downwardly in the general direction of closed end of the container 10.

In this instance, the stem 15 is of I-shaped cross-section to combat unwanted effects arising at or near junction 17 of stem 15 with the ring 14 following a blowing operation on the preform 10.

These unwanted effects particularly include stress effects and air inclusions resulting from non-uniform cooling through preform volumes of differing cross-section.

In this arrangement, the preform is made from PET and is prepared utilizing a heated mould.

In order to produce the container 10, the parison or preform 26 (see FIG. 2) according to an embodiment of the invention can be placed in a blow moulding machine (not shown) and blow moulded according to bi-axial orientation blow moulding techniques with the neck 11 being held in a mould in such a way as not to expand. Initially, the expandable portion of the preform below the neck can be mechanically stretched downwardly to the bottom of the mould and then the bulk of the preform can be blown outwardly by application of compressed air to the extent that a support portion 18 is formed around the stem end 16 such that an enclosed area 19 is formed between wall 20 of the container 10 and the stem 15 in the process of the formation by blow moulding of container 10.

In a particular form, the enclosed area 19 is of sufficient cross-sectional area to allow at least two fingers of a human hand to be inserted therethrough and to grasp handle 15 so as to support the container 10.

The blow moulding operation is carried out in such a way so as to provide a bottle or container having optimum strength by achieving biaxial orientation of the molecules of the preferred PET material as well as improved barrier properties to reduce oxidation.

In accordance with an embodiment of the invention, the neck 11 and handle 15 can be crystallised by over-heating those parts of the preform. The crystallisation of the handle increases its rigidity which assists orientation of the preform and permits the use of less material.

Crystallisation of the neck and handle can be carried out by running hot oil over the neck and handle, applying an open flame or by blowing hot air.

The location of the handle 15 on the ring 14 ensures that there is minimum interference to the blow moulding process applied to the remainder of the preform. Either a one stage or two stage process can be used.

DETAILED DESCRIPTION OF FURTHER EMBODIMENTS

FIG. 1 illustrates the prior art preform or parison 21 of U.S. Pat. No. 4,629,598. The concept of this prior art disclosure is to form a handle portion 23 from the locating ring of non-expandable portion 22 of the parison 21.

With reference to FIG. 2 and with reference to the detailed description of the preferred embodiment this arrangement of FIG. 1 is modified according to the present invention in a number of respects.

Insets 2A, 2B and 2C show bulbous portions 27 forming part of stem end 16 in the shape, respectively of a downwardly extending hook 24a, a bulb 24b and an upwardly extending hook 24c.

These portions have in common a shape which is adapted to engage mechanically with a blown portion of the container 10 which is adapted to envelop the bulbous portion 27.

The process by which the second stage blowing of the expandable portion 12 of parison 26 is effected so as to envelope the bulbous portion 27 of stem end 16 is a stretch blow, biaxial orientation process.

Figure 4:
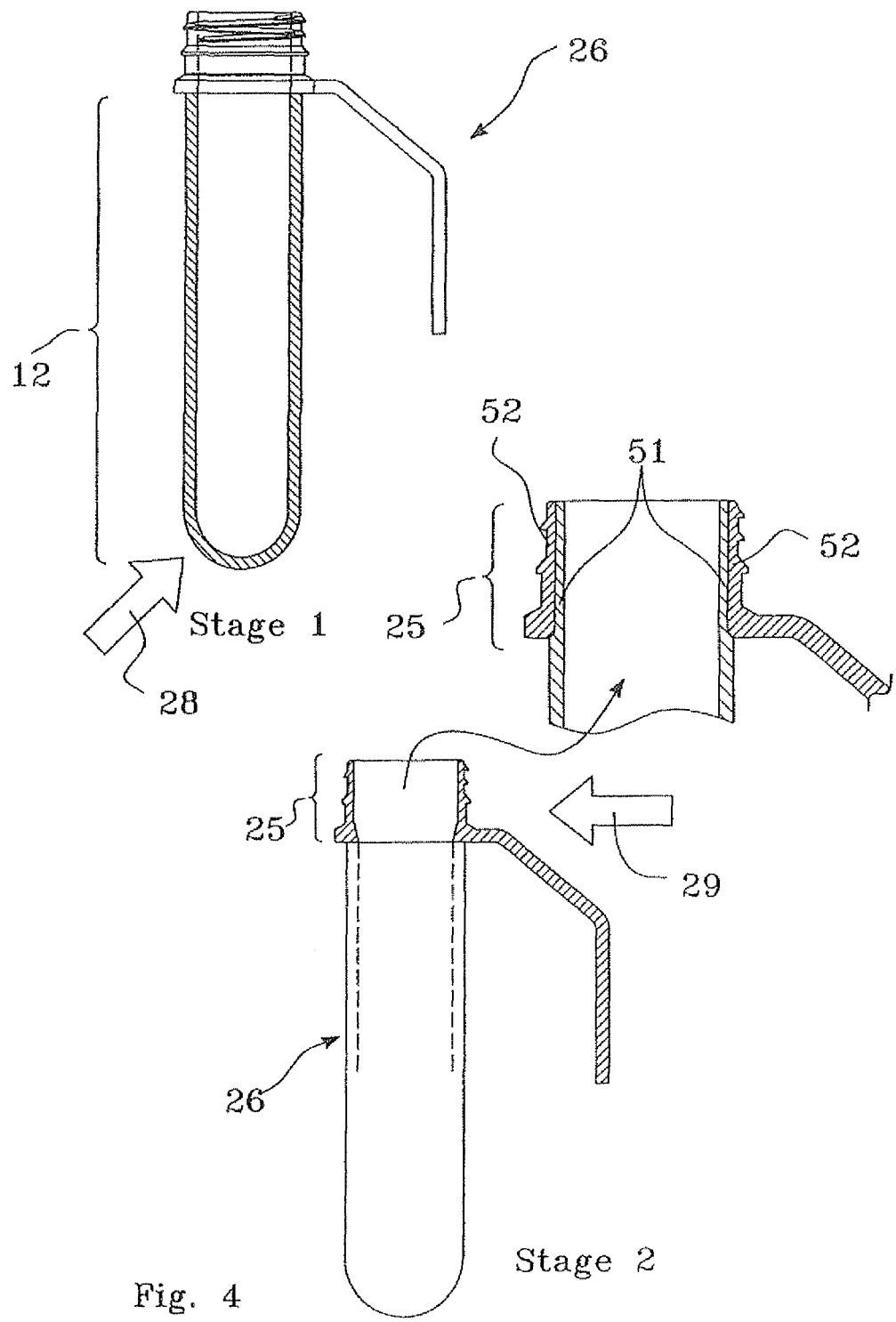
FIG. 4 illustrates the steps of formation of a parison usable with another embodiment of the invention.

With reference to FIG. 4 a particular method of manufacture of the preform or parison 26 is illustrated. It includes a two stage process for the formation of the parison by an injection moulding process. In Stage 1 a first injection mould inlet 28 permits entry of plastics material for the formation of the expanded portion 12 of the parison 26 (expanded in the blow moulding stage of container formation, with reference to FIG. 3).

In a second stage of the injection moulding process for the formation of parison 26 a second injection mould inlet 29 permits entry of plastics material for the formation of the non-expandable portion 25 of parison 26.

The two stage injection arrangement is such that different plastics materials may be injected through first injection mould inlet 28 and second injection mould inlet 29.

In a particular form the plastics material injected in first injection mould inlet 28 is non-recycled or substantially non-recycled plastics material whilst the plastics material injected into second injection mould inlet 29 is recycled or at least partially recycled plastics material.

This arrangement permits controlled use of proportions of recycled and non-recycled plastics material in order to achieve optimum economics in the construction of parison 26.

In a modification of this arrangement the Stage 2 step can include the production of two walls in the non-expandable portion 25 comprising inner wall 51 and outer wall 52. Inner wall 51 is made from virgin or non-contaminated PET material and acts as an insulation barrier with respect to wall 52 which can be made from recycled material 52. This dual wall arrangement can be produced by use of a sliding core arrangement as a modification in the die arrangement and process described with reference to FIGS. 6, 7 and 8 later in this specification.

Of course the Stage 1 and Stage 2 steps of FIG. 4 can be interchanged in order.

Figures 5A, 5B:
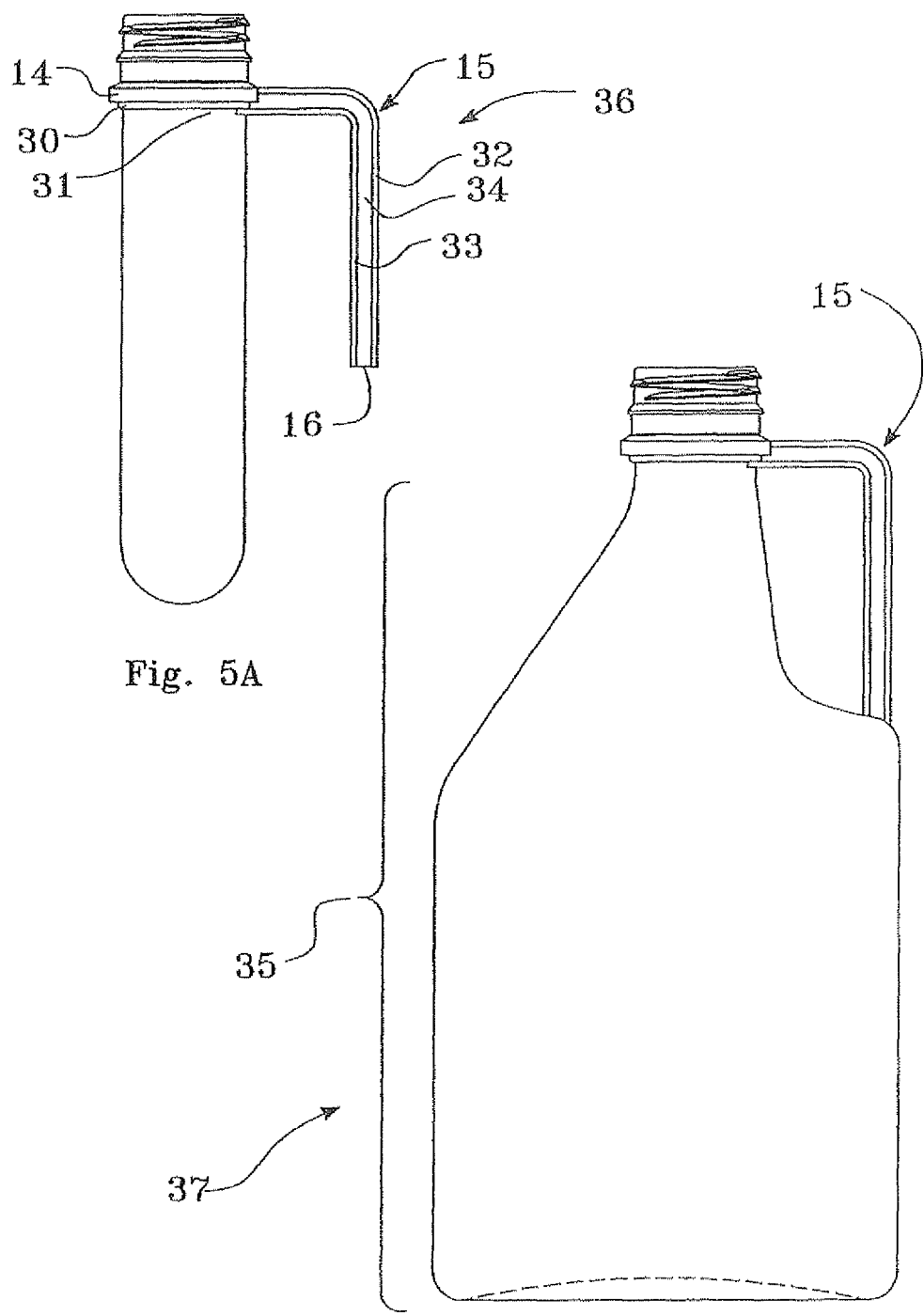
FIG. 5A is a side view of a preform according to a further embodiment of the invention.
FIG. 5B is a side view of a container formed from the preform of FIG. 5A.

A parison and resulting container according to a further arrangement are illustrated in FIGS. 5A and B respectively. Like parts are numbered as for previous embodiments.

In this arrangement the parison 21 includes a locating ring 14 immediately below which is a first non-expanding region 30 and a second non-expanding region 31. The first non-expanding region 30 may itself be formed so as to be slightly raised or otherwise differentiated from the expandable portion of parison 21. Second non-expanding region 31 may not be differentiated from the expandable portion of parison 21 but, in use, the blowing operation will be such as to ensure that the second non-expanding region 31 is not expanded in the blowing process.

In this case the stem 15 includes a first rib 32 integrally moulded with and extending from locating ring 14. The stem 15 also includes second rib 33 integrally moulded with and extending from second non-expanding region 31. Stem 15 further includes a rib connector 34 integrally moulded with and extending from first non-expanding region 30 and forming a continuous connection between first rib 32 and second rib 33 throughout the length of stem 15.

The parison 36 of FIG. 5A is then blown in the manner previously described to form the volume 35 of container 37 illustrated in FIG. 5B. The neck portion including stem 15, ring 14, first non-expanding region 30 and second non-expanding region 31 remain unexpanded whilst the expandable portion 36 of parison 36 is biaxially stretched to form the major volume 35 of container 37. The stem end 16 may include the bulbous portions according to the previously described embodiments for connection to container 37 or, either alternatively or in addition can include the application of an adhesive material whereby a chemical bond is formed between stem end 16 and the wall of container 37 by the use of a chemical intermediary.

In a modification of the arrangement of FIG. 5A and FIG. 5B first non-expanding region 30 and second non-expanding region 31 can form part of a single non-expanding region.

In yet a further modification second non-expanding region 31 can be located, in the temperature transition zone of the container and wherein minor expansion during the blow moulding step may take place.

In yet a further modification both first non-expanding region 30 and second non-expanding region 31 may be located in the temperature transition zone immediately below the locating ring 14 and, again, minor expansion of these regions may take place during blowing.

With respect to the last two variations described advantage is taken of the observation that expansion at the temperature transition zone can be limited by appropriate mould design and process control whereby unwanted distortion effects caused by the rigid interconnection of this temperature transition zone 30, 31 via second rib 33 and rib connector 34 to ring 14 (or other non-expanding portion of the neck 11) can be controlled.

Figure 6:
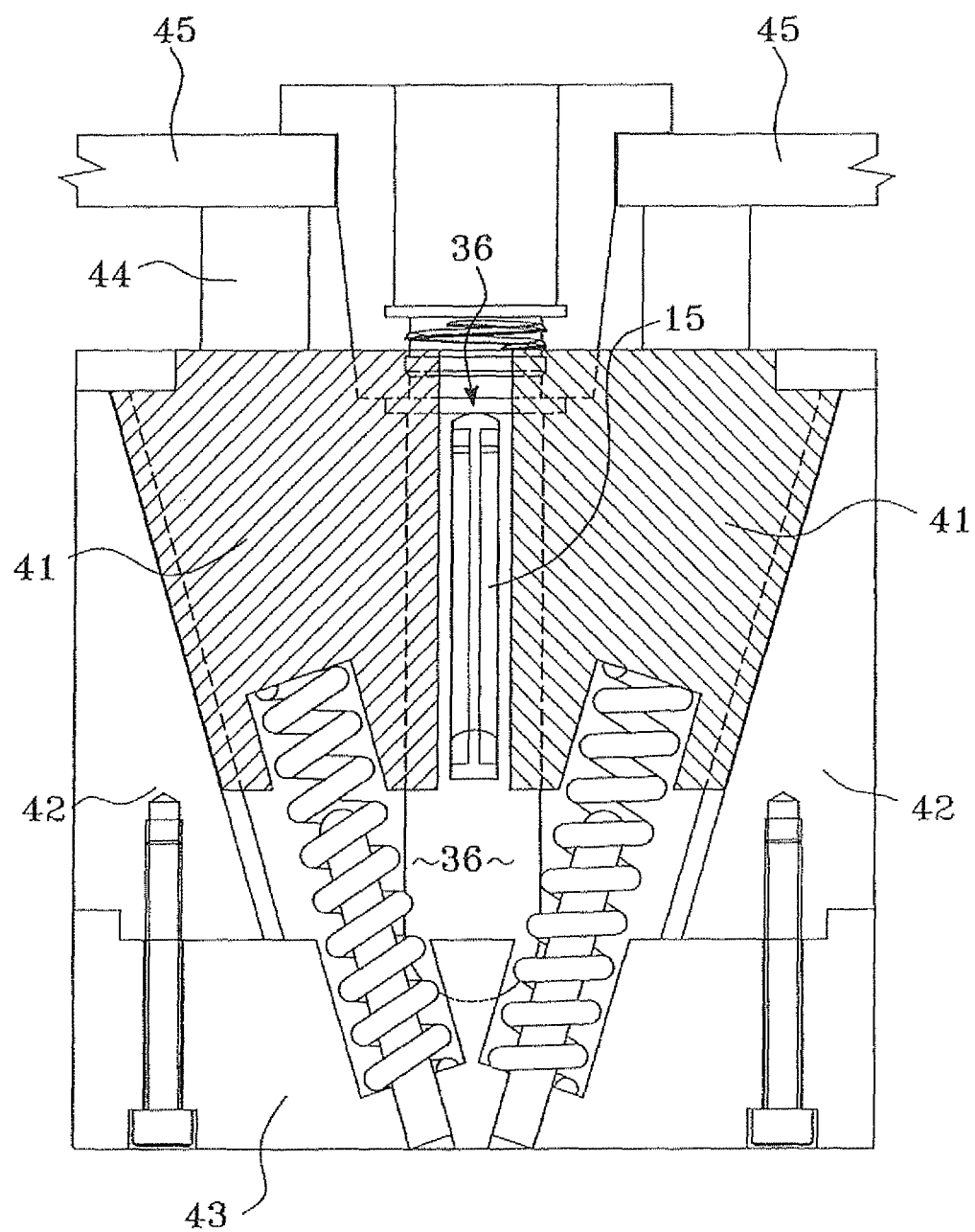
FIG. 6 is a side view of a die in open position for manufacture of a preform.
Figure 7:
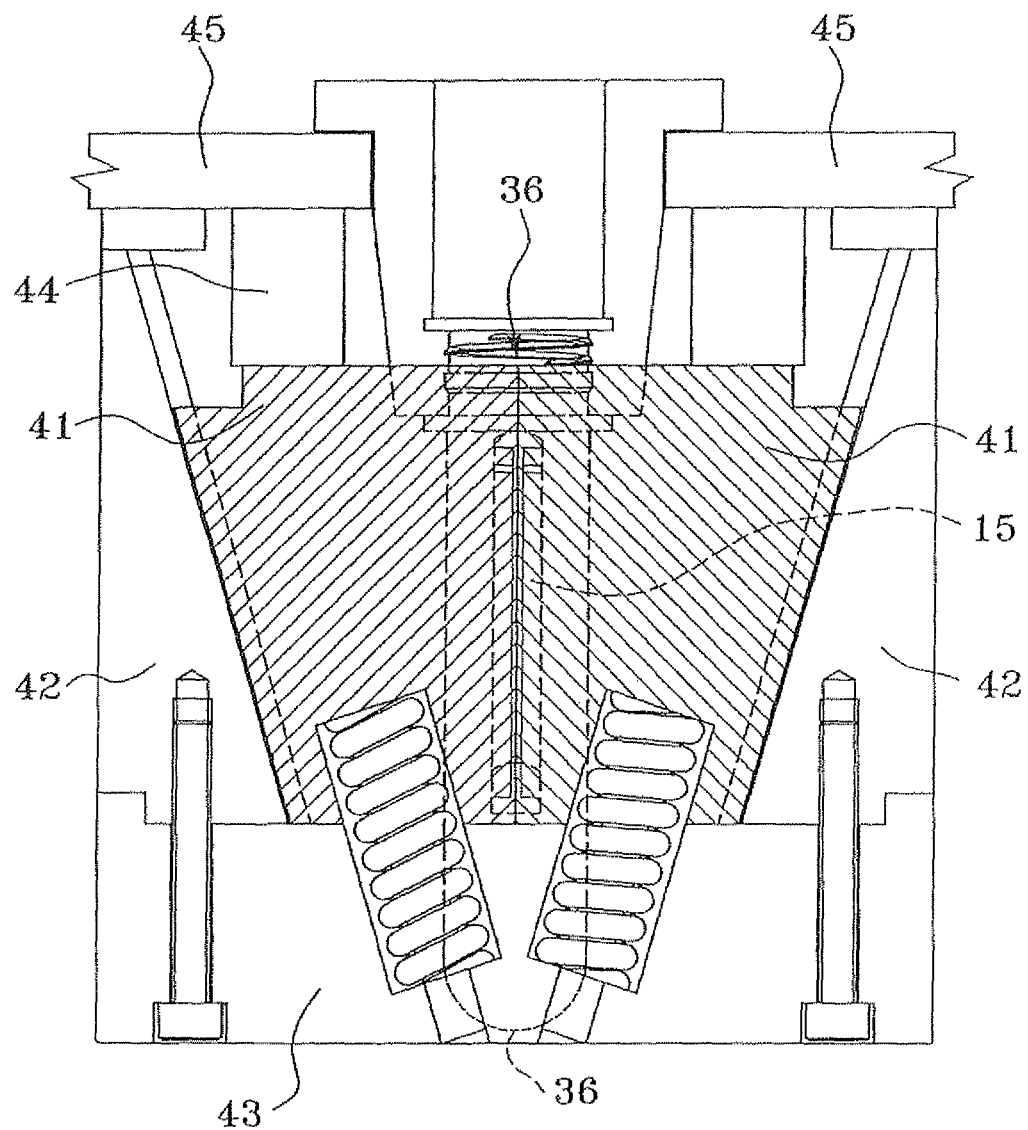
FIG. 7 is the die of FIG. 6 in closed position.
Figure 8:
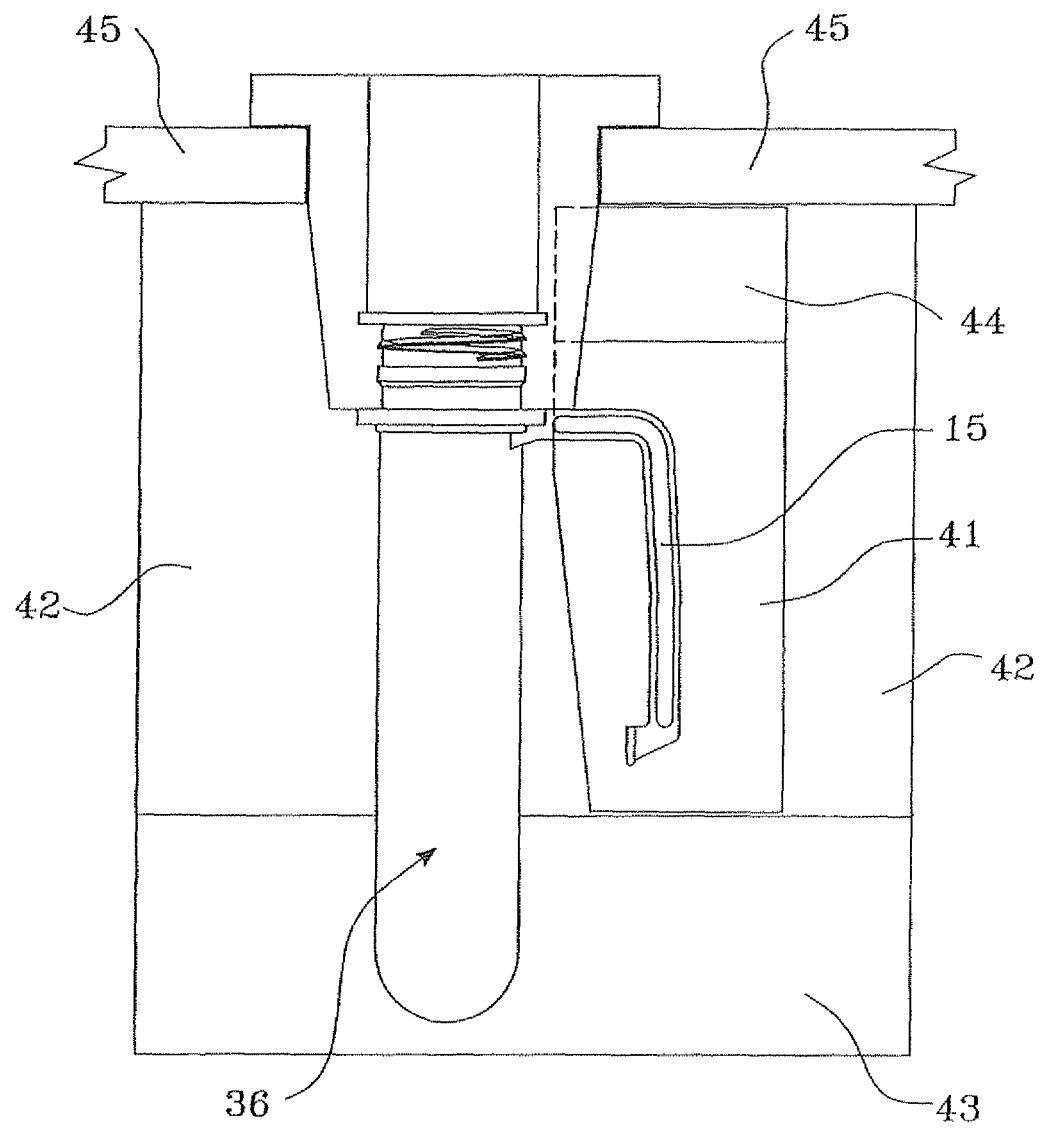
FIG. 8 is a side view of the die of FIGS. 6 and 7 showing the stem of the preform located therein.

In use preforms and containers blown therefrom can be manufactured as follows:

A preform is formed from orientable plastics material, preferably PET or like material in an injection moulding process. Slidable dies are illustrated in FIGS. 6, 7 and 8 and include a sliding core 40, sliding blocks 41, body 42, base 43, push block 44 and splits holder 45. FIG. 6 illustrates the die in open position, FIG. 7 illustrates the die in closed position and FIG. 8 illustrates a side view showing accommodation of the stem 14.

The completed preforms in a second and preferably separate step are subsequently passed to a stretch blow mould machine where the preforms are first reheated to the appropriate transition temperature (refer introduction). The non-expandable portion of the preform including locating ring 14 and stem 15 are shielded substantially from the reheat process by appropriate guarding. In most instances there is likely to be a temperature transition zone in the region 30, 31 described with reference to FIGS. 5A, 5B.

The reheated preform is then placed in a mould and biaxially stretched and the expandable portion blown to full size utilising processes known in the art. During this process the preform is supported at neck 14 and may also be supported at stem 15. Stem 15 does not take part in the blow process although its stem end 16 may be partially enveloped by an external wall of the blown container.

DETAILED DESCRIPTION OF METHODS OF MANUFACTURE INCORPORATING MODIFIED TWO STAGE STRETCH BLOW MOULDING MACHINES

Figure 9:
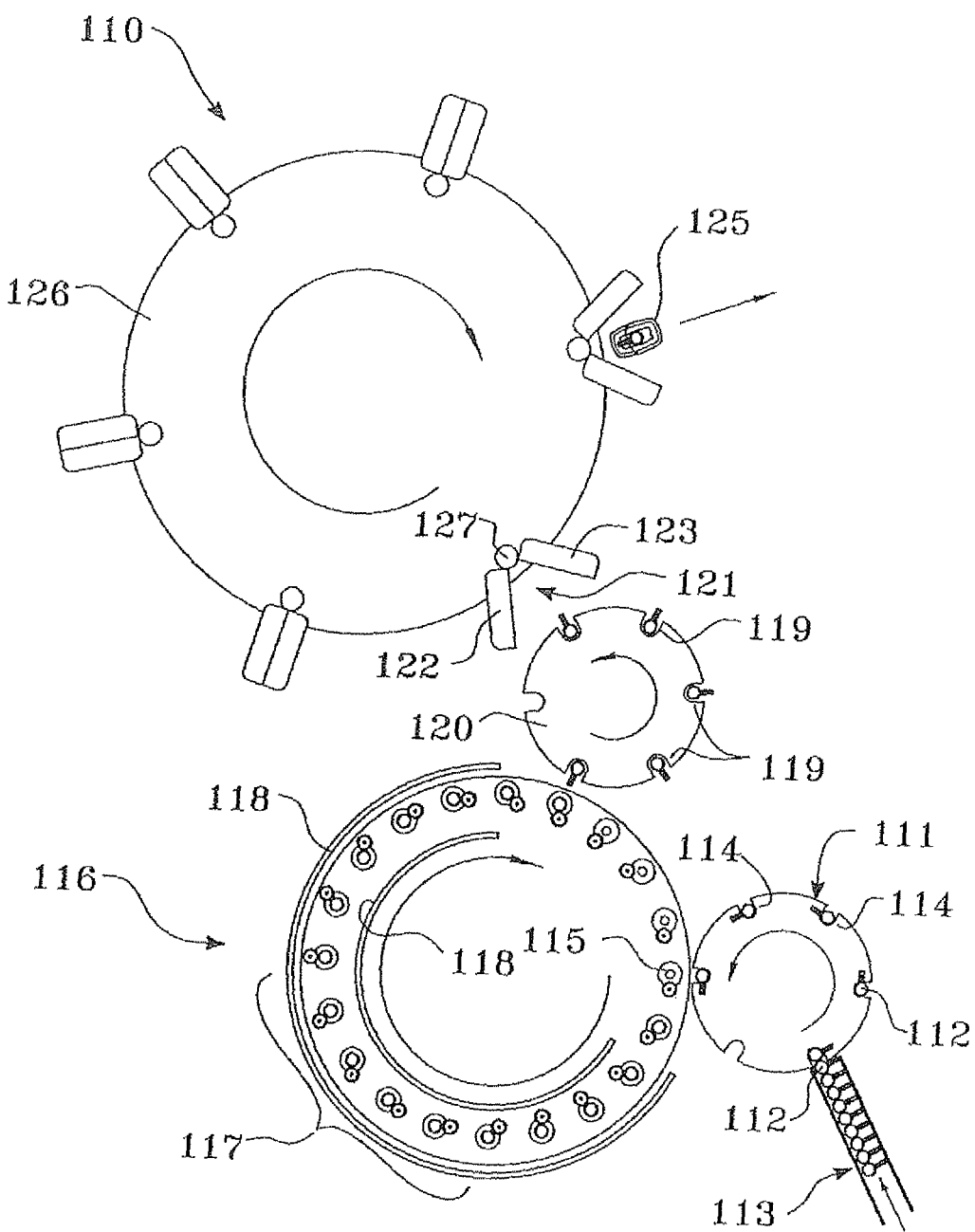
FIG. 9 is a top view of a two stage injection, blow mould machine adapted to receive preforms and biaxially orient them into blown containers according to embodiments of the invention.

FIG. 9 illustrates a modified two stage stretch blow mould machine 110 adapted to the stretch blow moulding (including biaxial orientation) of the preforms of previous embodiments and preforms of further embodiments to be described below with reference to later figures. These preforms have been previously injection moulded as described, possibly in a remote location from the present machine.

The machine 110 comprises a first carousel 111 adapted to receive integral handle preforms 112 from inclined chute 113 into apertures 114 spaced around the periphery thereof.

As first carousel 111 rotates it moves, via apertures 114 the preforms 112 from the chute 113 to a second carousel loading position where the preform 112 is transferred to a spindle 115 mounted near the periphery of second carousel 116.

A sector of approximately 270° of second carousel 116 is arranged as a preheating tunnel 117 where the preforms 112 are progressively heated by a heating bank mounted in opposed relationship to the path of travel of the preforms.

The suitably preheated preforms 112 are loaded consecutively into apertures 119 of a third carousel 120 which acts as a transfer mechanism to both suitably orient the preforms 112 about their longitudinal axis and present them to a mould cavity 121 comprising first half mould 122 and second half mould 123.

It should be noted that during their time in the preheating tunnel 117 the preforms 112 are rotated about their longitudinal axis by spindles 115 and have a handle shield 124 mounted over the preform stem which subsequently forms a handle for blown container 125. Details of the rotation of spindles 115 and the shielding of the preform stem are discussed more fully with reference to FIGS. 10, 11 and 12.

Mould cavities 121 are mounted on the periphery of a fourth carousel 126. During their travel through approximately a 270° sector the half moulds 122, 123 rotate to a closed position about their axis 127 and, whilst closed, the preform 112 enclosed therein is blown and biaxially stretched in known manner in order to produce an integral handle, blown container 125. This container 125 is ejected as illustrated when the half moulds open preparatory to receiving a fresh, preheated preform 112.

Figure 10:
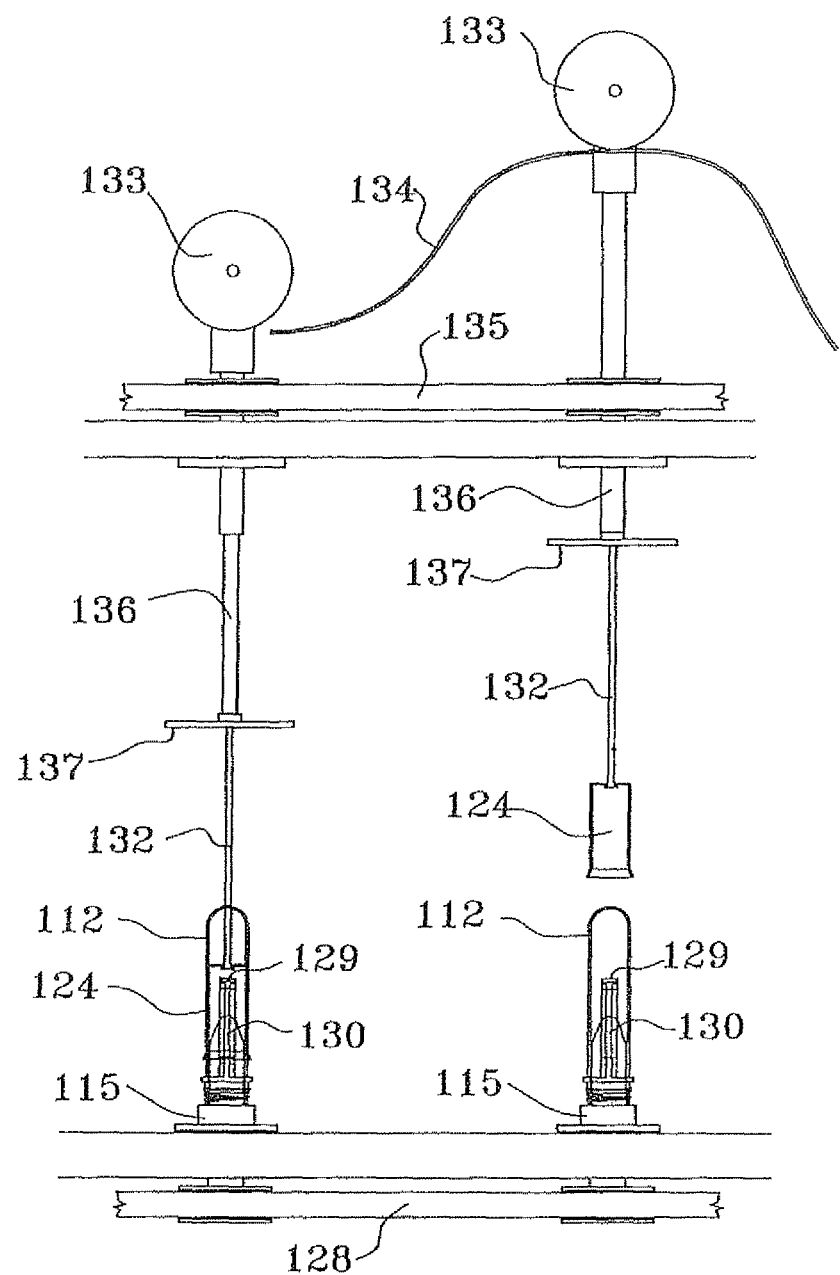
FIG. 10 is a side section view of a lifting, lowering and rotating mechanism for handle covers for use with the machine of FIG. 9.

With reference to FIG. 10 further detail is shown of spindles 115 and handle shields 124 and their manner of operation upon and in relation to preforms 112 whilst passing through preheating tunnel 117 on second carousel 116.

The spindles 15 are rotated by band drive 128 so as to, in one embodiment, rotate the preforms 112 through approximately four full axial rotations during their passage through the preheating tunnel 117.

Figure 12:
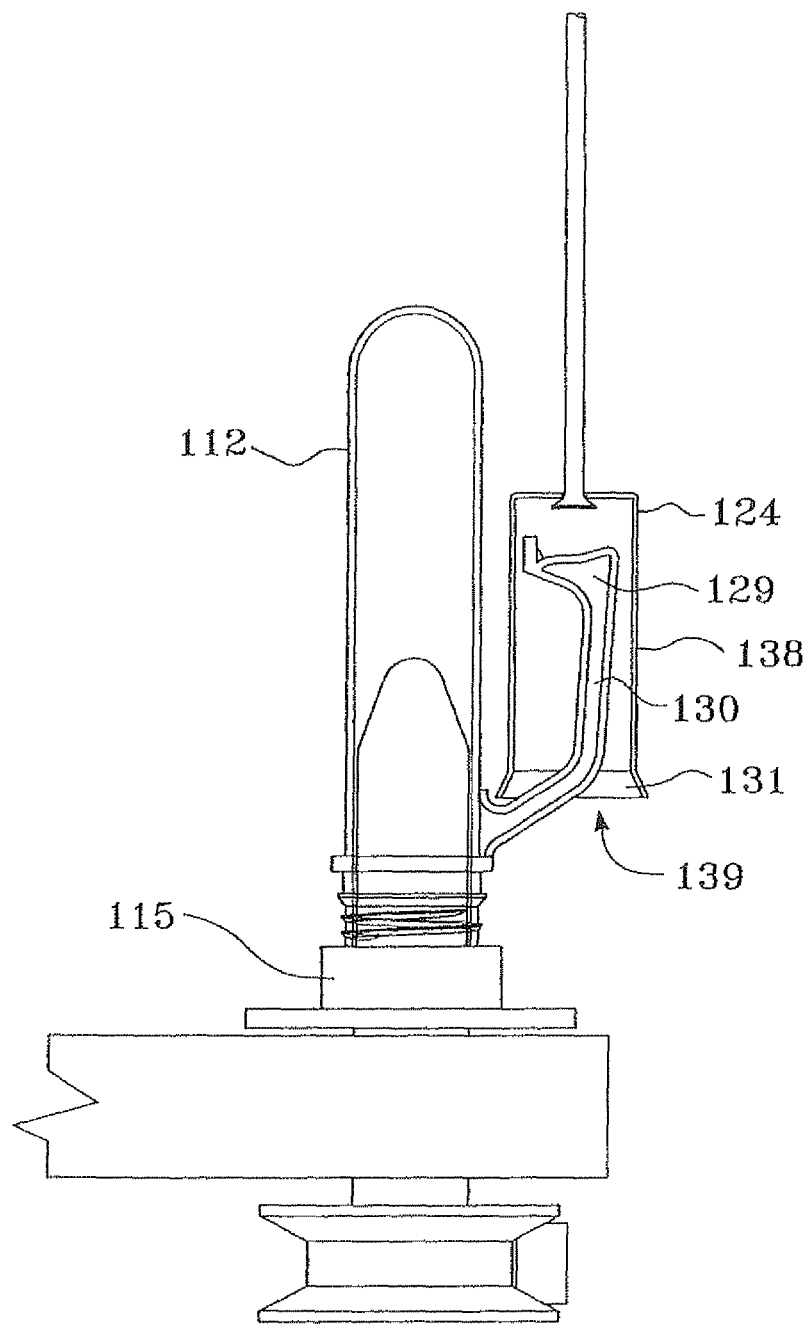
FIG. 12 is a side section, close up view of the machine of FIG. 9 showing a preform with handle cover lowered over the handle portion thereof, FIGS. 13A, B illustrates first and second side section views of a preform adapted for loading into the machine of FIG. 9.

Whilst in the preheating tunnel 117 a handle shield 124 is lowered over the free end 129 of handle stem 130 so as to fully shield the handle stem 130 as best seen in greater detail in FIG. 12.

The shield 124, in one preferred form, is cylindrical save for a fluted open mouth 131 best seen in FIG. 12. The fluted mouth 131 assists in ensuring maximal shielding of handle stem 130 and also assists in guiding the shield 124 onto the free end 129 of stem 130.

Lifting and lowering of the shield 124 is effected through a shield support stem 132 which is suspended from a cam follower 133 adapted to travel on cam 134.

The stems 132 are themselves rotated, by band drive 135 so as to follow the rotation of spindles 115. As best seen in end view of FIG. 11 the shield support stem 132 is offset from the cam follower stem 136 by virtue of being mounted near the periphery of platten 137.

As cam follower 133 rides up cam 134 it pulls handle shield 124 up with it by virtue of the connecting link comprising shield support stem 132, platten 137 and cam follower stem 136.

Cam follower stem 136 can comprise a telescoped arrangement allowing relative axial rotation between two component, telescoping parts thereof.

The handle shield 124 can comprise alternative shapes other than cylindrical, for example an oval cross section is possible although the cylindrical arrangement having a circular cross section is preferred.

The handle shield 124 is preferably made of insulating material such as a ceramic material and is covered on an exterior surface 138, in a preferred version, with a heat reflecting material which, ideally, is also light reflecting.

In use the reflective surface 138 causes light and heat emanating from heating bank 118 to be reflected thereof whereby two functions are performed. The first function involves protecting the handle stem 130 from heat. The second function is to reflect heat and light in the direction of that portion of the preform closest to the handle stem 130 so that it is evenly heated and tends not to be shadowed by the stem 130.

In one particular form the handle shields 124 can be cooled by an air or nitrogen blast (not shown) directed at them whilst they are lifted clear of the preform 112. This will assist to prevent radiated and/or convected heat building up within, the cavity 139 of the shield 124.

Figure 13:
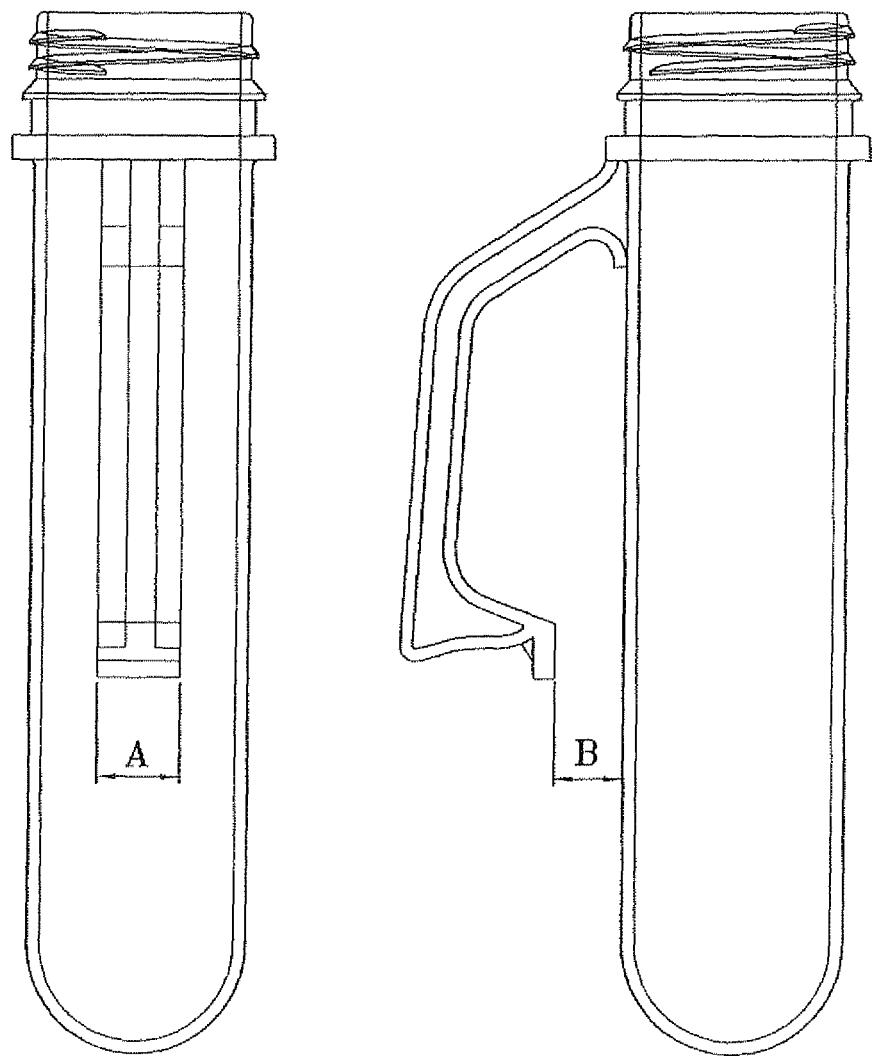
Figure 15:
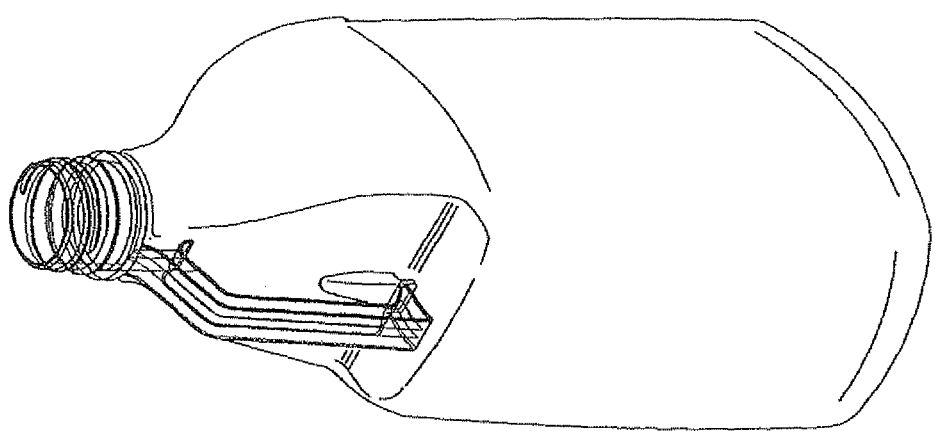
FIG. 15 is a perspective view of a container blown from the preform of FIG. 14 on the machine of FIG. 9.
Figure 14:
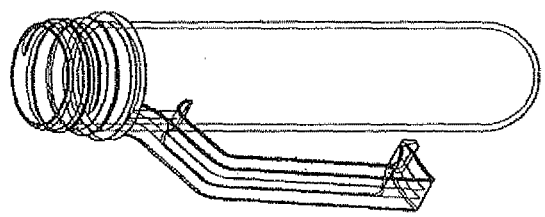
FIG. 14 is a perspective view of the preform of FIG. 13.
Figure 17:
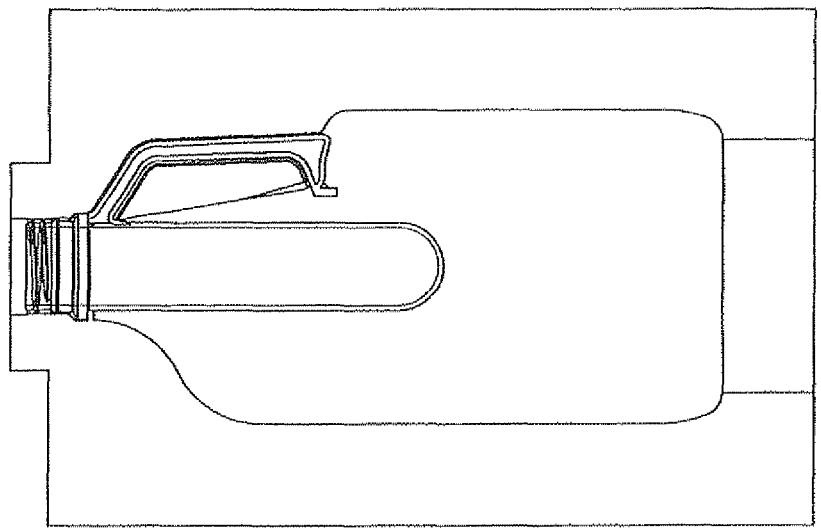
FIG. 17 is a top view of the mould of FIG. 16 with a preform inserted therein ready for blowing on the machine of FIG. 9.
Figure 16:
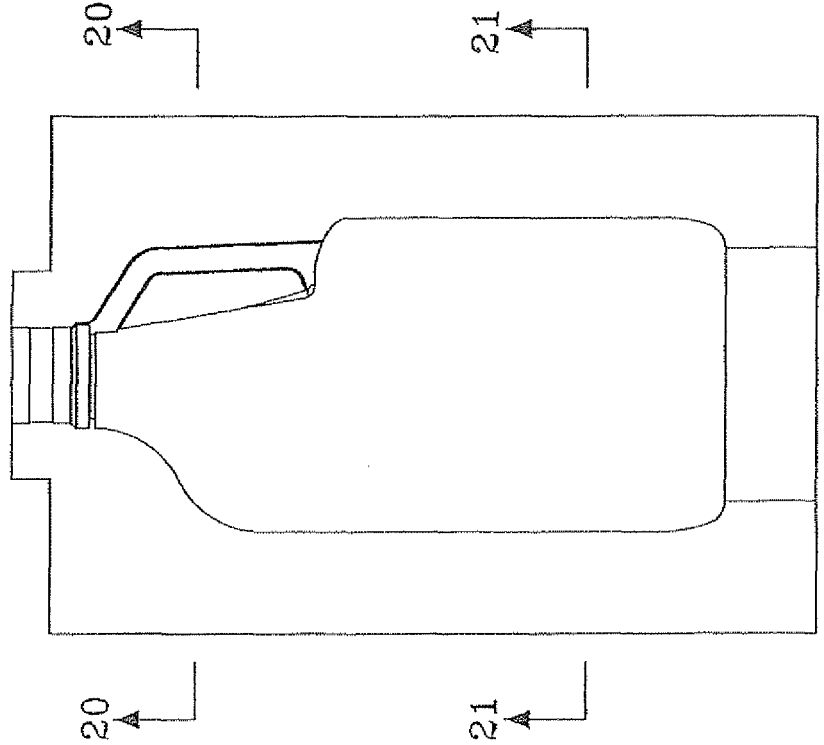
FIG. 16 is a plan view of a half mould adapted for blowing preforms on the machine of FIG. 9.
Figure 18:
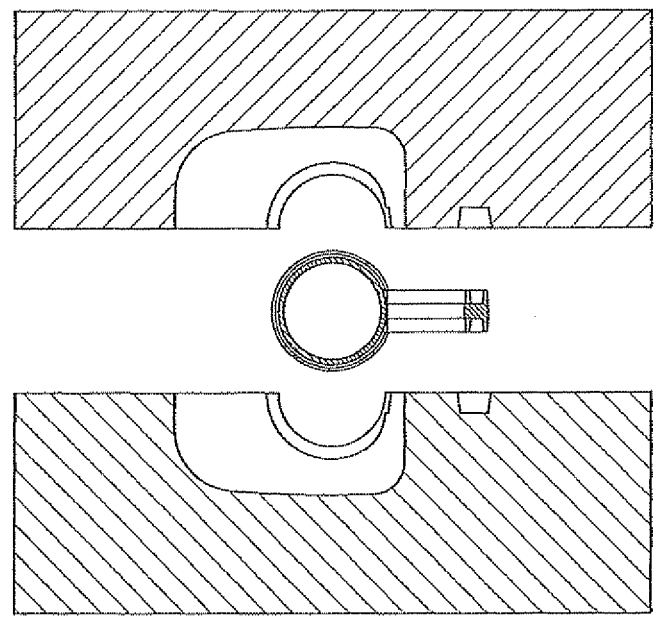
FIG. 18 is a bottom view of FIG. 17 with both half moulds in opposed relationship.
Figure 19:
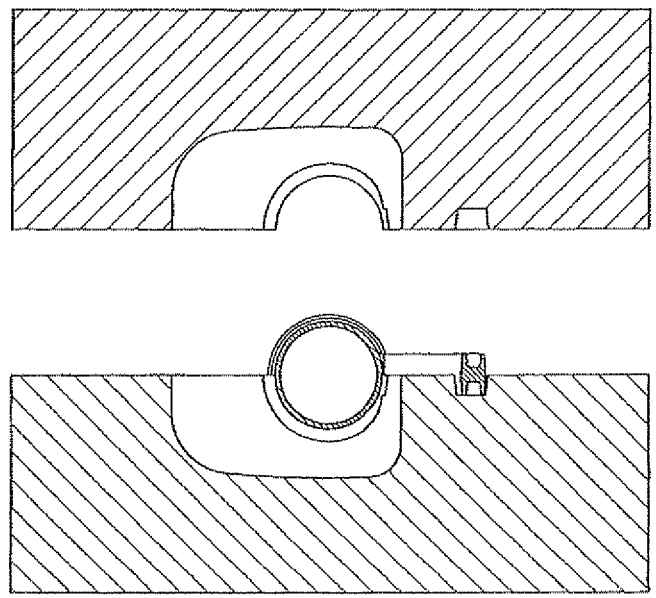
FIG. 19 is a further bottom view of FIG. 17 showing the preform in the position of FIG. 17.
Figure 20:
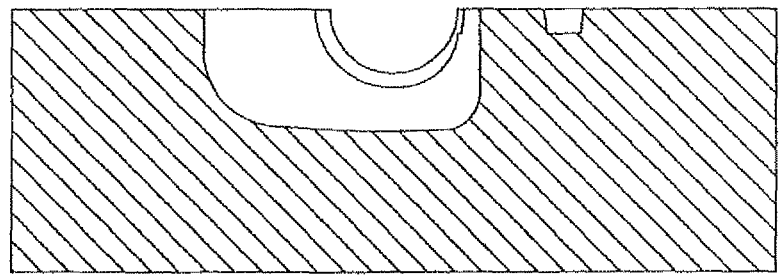
FIG. 20 is a section view through the half mould of FIG. 16.
Figure 21:
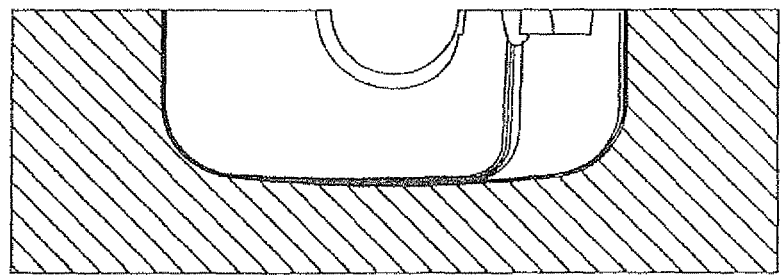
FIG. 21 is a section view through the mould of FIG. 16.
Figure 23:
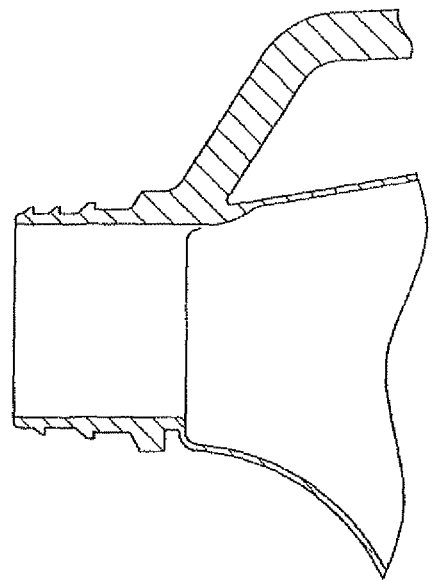
FIG. 23 is a detail, side section view of the neck and top handle portion of the container of FIG. 22.
Figure 22:
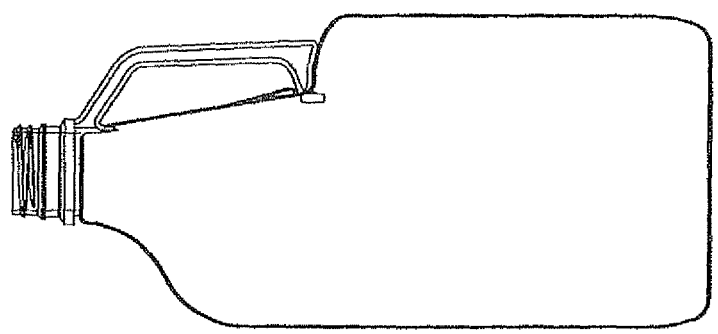
FIG. 22 is a side view of the container of FIG. 15 blown in the mould of FIG. 19 from a preform as illustrated in FIGS. 13 and 14.
Figure 24:
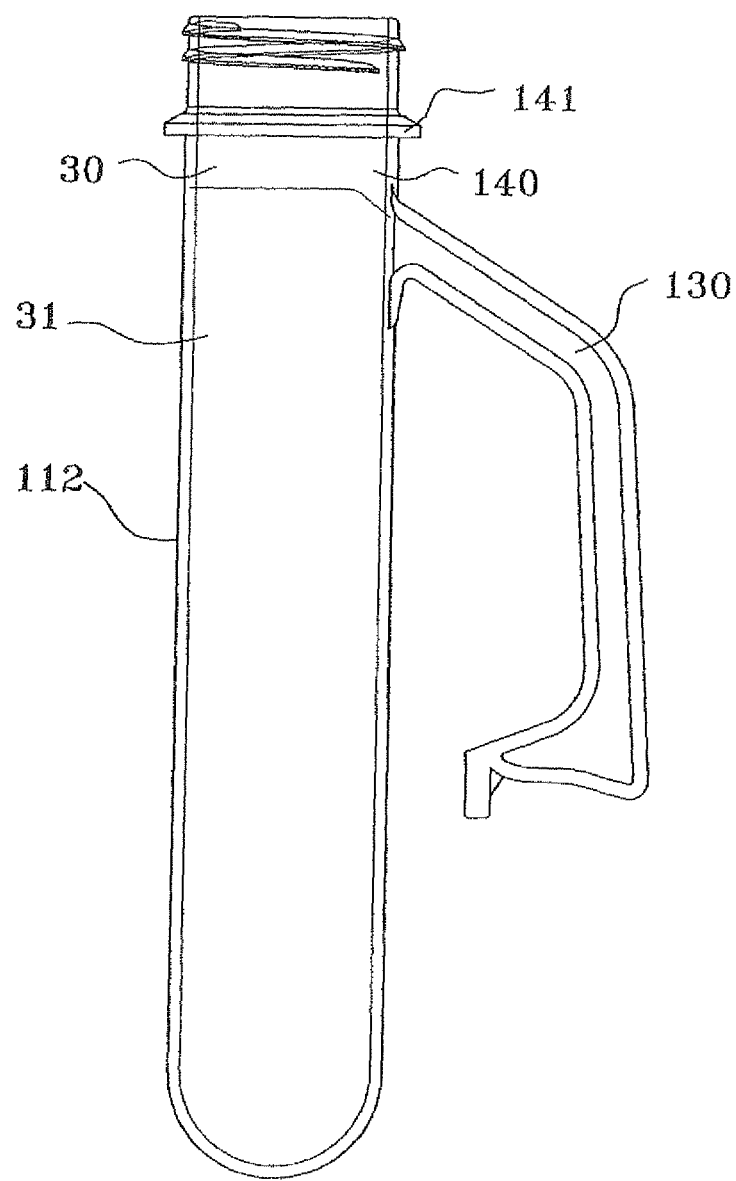
FIG. 24 is a side view of a preform incorporating an enlarged first non-expanding region usable with embodiments of the invention.
Figure 25:
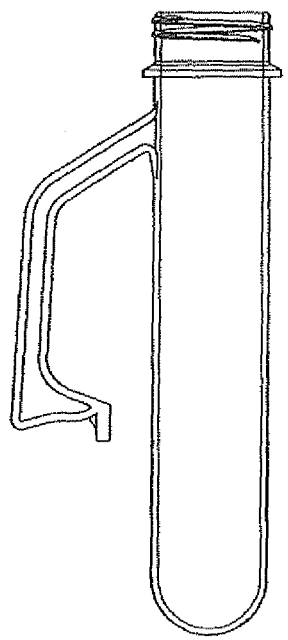
FIG. 25 is an alternative side view of the preform of FIG. 24.
Figure 26:
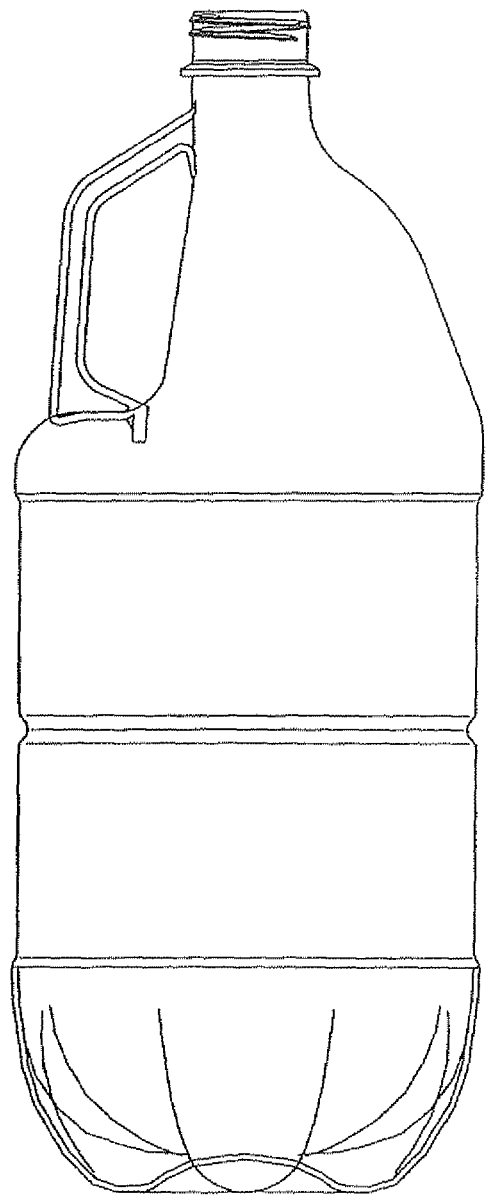
FIG. 26 is a side view of a container blown from the preform of FIG. 24 on the machine of FIG. 9.
Figure 27:
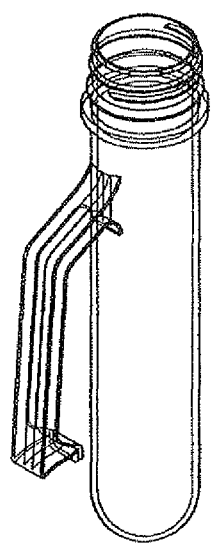
FIG. 27 is a perspective view of the preform of FIG. 24.
Figure 28:
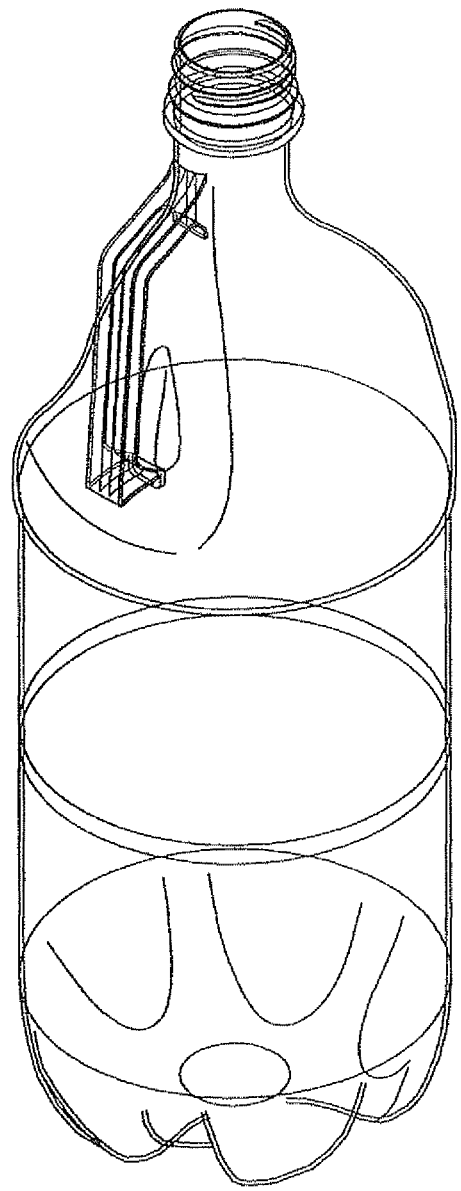
FIG. 28 is a perspective view of the container of FIG. 26.
Figure 29:
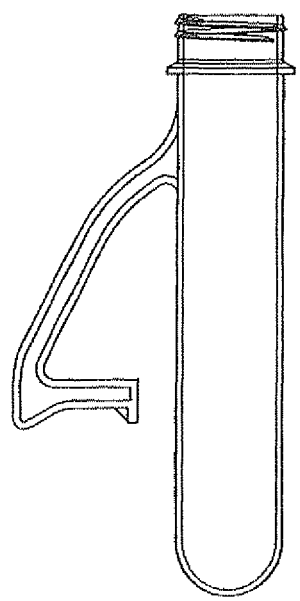
FIG. 29 is a side view of yet a further alternative embodiment of a preform incorporating a lengthened or enlarged first non-expanding zone and adapted for blowing on the machine of FIG. 9.
Figure 30:
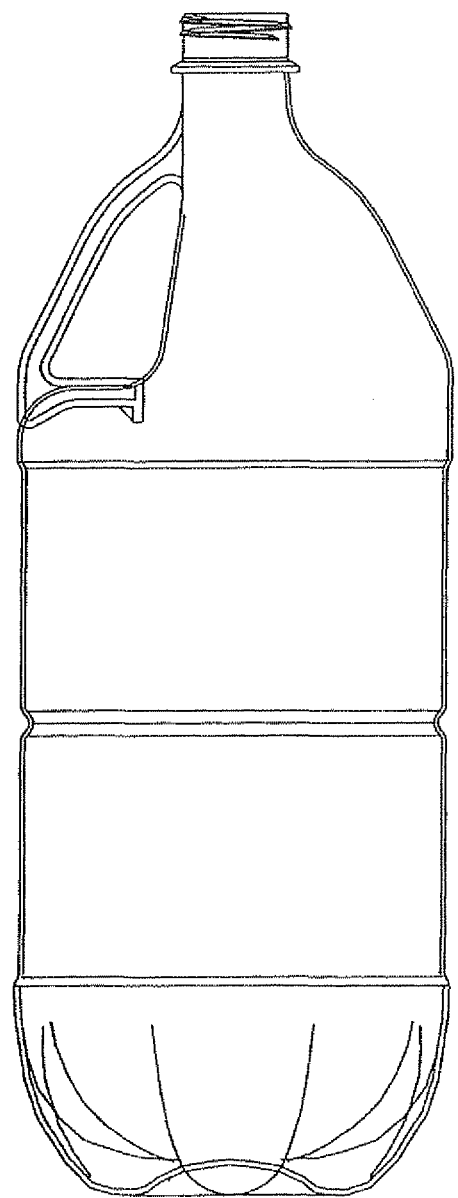
FIG. 30 is a side view of a container blown from the preform of FIG. 29 on the machine of FIG. 9.

FIGS. 13-23 illustrate details of a preform, mould and container blown therefrom and therein by the machine of FIG. 9. With reference to FIG. 13, in a preferred version, dimension A is greater than dimension B thereby to discourage tangling of preforms prior to loading into chute 113.

It will be observed that the top end of the handle is located close to the locating ring in this version. It will also be noted that the stem of the preform which subsequently constitutes the handle of the blown container is fully supported within the half mould during the entire blowing process. In contrast the walls of the container including portions of the container wall peripherally opposite the top end of the handle stem are free to be blown within the constraints of the mould.

With reference to FIGS. 24-34 a second version of a preform, mould and resulting blown container is illustrated wherein first non-expanding region 30 is relatively long in the axial direction including a portion 140 which extends from locating ring 141 down to and around at least a top portion of the connection of the handle stem 130 thereby forming a join of the top end of handle stem 130 to locating ring 141. (Best seen in FIG. 24).

Figure 32:
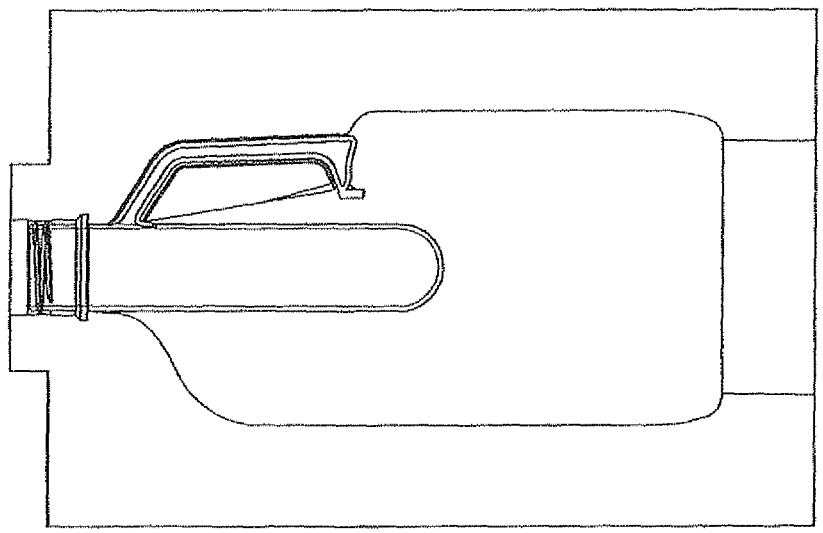
FIG. 32 is a plan view of the half mould of FIG. 31 with the preform of FIG. 24 inserted therein ready for blowing on the machine of FIG. 9.
Figure 31:
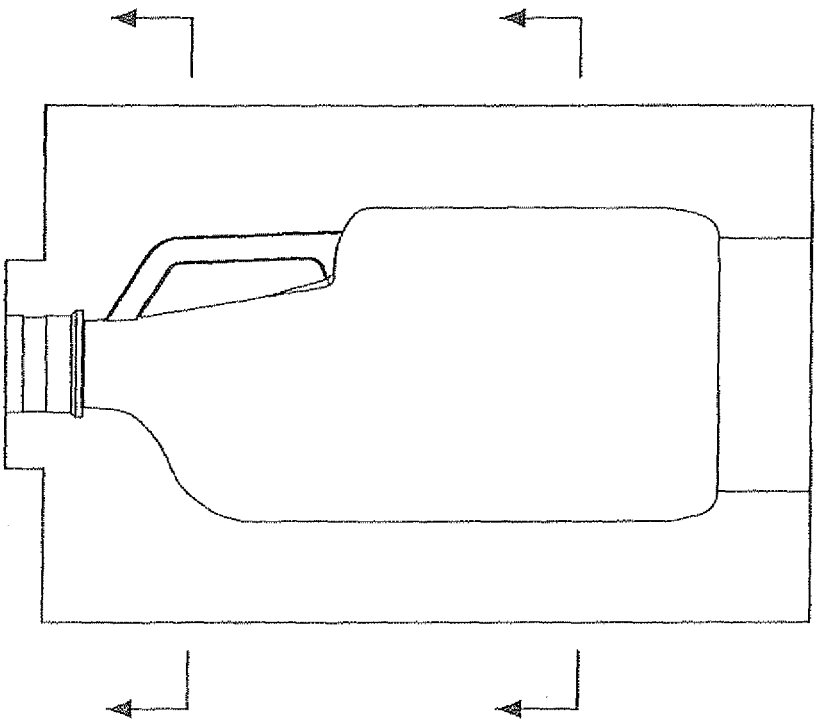
FIG. 31 is a plan view of a half mould for blowing the preform of FIG. 24.
Figure 34:
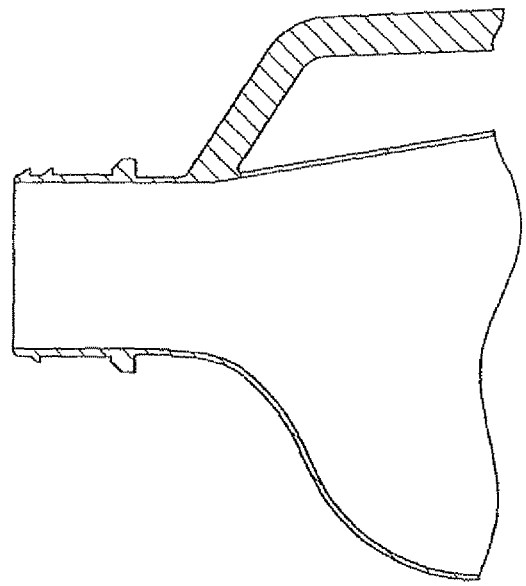
FIG. 34 is a detail side section view of the neck and top handle portion of the container of FIG. 33.
Figure 33:
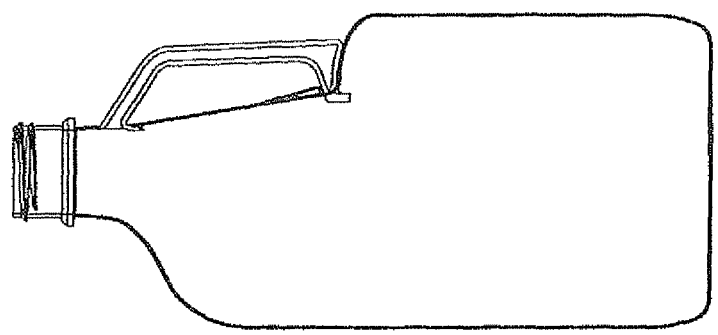
FIG. 33 is a side section view of a container blown in the mould of FIG. 32

In this version there is at least partial expansion of wall portions of the preform located peripherally away from the join of the handle stem 130 to the preform 112 (best seen in FIGS. 32 and 34). This expansion, relatively, is not as great as the biaxial expansion occurring below the first and second non-expanding regions 30, 31. It can, however, be significant in providing strength and resistance to gas permeation in at least second non-expanding region 31, if not non-expanding region 30.

Container Resistant to Internal Pressures

Figure 40:
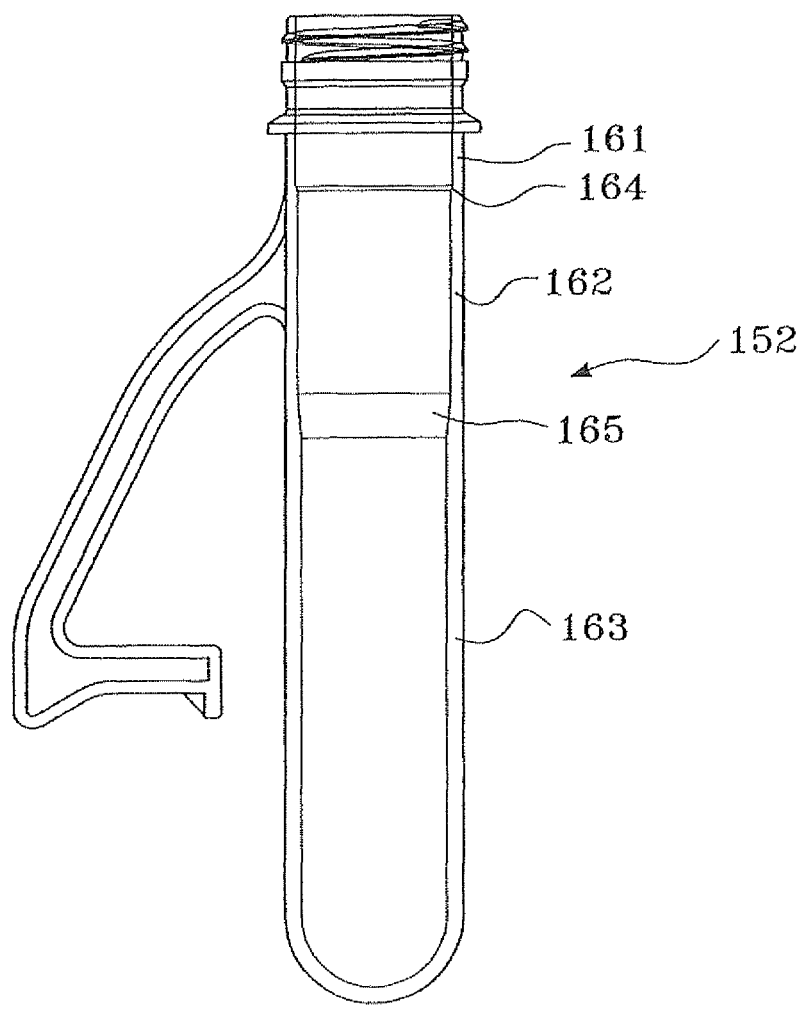
FIG. 40 is a side view of a preform from which the container of FIG. 35 can be blown.
Figure 41:
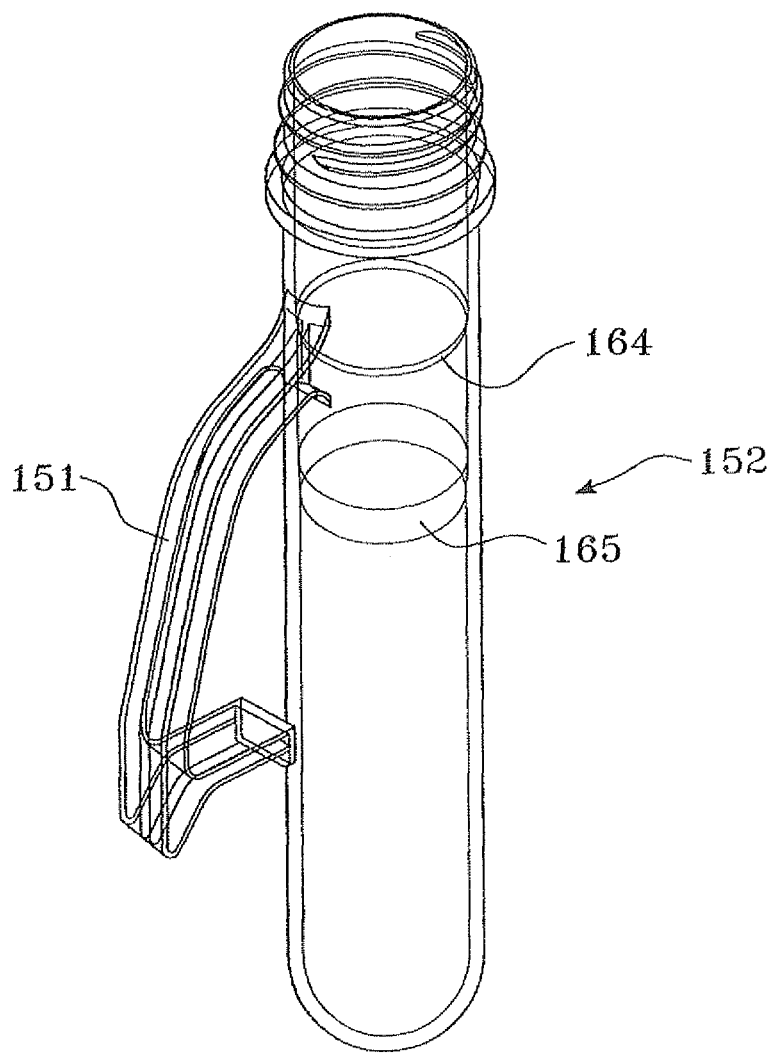
FIG. 41 is a perspective view of the preform of FIG. 40.

With reference to FIGS. 35 to 39 there is shown a container 150 incorporating an integral handle 151 which is biaxially blown from the preform 152 illustrated in FIGS. 40 and 41.

Figure 36:
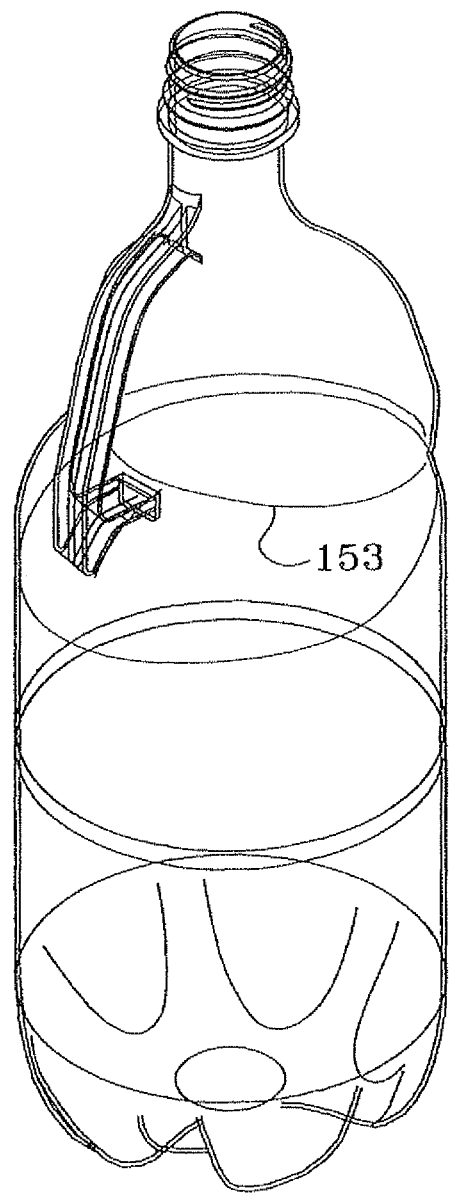
FIG. 36 is a second perspective view of the container of FIG. 35.
Figure 39:
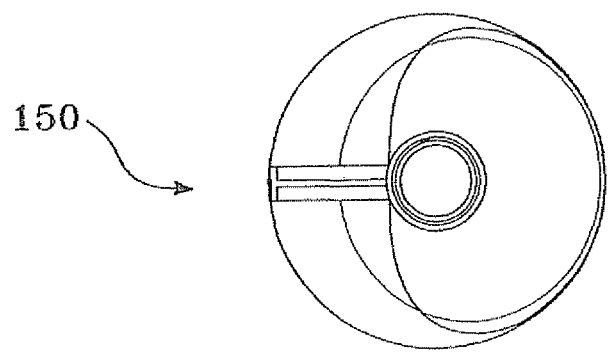
FIG. 39 is a plan view of the container of FIG. 35.
Figure 37:
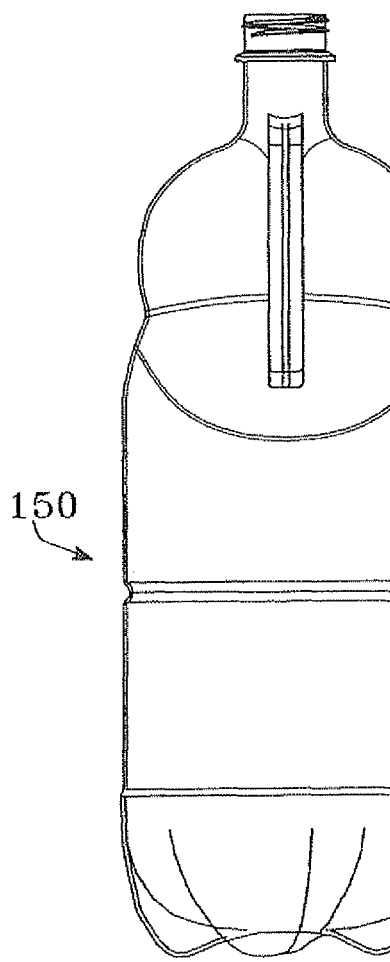
FIG. 37 is a first side view of the container of FIG. 35.

In this instance, as perhaps best seen in FIG. 36, the blown container 150 includes a discontinuity region 153. In this instance the discontinuity region 153 extends the entire circumference of the container 150.

Figure 38:
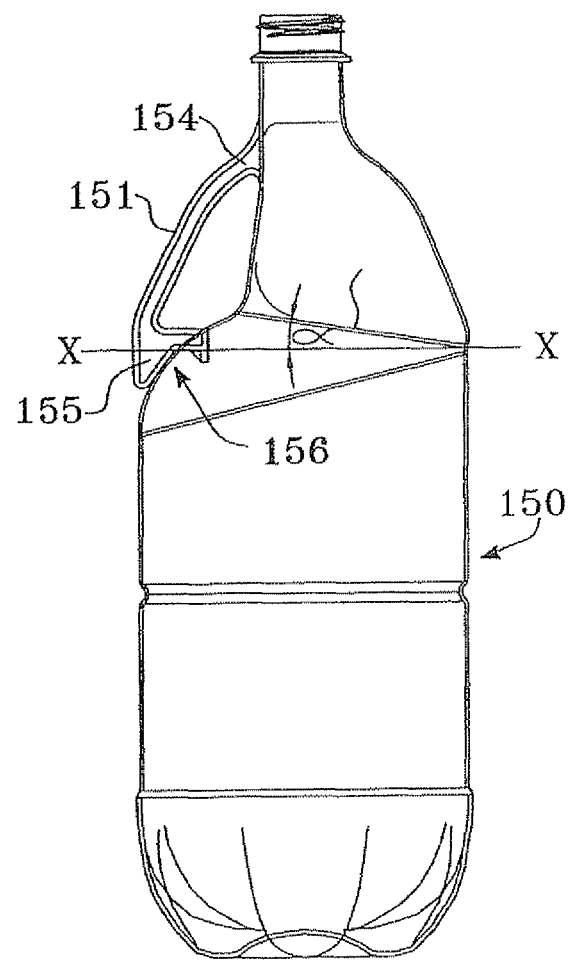
FIG. 38 is a second side view of the container of FIG. 35.

As best seen in FIG. 38 the discontinuity region 153 lies in a plane which subtends an acute angle alpha with a horizontal plane XX.

The plane of the discontinuity region 153 is oriented so that where it passes closest to the integral handle 151 it lies between first end 154 and second end 155 of the handle 151.

In this instance that part of the discontinuity region 153 located furtherest from the handle 151 lies in the plane XX which passes through, or close to, join region 156 where the second end 155 of handle 151 is joined to container 150.

Figure 35:
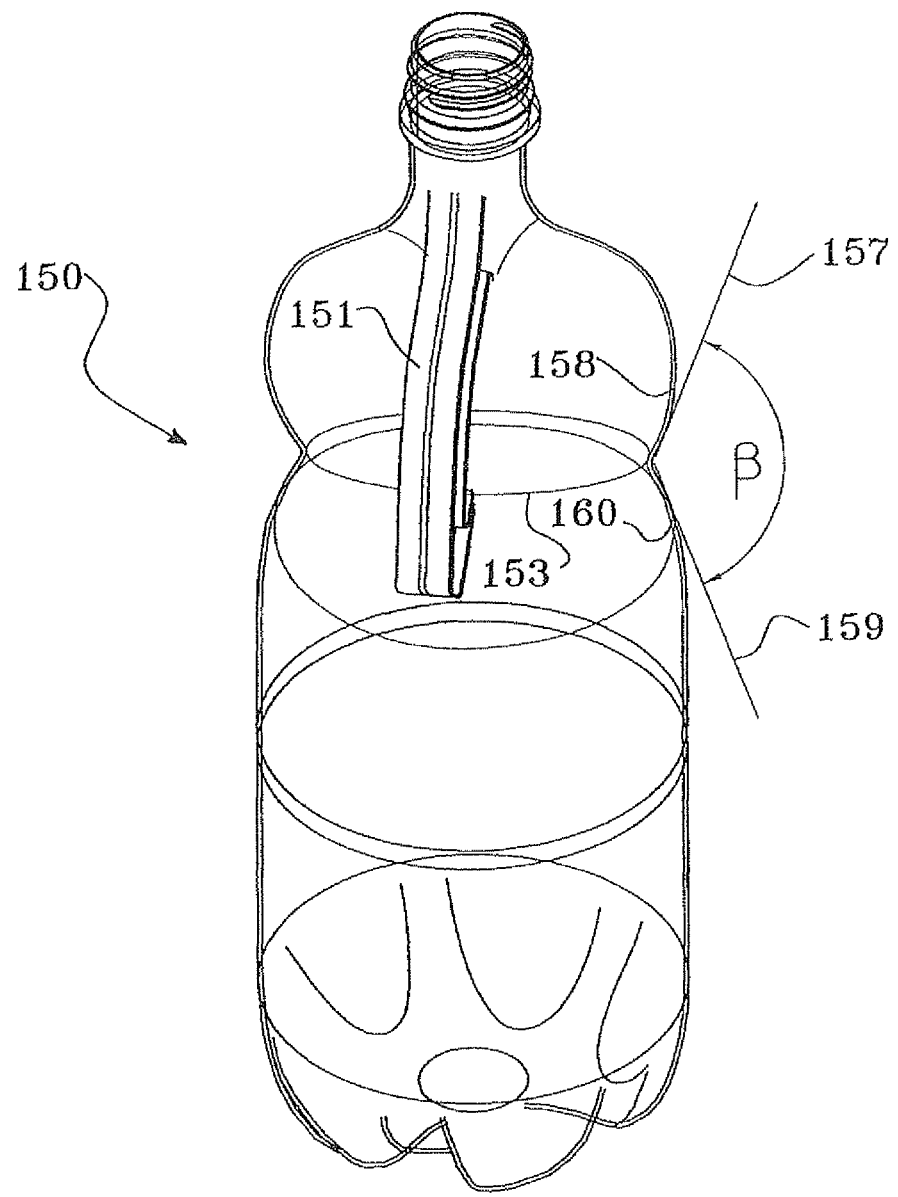
FIG. 35 is a first perspective view of a container usable with embodiments of the invention particularly adapted to resist high internal pressures.

The discontinuity region 153 is formed by a substantial change in direction of the wall of the container 150, perhaps best seen in FIG. 35 wherein first tangent 157 to upper wall portion 158 intersects with second tangent 159 to lower wall portion 160 of container 150 at an obtuse angle beta, thereby forming a portion of the discontinuity region 153.

This discontinuity region 153 imparts additional strength to the container walls, thereby to resist deformation of, particularly from internal pressures which can arise when the container is sealed, as for example when the container contains a carbonated beverage.

In order to assist in the creation of the discontinuity region 153 the preform 152 from which the container 150 is biaxially blown includes different wall thickness profiles, in this instance in the form of first wall profile 161, second wall profile 162 and third wall profile 163 separated one from the other by first transition zone 164 and second transition zone 165 as best seen in FIG. 40.

It will be observed that the wall thickness of third wall profile 163 is greater than the wall thickness of second wall profile 162 which, in turn, is greater than the wall thickness of first wall profile 161.

The second end 155 of the handle 151 is joined to the container during a biaxial blowing operation by defamation and envelopment about the second end 155. The second end 155 can include a bulbous portion including a bulbous portion of the types illustrated in FIG. 2.

The preform 152 can be manufactured from PET materials in an injection moulding operation as described earlier in this specification.

The preform 152 is then blown as a second stage operation in a stretch blow moulding machine so that its walls conform to the inside surfaces of a mould, also as described earlier in this specification.

Tag Connected Handle

Figure 42:
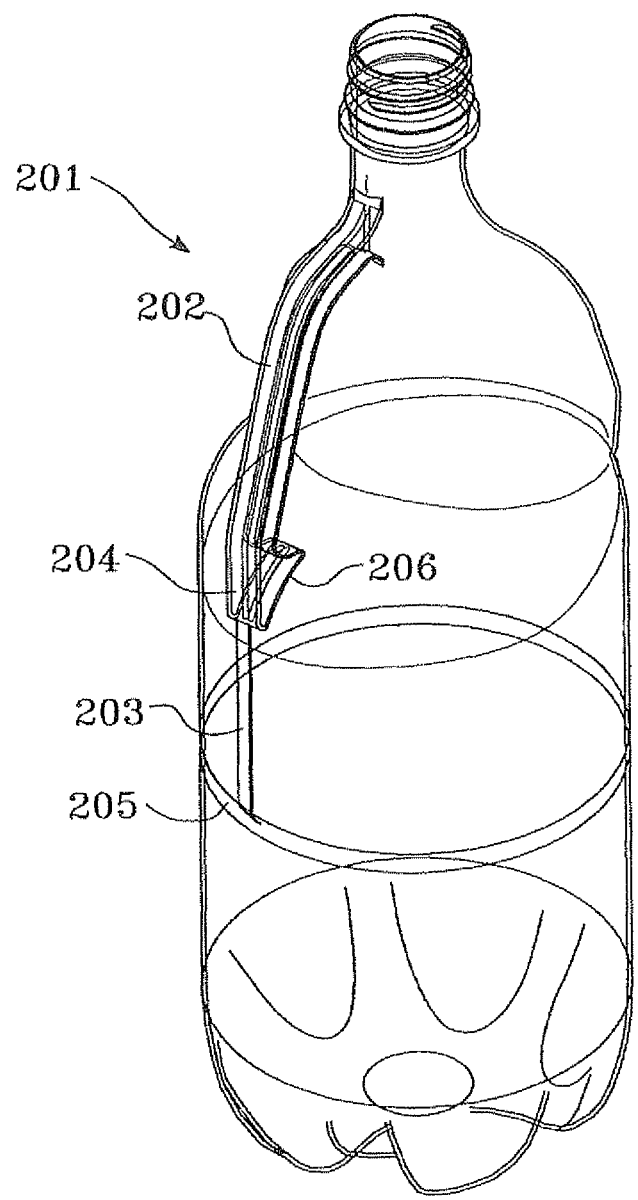
FIG. 42 is a perspective view of a container with strap connected handle according to an embodiment of the invention.
Figure 43:
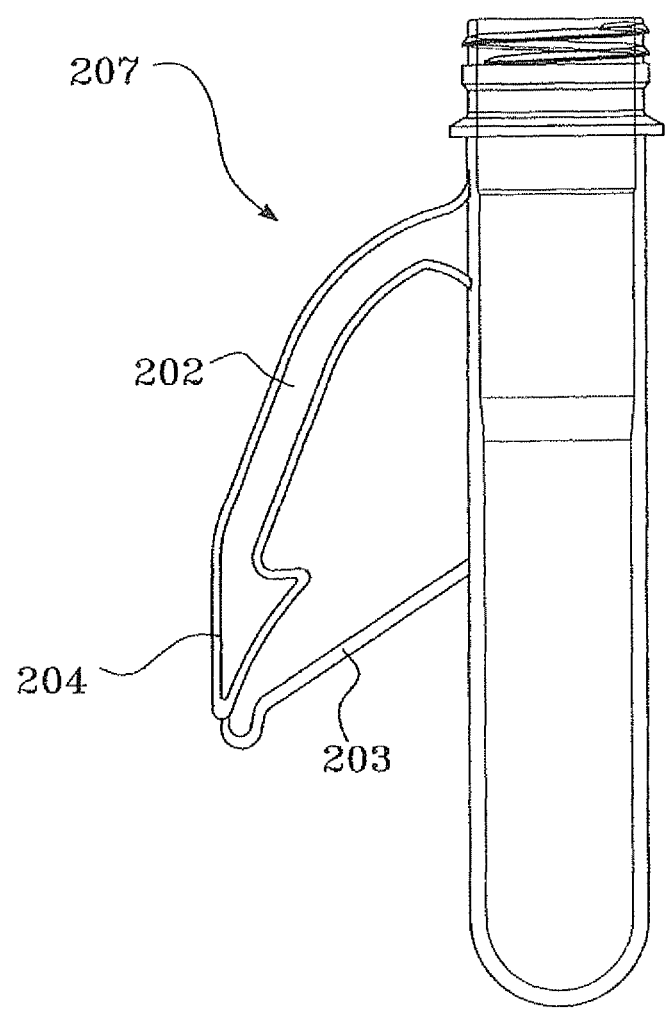
FIG. 43 is a side view of a preform from which the container of FIG. 42 can be blown.

With reference to FIG. 42 and FIG. 43 an alternative version of the container and the preform from which it is constructed are illustrated and comprises a rudimentary form of the multiple integral connection handle arrangement of the invention.

With reference to FIG. 42 the container 201 includes an integral handle 202 as previously described and constructed, save that the connection to the lower end of the container 201 is formed as an integral connection by way of a tag 203 which extends from a lower edge 204 of a wide part of the handle 202 down to a mid circumferential portion 205 of container 201 at which point it is integrally connected thereto. The lower edge 204 of the wide part of the handle 202 includes a landing portion 206 which merely rests on the surface of the container 201 at this point rather than being integrally connected thereto or otherwise connected thereto at this point.

A preform 207 from which the container 201 of FIG. 42 is blown is illustrated in FIG. 43. This preform 207 is constructed substantially in the same manner as that illustrated in FIG. 40 except that lower edge 204 of handle 202 is integrally connected to the preform 207 by way of tag 203 in the manner illustrated in FIG. 43.

Figure 11:
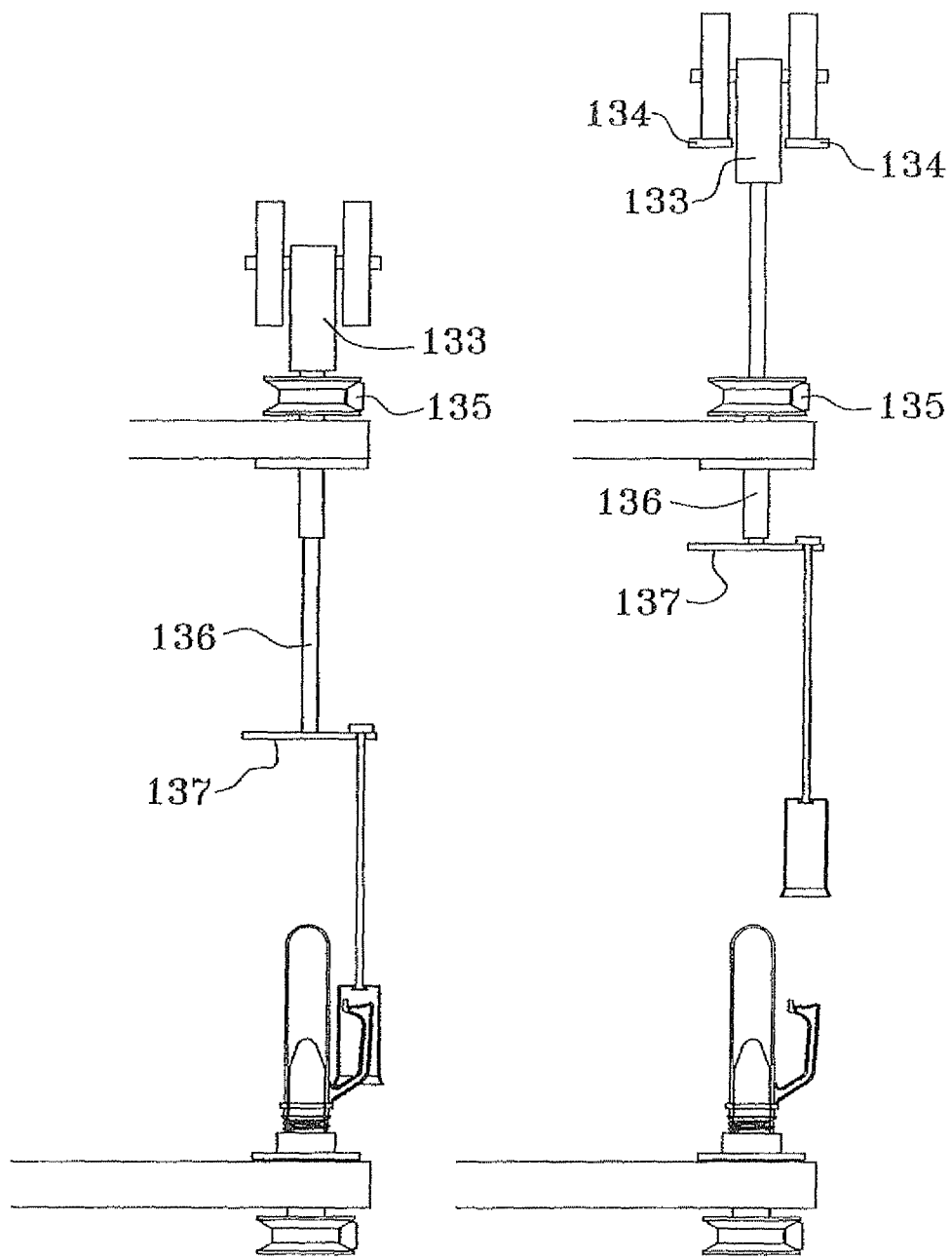
FIG. 11 is an alternative side section view of the mechanism of FIG. 10.

The preform 207 is blown to form the container of FIG. 42 utilising the process previously described with reference to FIGS. 10, 11 and 12.

Preform and Container with Multiple Integral Connection Handle

Figure 44:
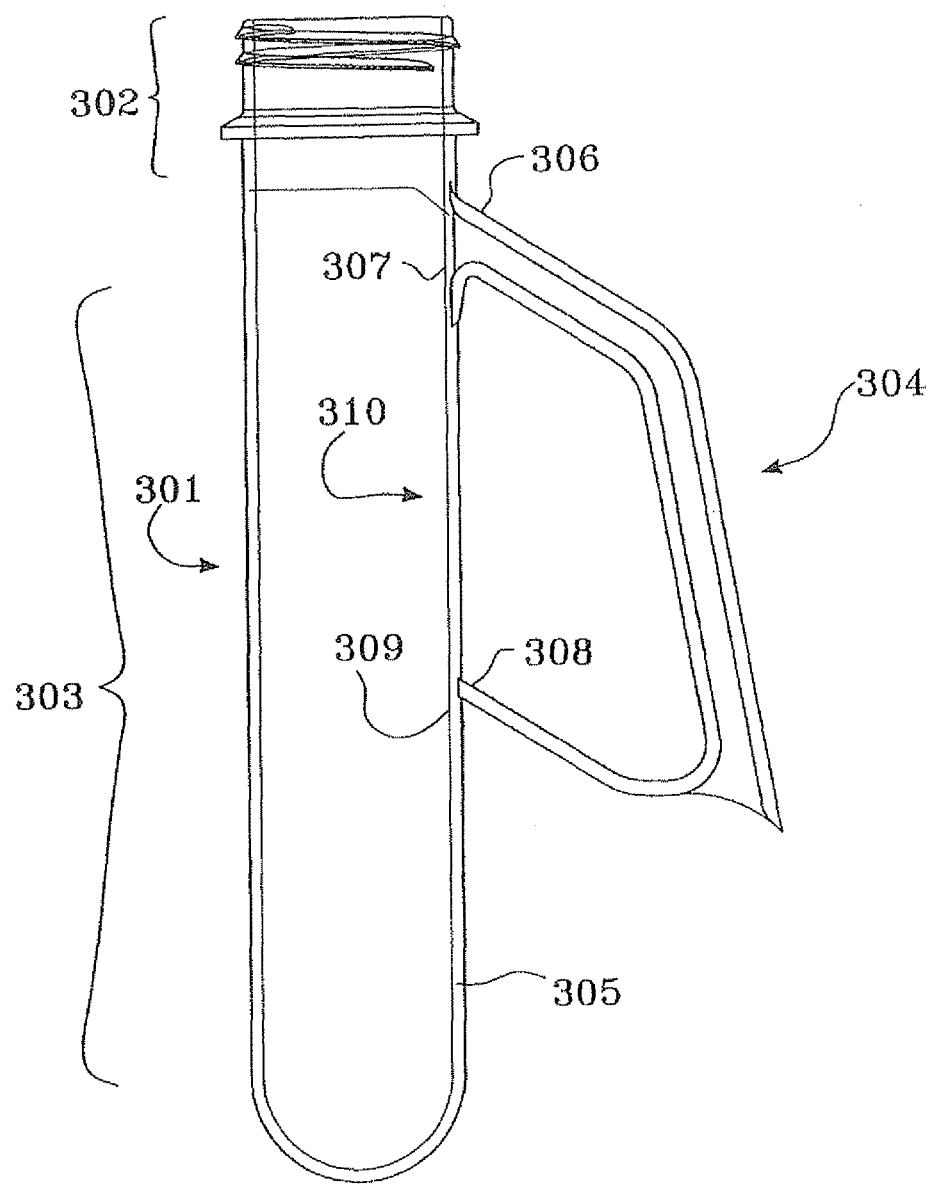
FIG. 44 is a side section view of a preform having a multiple integral connection handle according to an embodiment of the invention.

With reference to FIG. 44 there is shown a preform 301 having a neck portion 302 and an expandable portion 303 located therebelow.

In substitution for the stem of the earlier examples in this specification is a loop 304 made from the same material as the wall 305 of the preform 301. In this instance the loop 403 is integrally connected at a first end 306 to a first location 307 on and forming part of the wall 305.

The other of the loop 304 being second end 308 is integrally connected into wall 305 at second location 309.

The loop 403 is formed in the same mould as and at the same time as the preform 301 is moulded, in a preferred form from PET plastics material.

Figure 47:
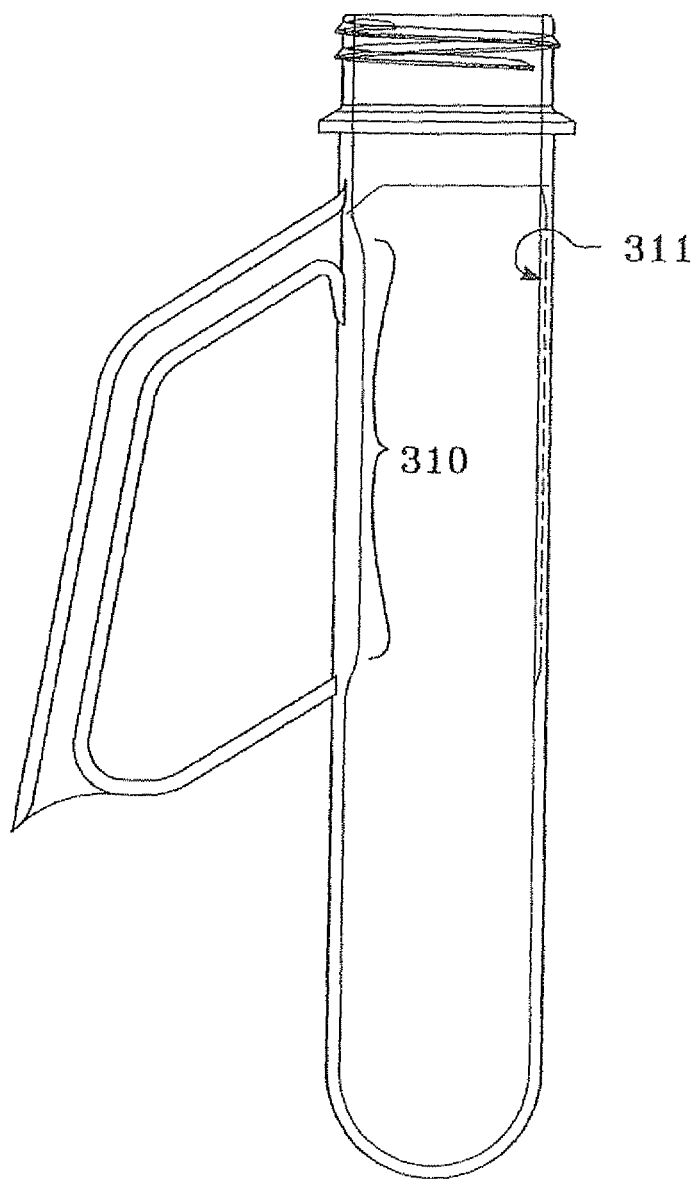
FIG. 47 is a side section view of a preform having a multiple integral connection handle according to a further embodiment of the invention.
Figure 48:
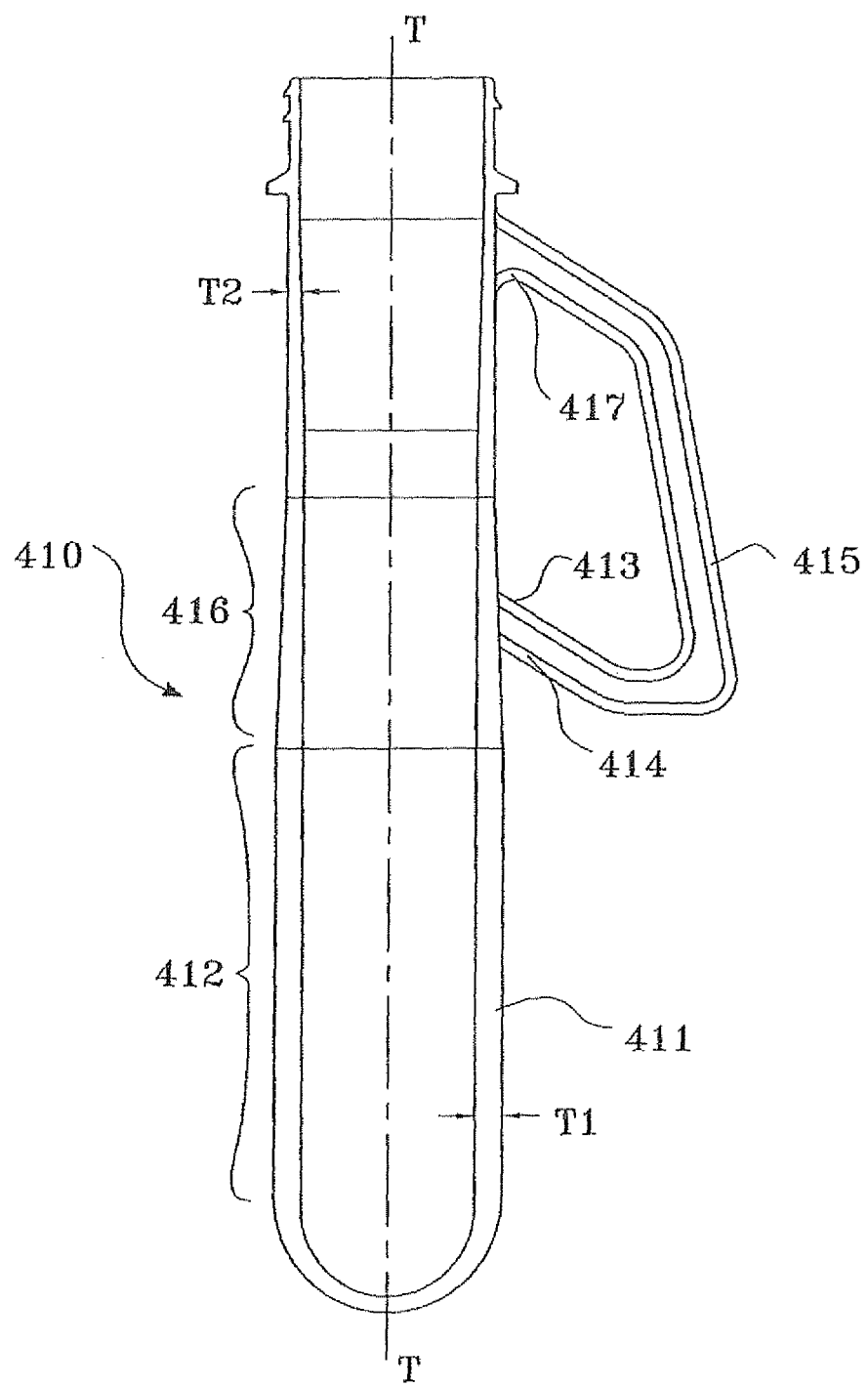
FIG. 48 is a side section view of a, preform having a multiple integral connection handle according to a further embodiment of the invention.
Figure 49:
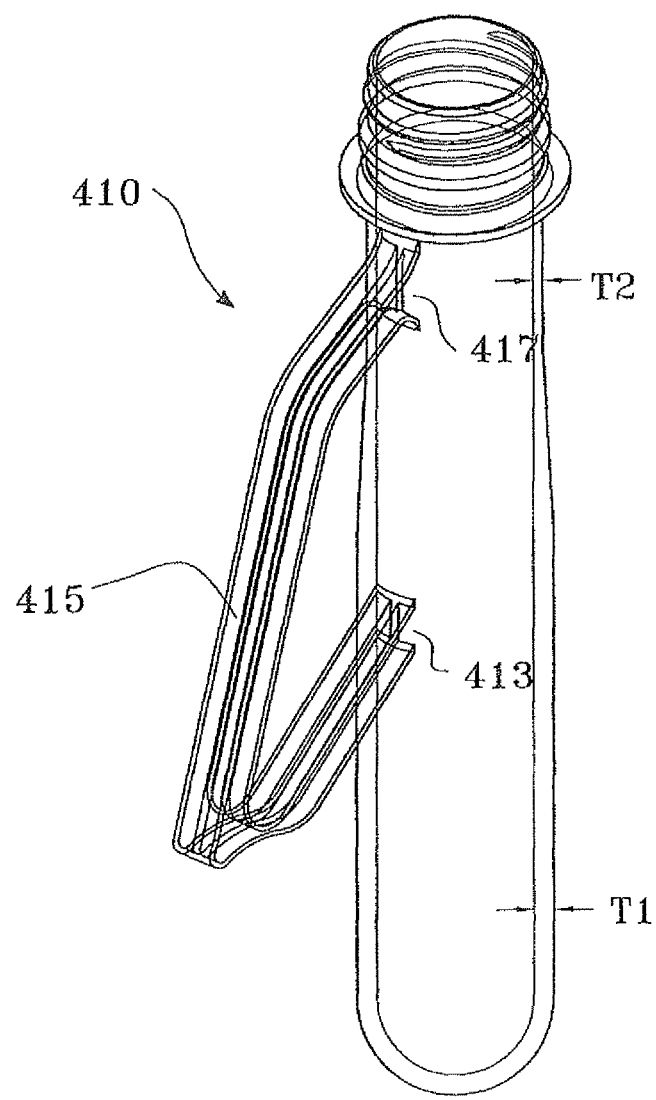
FIG. 49 is a perspective view of the preform of FIG. 48.

In this instance and with reference to FIG. 47 the loading of plastics material in the region of the wall 305 subtended between first location 307 and second location 309 can be differentially controlled as a function of location on the circumference of the wall 305 in this region designated the differential loading region 310 in FIG. 47.

In this particular instance there is an increased loading of material in the region of 310 immediately between the first location 307 and second location 309 whilst, the opposite region 311 located diametrically opposite region 310 has material removed from it as indicated in dotted outline.

Figure 45:
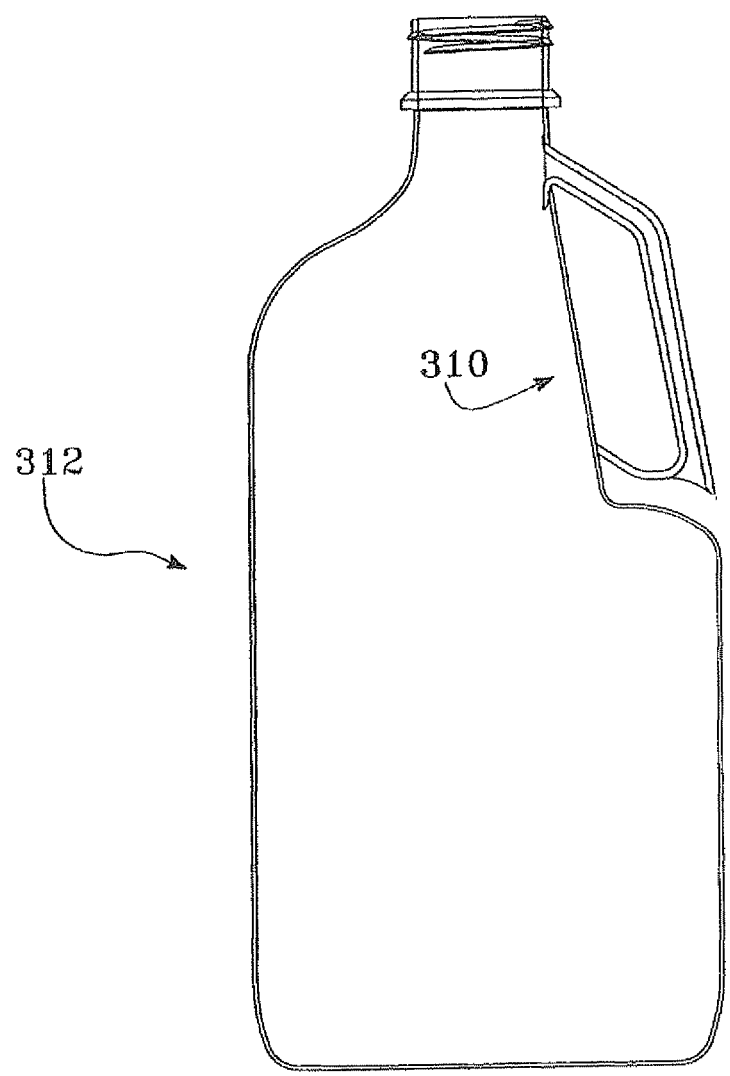
FIG. 45 is a side section view of the resulting container blown from the preform of FIG. 44.
Figure 46:
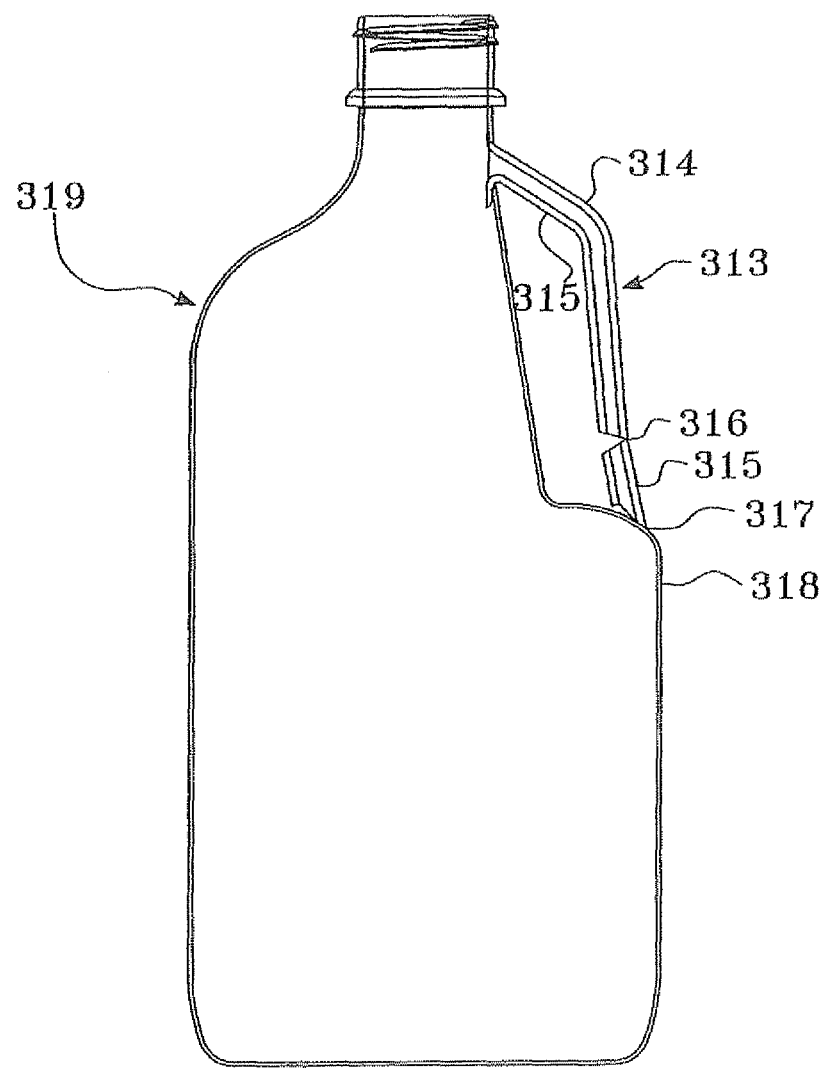
FIG. 46 is a side section view of an alternative embodiment of a container having a multiple integral connection handle.

Differential material loading as a function of circumferential position on wall 305 aids in providing control over the wall thickness of the blown container 312 illustrated in FIG. 45.

The container 312 can be blown in a two stage process utilizing the apparatus previously described in this specification and utilizing the shielding principals also described.

In this example the region 310 subtended between first location 307 and second location 309 remains substantially unchanged during the blowing process and can be considered an extension of and part of the next portion 302 of the preform 301.

FIG. 346 illustrates an alternative form of construction of a loop 313 which, in this instance, again comprises an elongate, stem-like structure including reinforcing ribs 314 but having, in this instance, a deflectable portion 315 which is connected on one side by a first bridge portion 316 to the balance of the loop 313 and, at its other end by a second bridge portion 317 integrally to container wall 318.

In this instance the second bridge portion 317 is akin in structure to the tag 203 previously described and provides a necessary element of flexibility. A first bridge portion 316 can be of the same kind of structure and, again, being integrally formed at the time that the preform is blown.

In use, during a second stage blowing of the container 319 it will be observed that the container wall 318 to which second bridge portion 317 is integrally connected moves during blowing and this movement is accommodated by deflection of deflectable portion 315, loop 313 about first bridge portion 316 and second bridge portion 317.

In production, utilizing the apparatus previously described, it is possible to move material differentially within a wall portion such as, for example, in the differential loading region 310 it is possible to cause the material closest to the inside of the container to move whilst leaving the material closest to the outside of the container essentially static relative to first location 307 and second location 309, thereby leaving the outside wall region stable during the second stage blowing step.

In production in a two stage machine it is important to have a heating tunnel of sufficient width to allow for rotation of the preforms with stem/loop protecting thereon. It is also important to have the ability to shield in a controllable manner the stem/loop portions of the preform during its pass through the heating tunnel and also the ability to selectively shield that region of the preform wall subtended between and beneath the stem/loop thereby to provide an important element of control over the heat profile throughout the preform immediately prior to its insertion into the mould cavity for the second stage blow moulding step.

In a particular form the heat shield can be attached to a mandrel and can pass into the mould cavity for retention therein during the second stage blowing step.

Whilst a single handle has been shown on embodiments described thus far it will be appreciated that more than one handle can be provided on a given container following the principals described in this specification.

A preform 410 according to a further embodiment of the invention is illustrated in side section view and, in this instance, includes a symmetrical thickening of the wall 411 of the preform 410 in the lower region 412 which extends from immediately below the point of connection 413 of the lower end 414 of handle 415. In a second, intermediate region 416 located between point of connection 413 and point of connection 417 of handle 415 the wall thickening of the preform 410 tapers gradually from first thickness T1 to second (thinner) thickness T2.

This thickening is symmetrical about the longitudinal axis TT of preform 410 and results in a controllable increase in the thickness of material in blown container 418 (refer FIG. 50) in the corresponding intermediate region 416, but also in a sub-region 419 immediately below point of connection 413 of the lower end of handle 414. It is postulated that the increased thickening of the blown container in the region 419 results from a flowing of the material from intermediate region 416 through to sub-region 419 during the second stage process of blow moulding, thereby to provide control over the wall thickness of material in the region 419 of the blown container 418.

Figure 51:
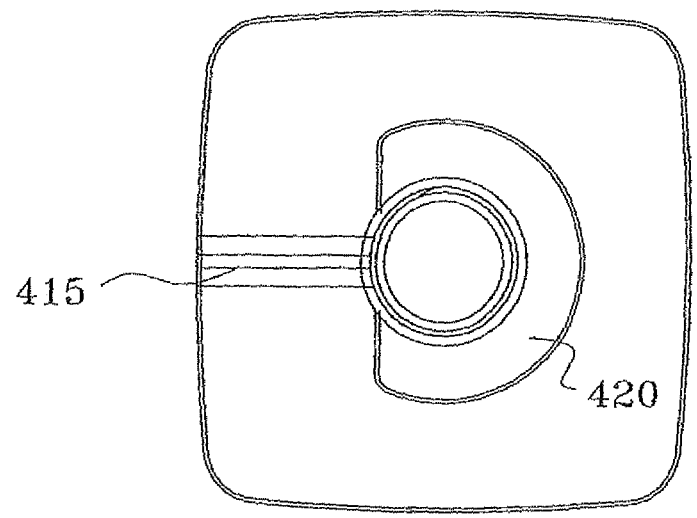
FIG. 51 is a top view of the container of FIG. 50.
Figure 52:
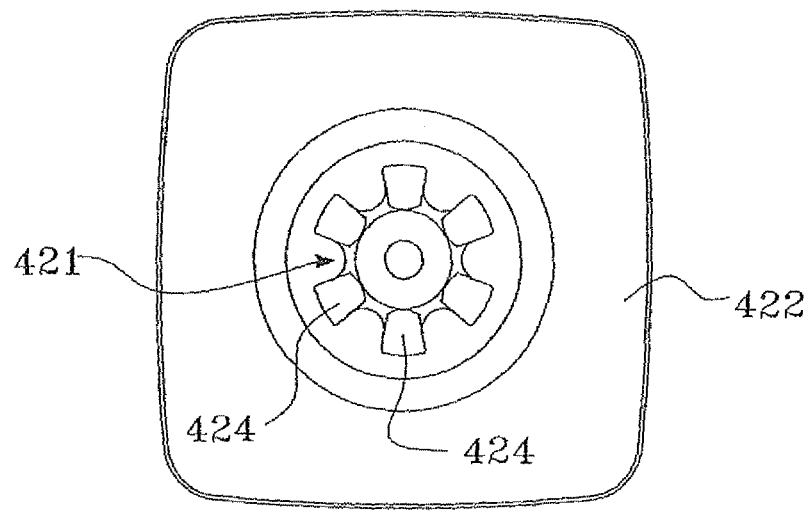
FIG. 52 is a bottom view of the container of FIG. 50.

FIGS. 51 and 52 provide alternative views of the blown container 418. FIG. 51 illustrates more clearly the anti-symmetric bulbous portion 420 which is offset about the longitudinal, axis TT with respect to handle 415.

FIG. 52 illustrates a star formation indentation 421 in base portion 422 of container 418. It comprises a central, circular indentation 423 from which subtend wedge shaped indentations 424 in a circular array as illustrated in both FIG. 50 and FIG. 52.

Figure 50:
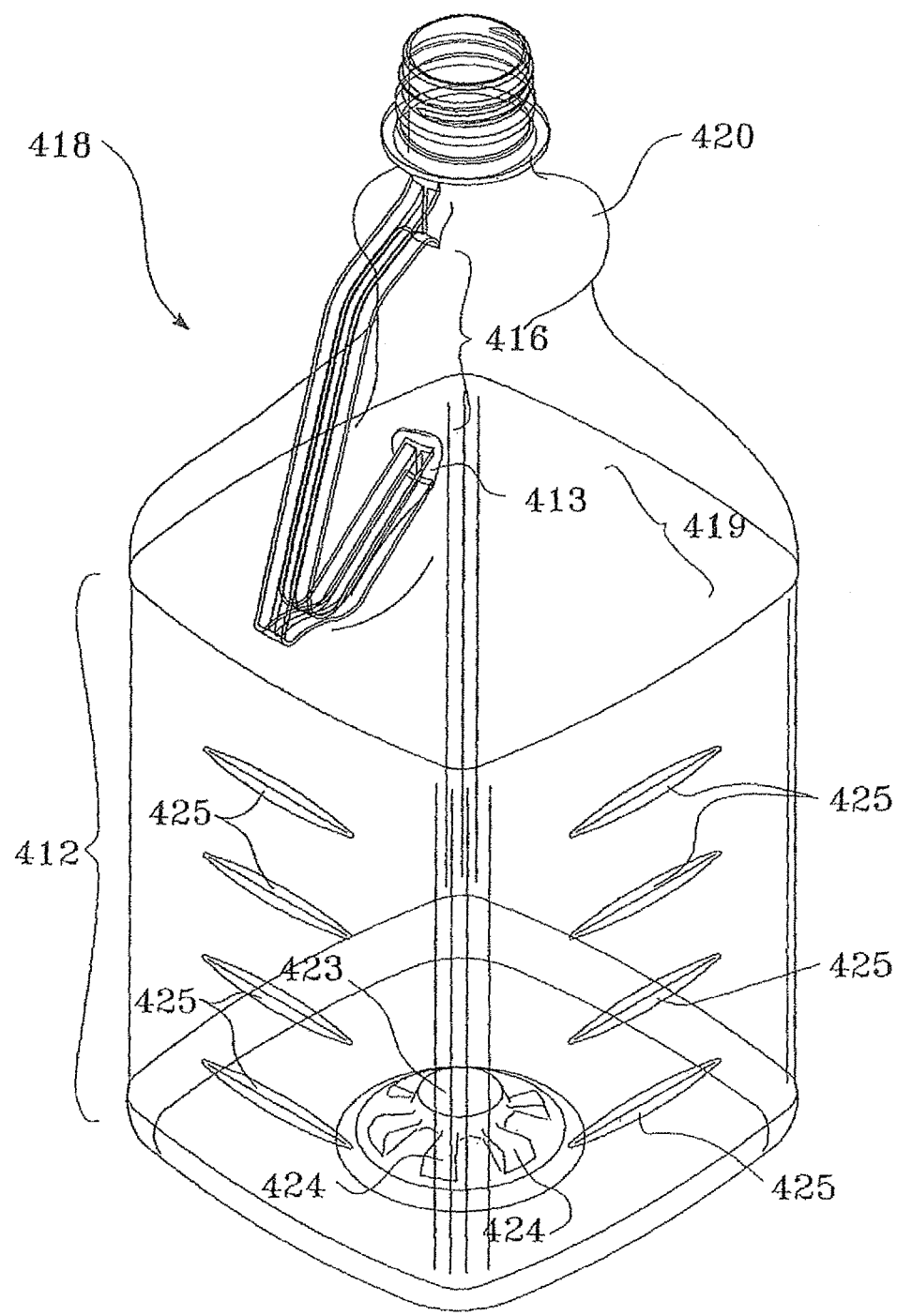
FIG. 50 is a perspective view of a container blown from the preform of FIG. 48.

In this instance container 418 also includes longitudinal indentations 425 in the walls of region 412 as illustrated in FIG. 50, thereby to increase the strength of the blown wall portions in this region.

Second Preferred Embodiments of Modified Two Stage Process

Figure 53:
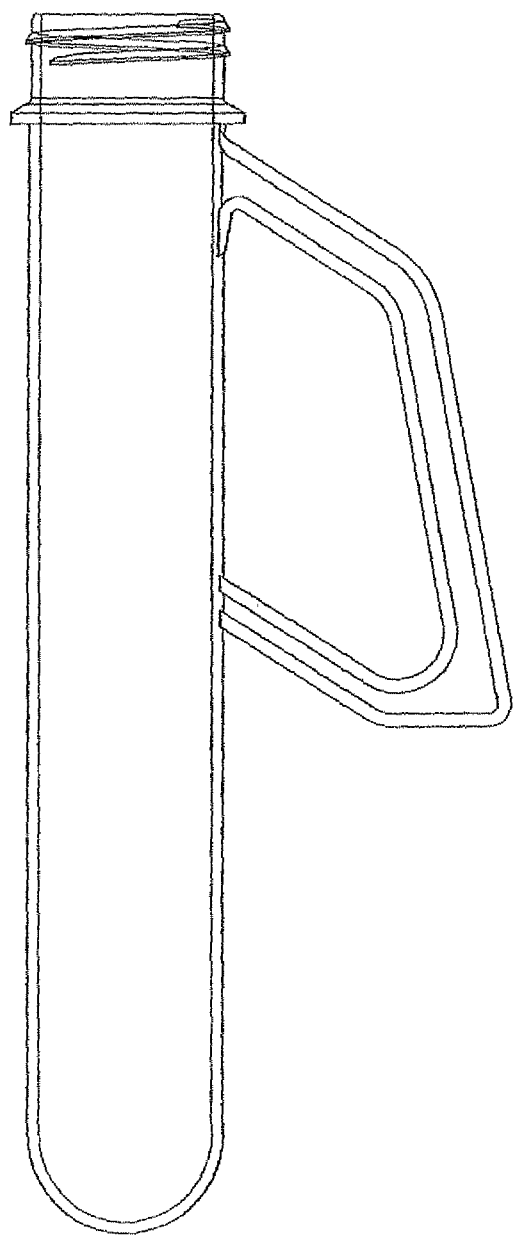
FIG. 53 is a side view of a preform utilised as stock in a stretch blow moulding machine according to an embodiment of the invention.
Figure 54:
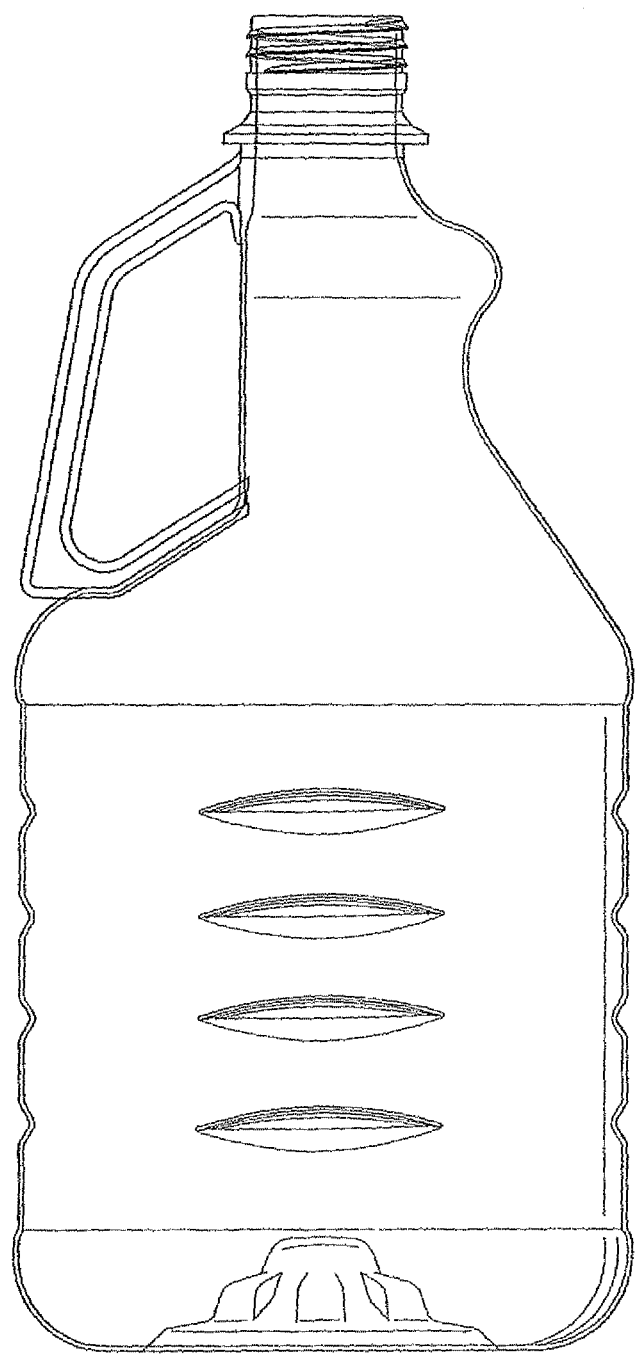
FIG. 54 is a side view of a container produced from the stock of FIG. 1 on the stretch blow moulding machine according to a first embodiment of the invention.
Figure 55:
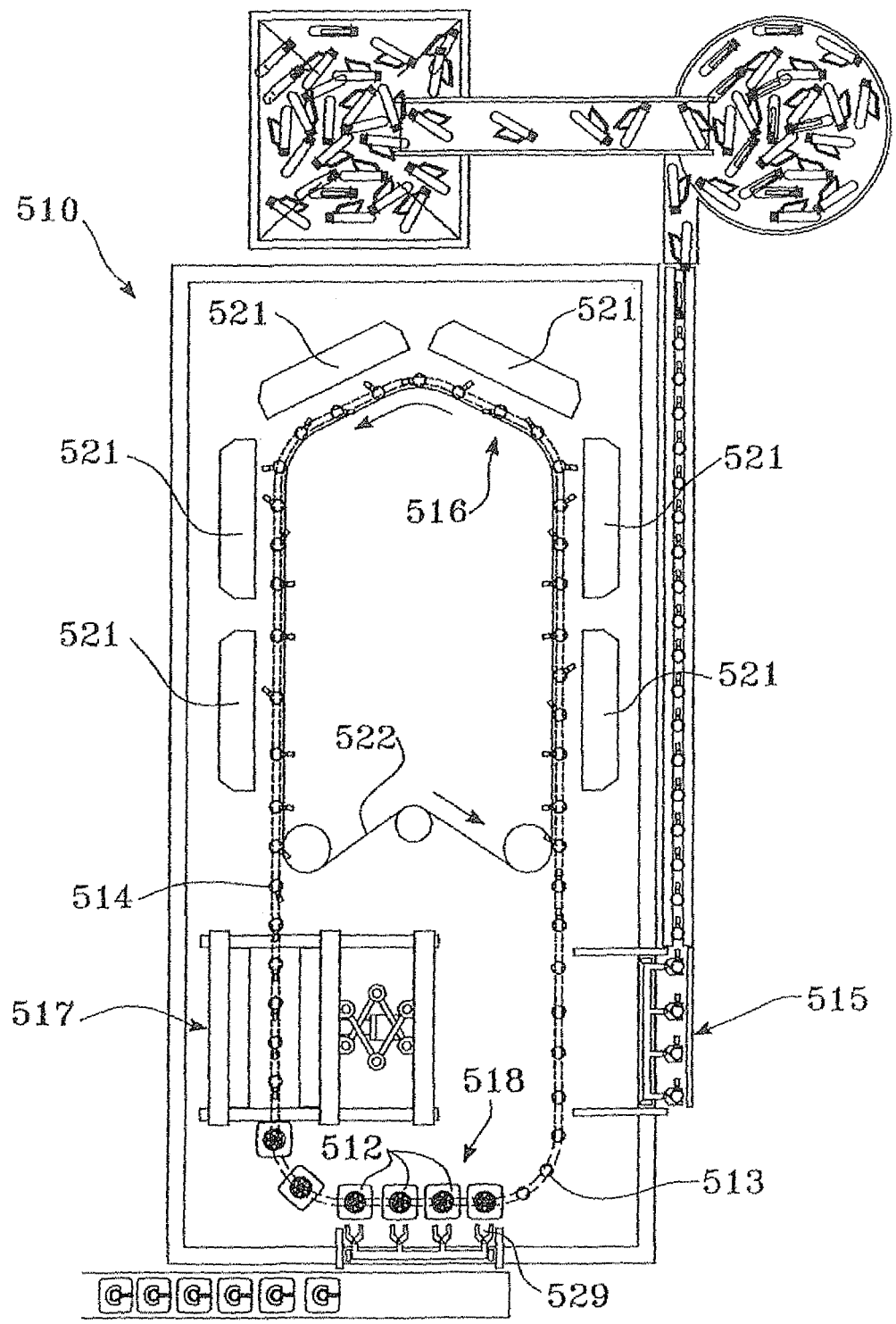
FIG. 55 is a plan view of a stretch blow moulding machine according to a first embodiment of the invention.

In accordance with a second series of preferred embodiments of the invention a stretch blow moulding machine 510 as illustrated in FIG. 55 is utilised to stretch blow mould a PET resin preform 511 as shown in FIG. 53 so as to produce an integral handle container 512 as illustrated in FIG. 54. The preform 511 and resultant container 512 are of a type illustrated in and described in co-pending patent applications to the same applicant including PCT/AU98/01039.

First Preferred Embodiment of a Second Stage of a Two-Stage Process

In one preferred form, a stretch blow moulding machine 510 of FIG. 55 includes a chain drive transport mechanism 513 which has a plurality of mandrels 514 mounted thereon at substantially equally spaced intervals, such that each mandrel follows a generally oval path through various processing stations on the machine 510.

A preform 511 mounted on a mandrel 514 proceeds from loading station 515 to heating station 516 to stretch blow moulding station 517 and thence to unloading station 18.

Figure 56:
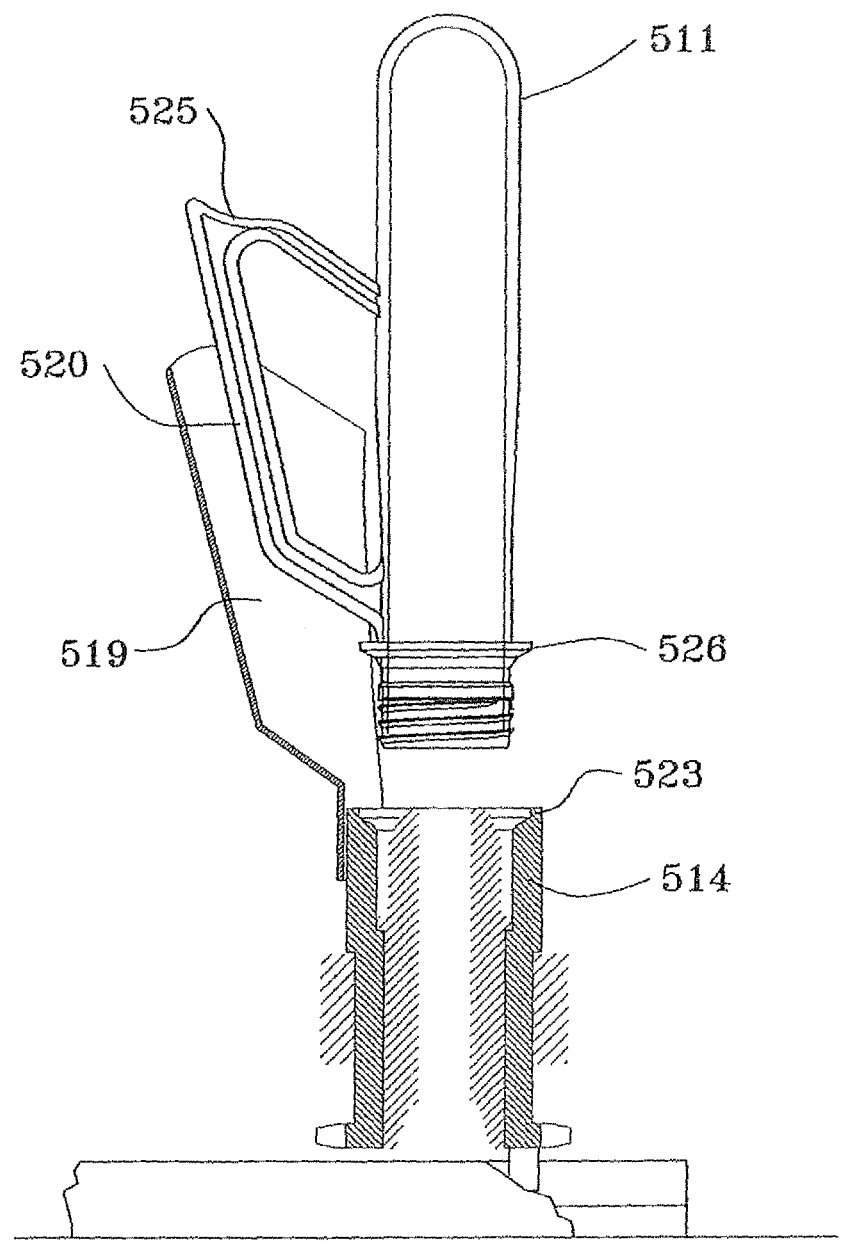
FIG. 56 is a side view of the preform of FIG. 53 being loaded onto a transport mandrel having a nesting shield for transport through the machine of FIG. 55.
Figure 57:
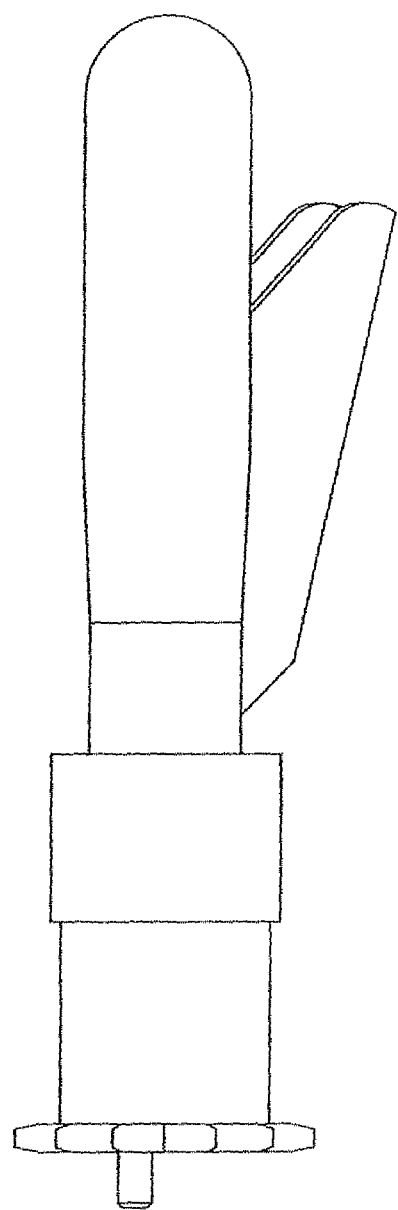
FIG. 57 is a side view of the assembly of FIG. 56 passing through a heating phase on the machine of FIG. 3.
Figure 58:
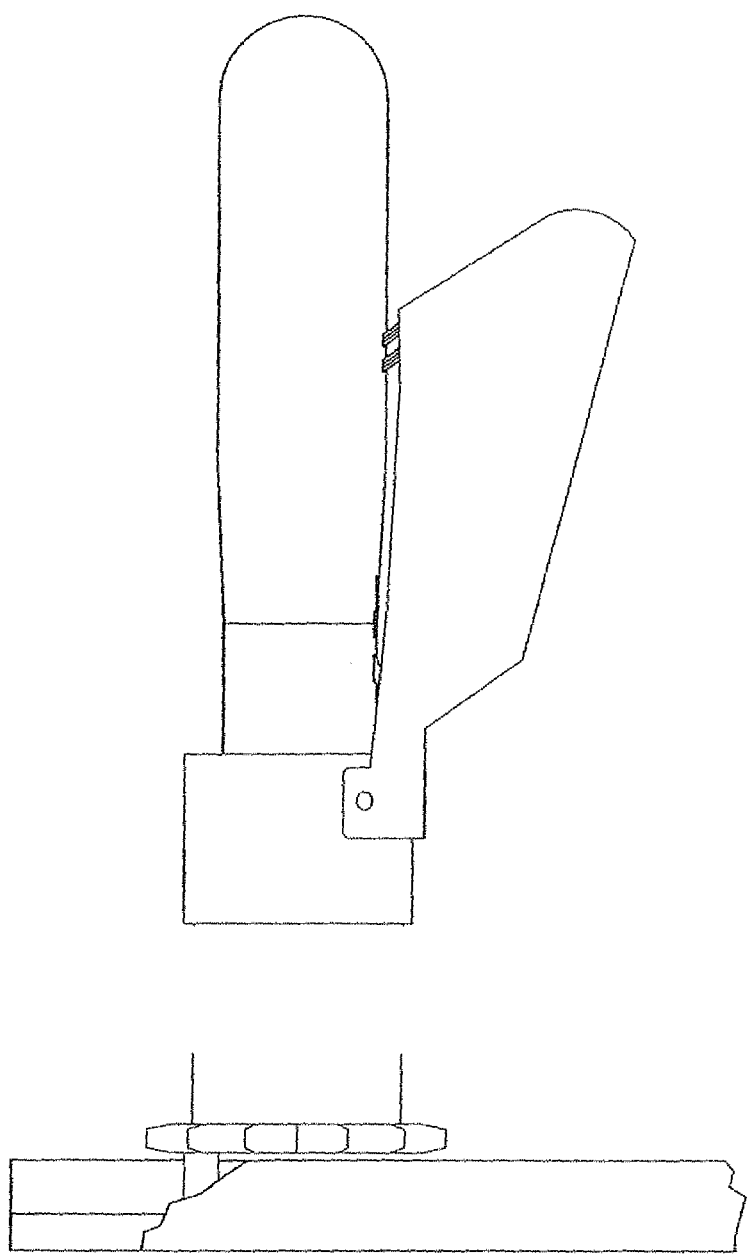
FIG. 58 is a side view of the assembly of FIG. 56 being aligned prior to entry into a die on the machine of FIG. 3.
Figure 59:
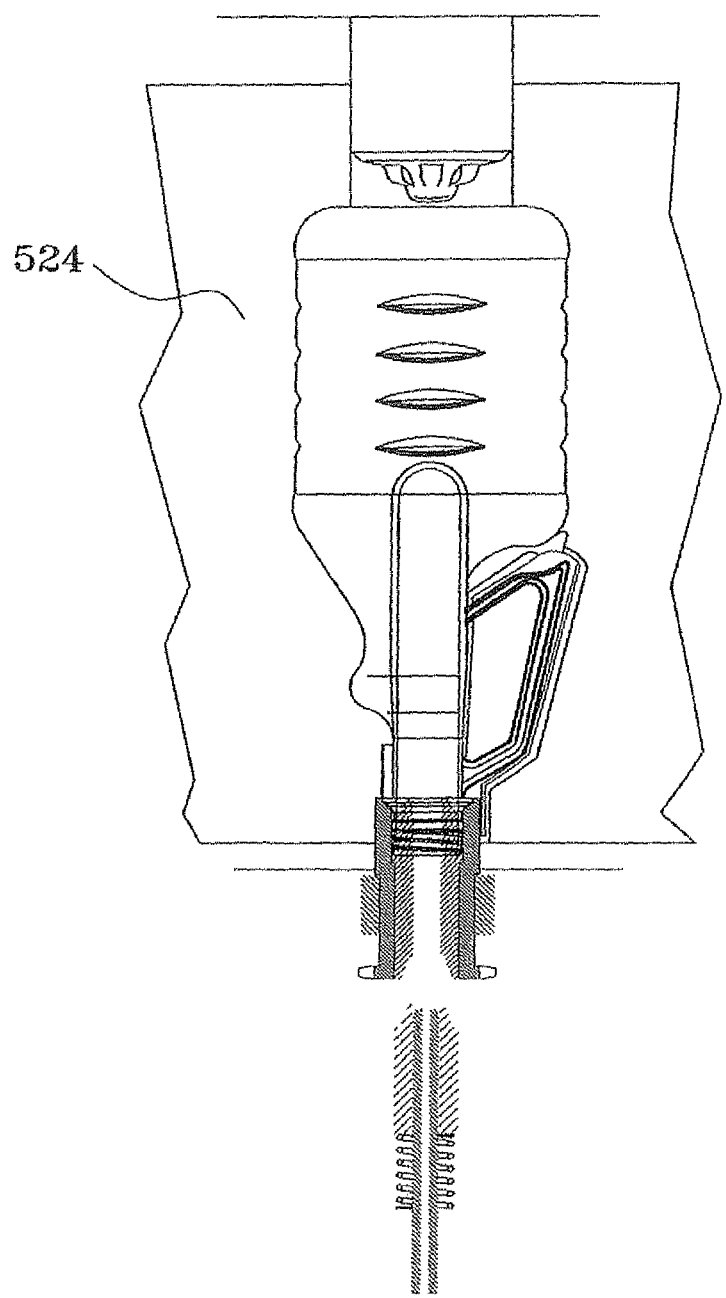
FIG. 59 is a side view of the assembly of FIG. 56 in an initial position within a die on the machine of FIG. 3.
Figure 60:
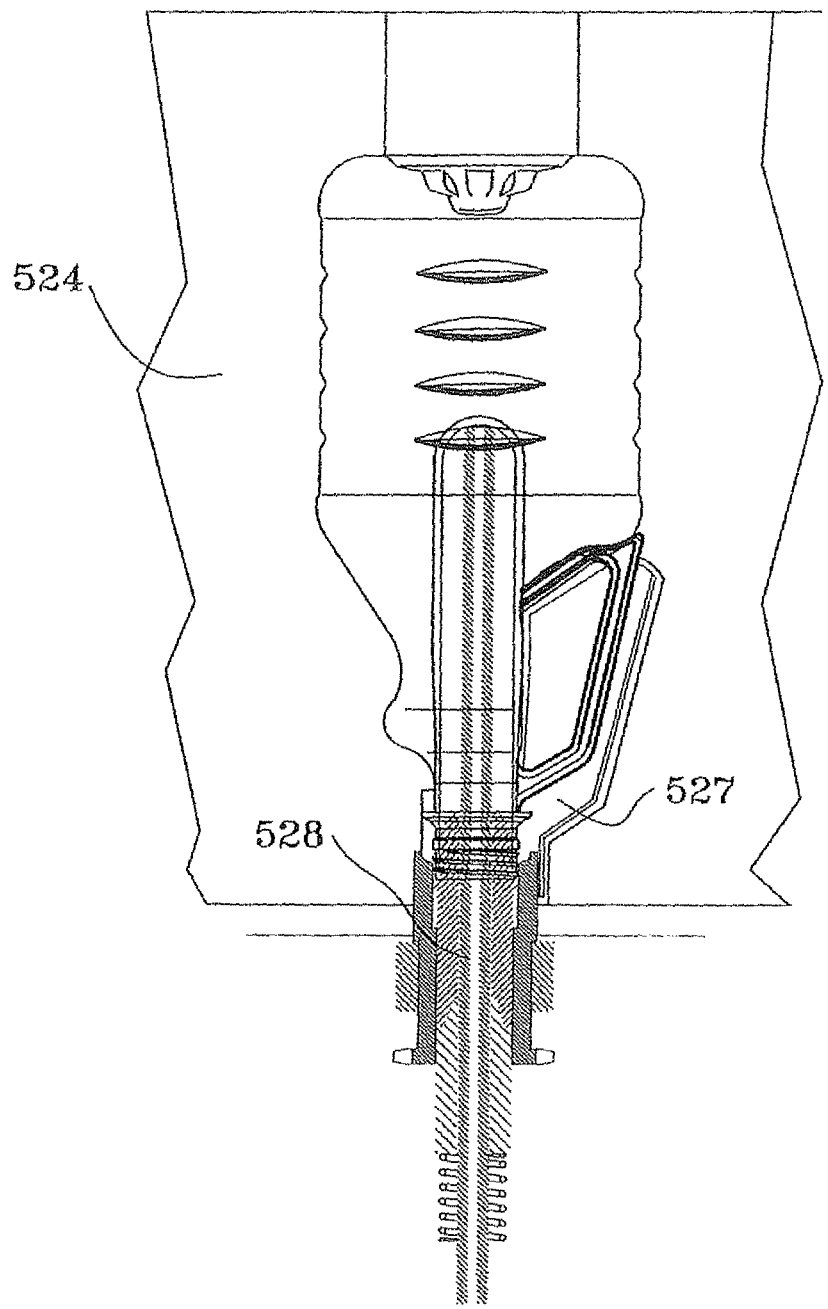
FIG. 60 is a side view of the assembly of FIG. 56 in a blow moulding position within the die of FIG. 59.
Figure 61:
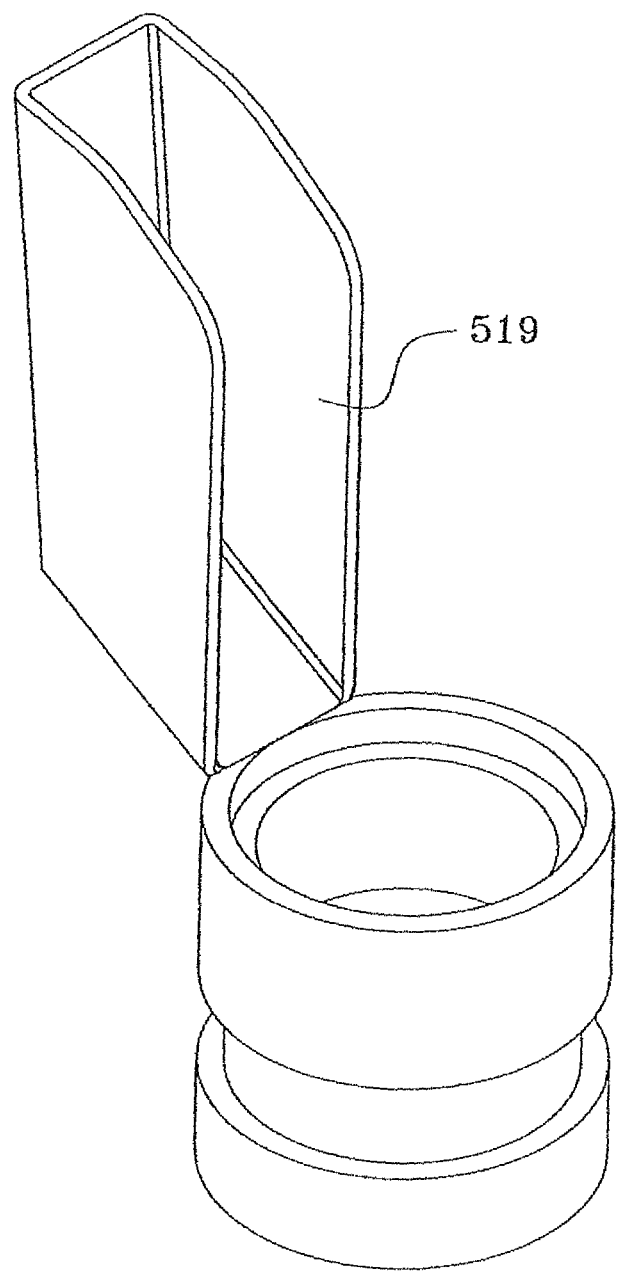
FIG. 61 is a perspective view of the shield of the assembly of FIG. 56.

As illustrated in FIG. 56 through to 60 each mandrel 514 includes a nesting shield 519, a perspective view of which is shown in FIG. 61.

The nesting shield 519 is adapted to receive within it handle stem portion 520 of preform 511 for the purpose of shielding handle stem portion 520 against heat imparted by radiant heaters 521 as the preform is transported through the heating station 516 in the direction indicated by the arrow in FIG. 55.

As the preforms 511 are transported through the heating station 516 they are rotated on mandrels 514 by second chain drive 522 acting on a toothed peripheral portion (not shown) of each mandrel 514. Rotation of the mandrels 514 is effected by reason of the speed of rotation of chain transport drive mechanism 513 being different from the speed of rotation of second chain drive 522.

At the time of entry into blow moulding station 517 each preform 511 is raised proud of top portion 523 of mandrel 514 in order to permit engagement of cavity portions of die halves 524 around base step portion 525 of handled step portion 520 and preform neck ring 526.

It is to be noted that the die halves 524 include indentation 527 adapted to receive nesting shield 519 therewithin when the die halves 524 have come together thereby to house and protect the nesting shield 519 against damage during the blow moulding stage. During blow moulding the preform 511 is biaxially stretched by stretch rod 528 and the injection of gas (not shown) into the interior of the preform 511 whereby it conforms to the shape of the mould cavity to form container 512.

The die halves 524 then open and chain drive transport mechanism 513, temporarily stopped during the blow moulding process is caused to rotate again so as to present blown containers 512 at unloading station 518 for removal therefrom by forks 529.

Figure 62:
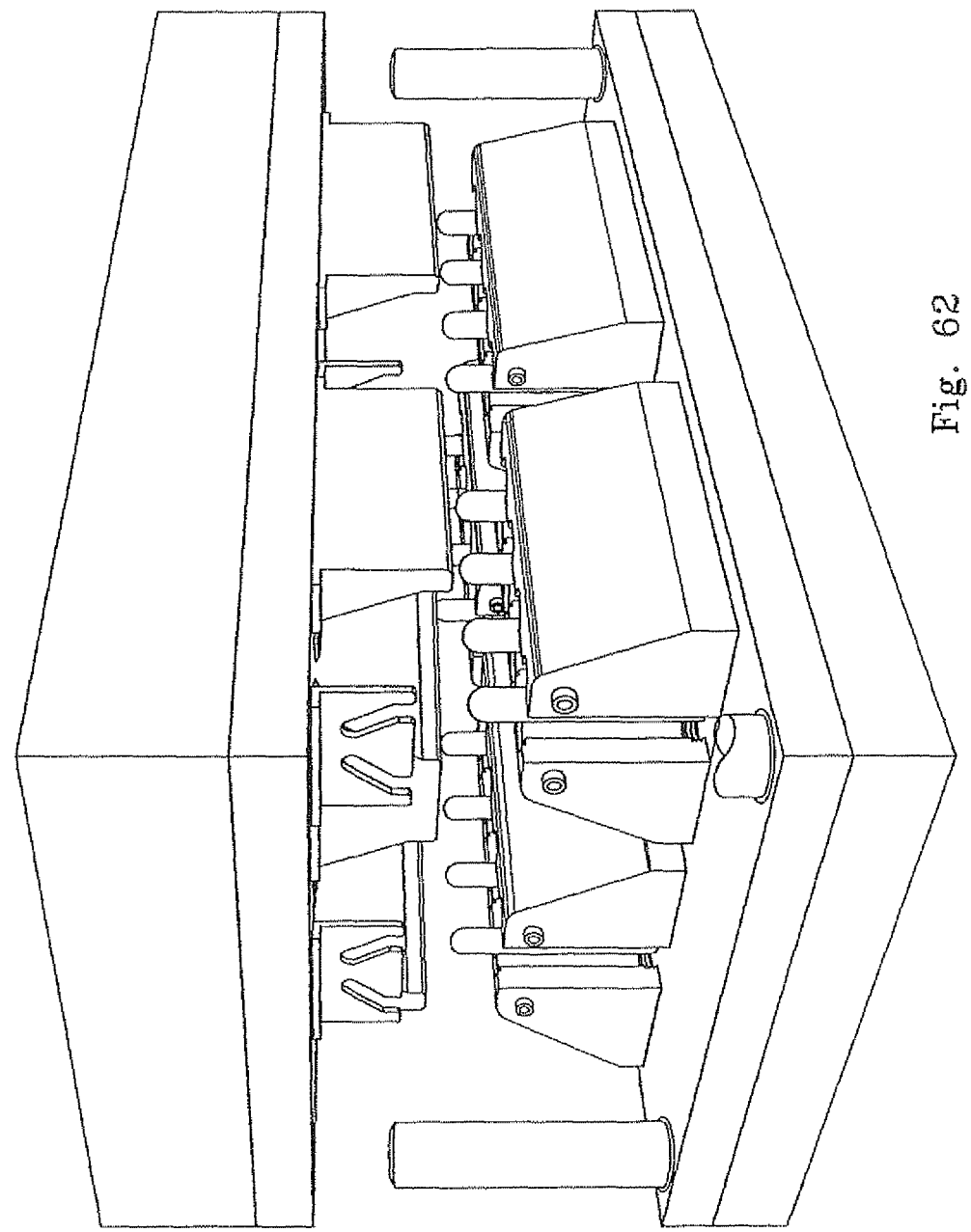
FIG. 62 is a perspective view of a 16 cavity preform mould suitable for injection moulding preforms in a first stage of a modified two stage process.
Figure 63:
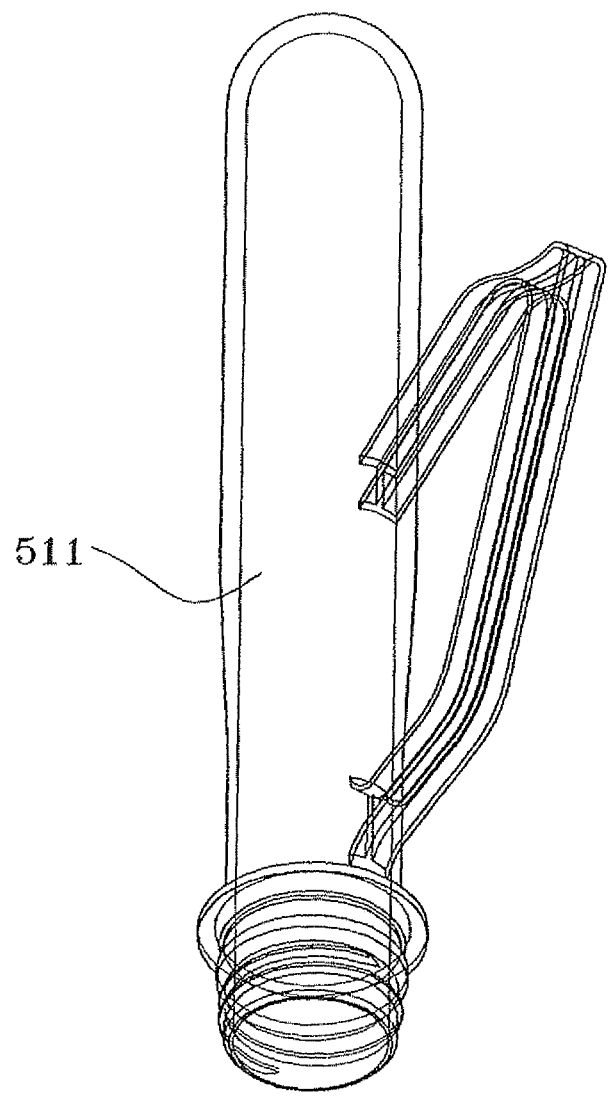
FIG. 63 is a perspective view of a preform produced by the mould of FIG. 62.
Figure 64:
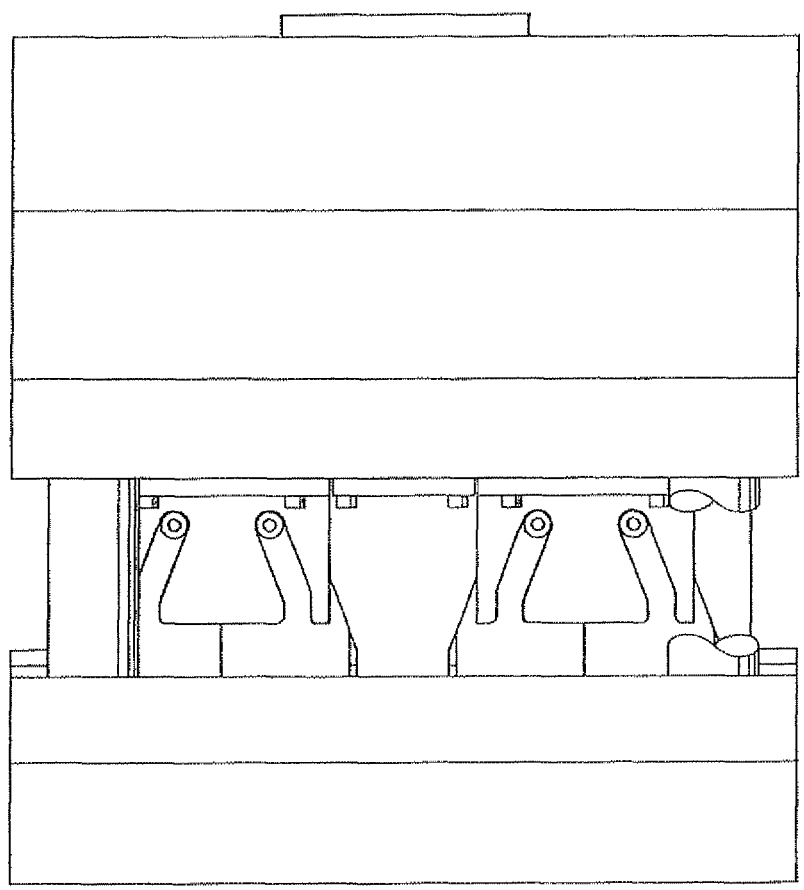
FIG. 64 is an end view of the mould of FIG. 62 in substantially closed position.
Figure 65:
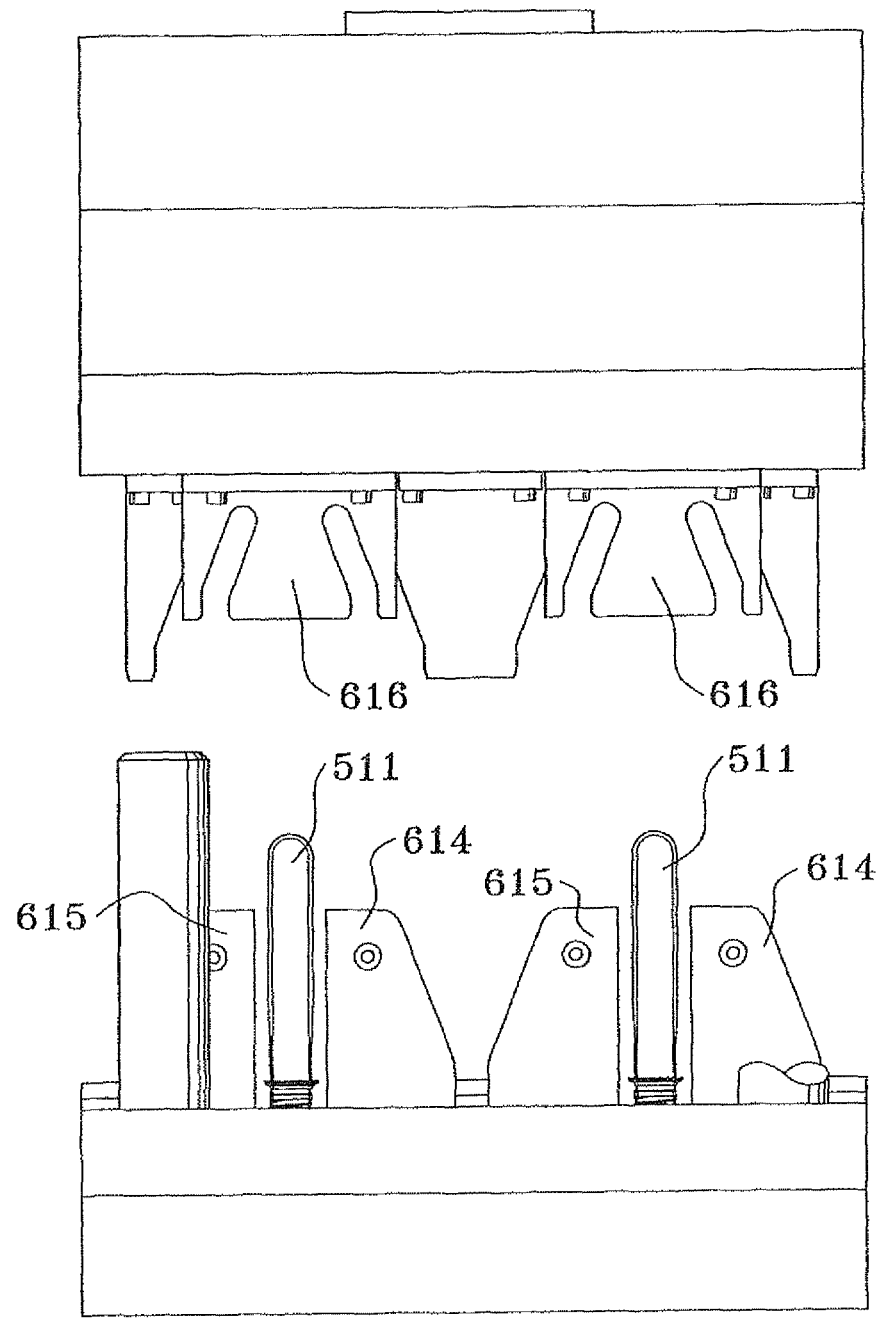
FIG. 65 is an end view of the mould of FIG. 62 in substantially open position.
Figure 66:
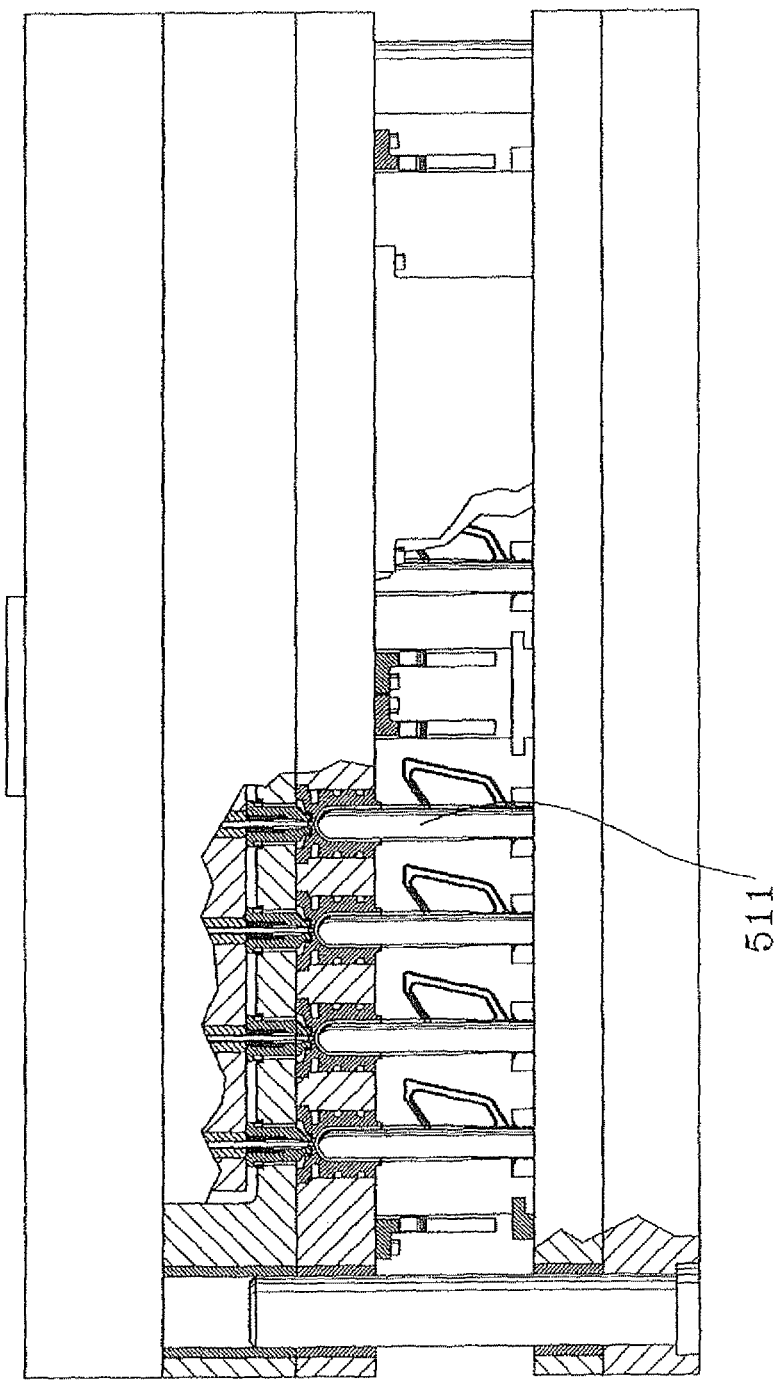
FIG. 66 is a side view, partially cut away of the mould of FIG. 62.
Figure 67:
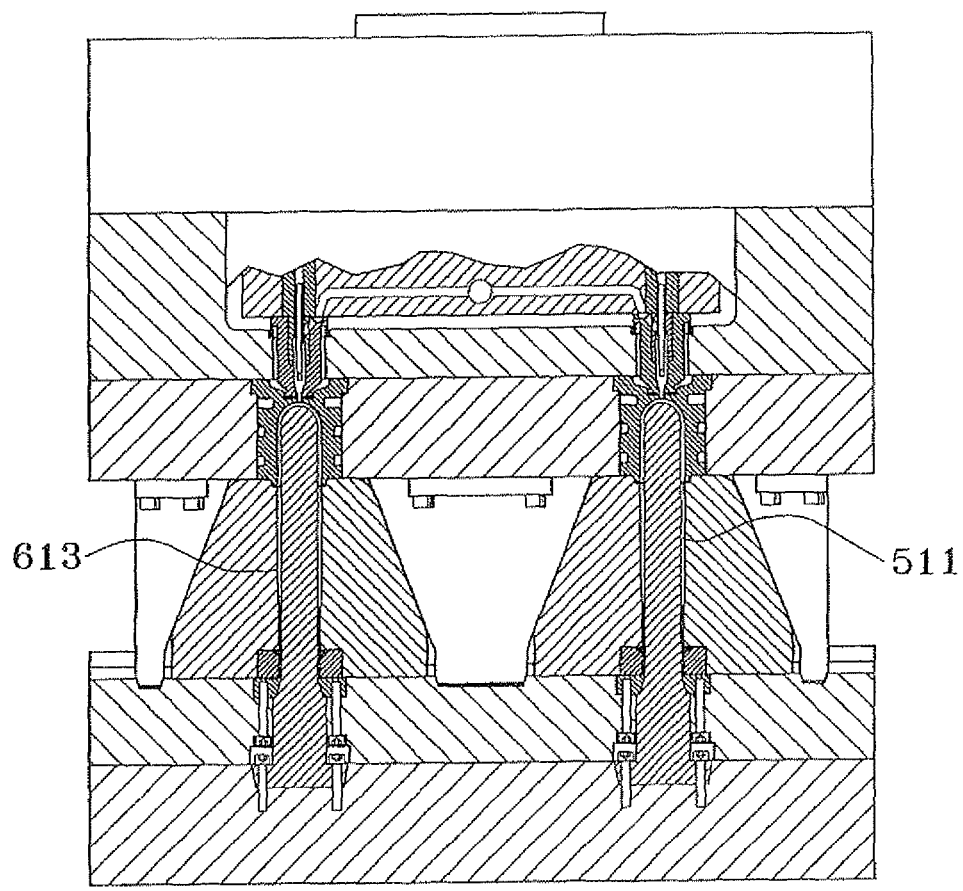
FIG. 67 is an end, partially cut away view of the mould of FIG. 62.
Figure 68:
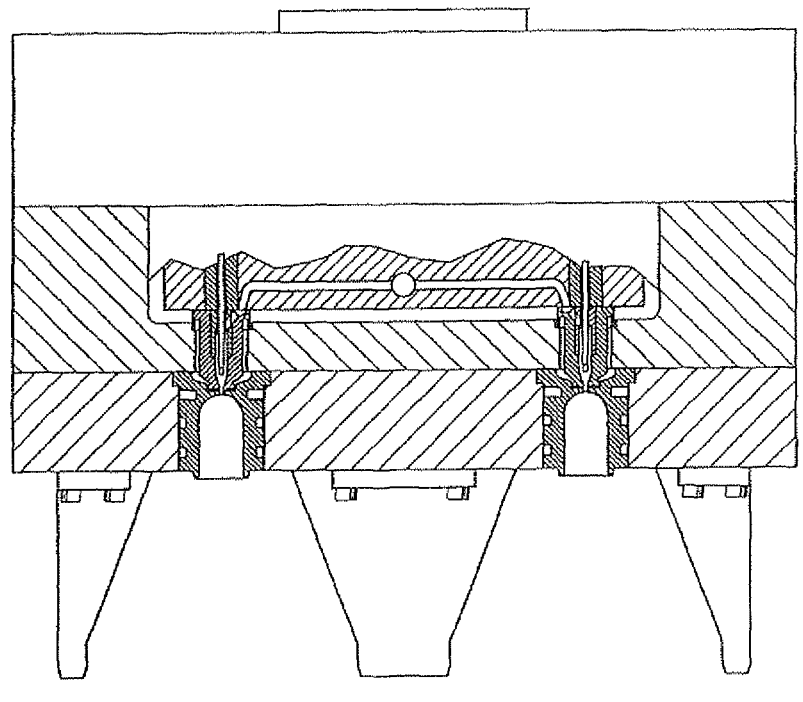
FIG. 68 is an end, partially cut away view of the mould of FIG. 62 in substantially open condition.
Figure 68:
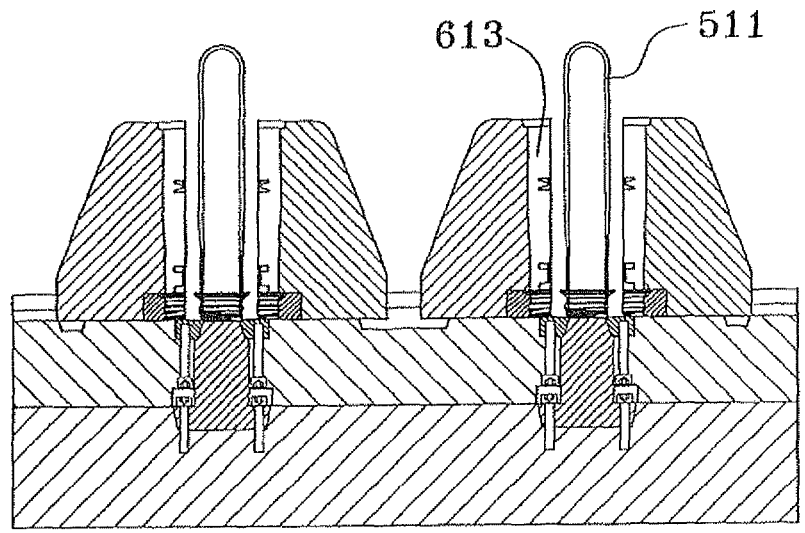
Figure 69:
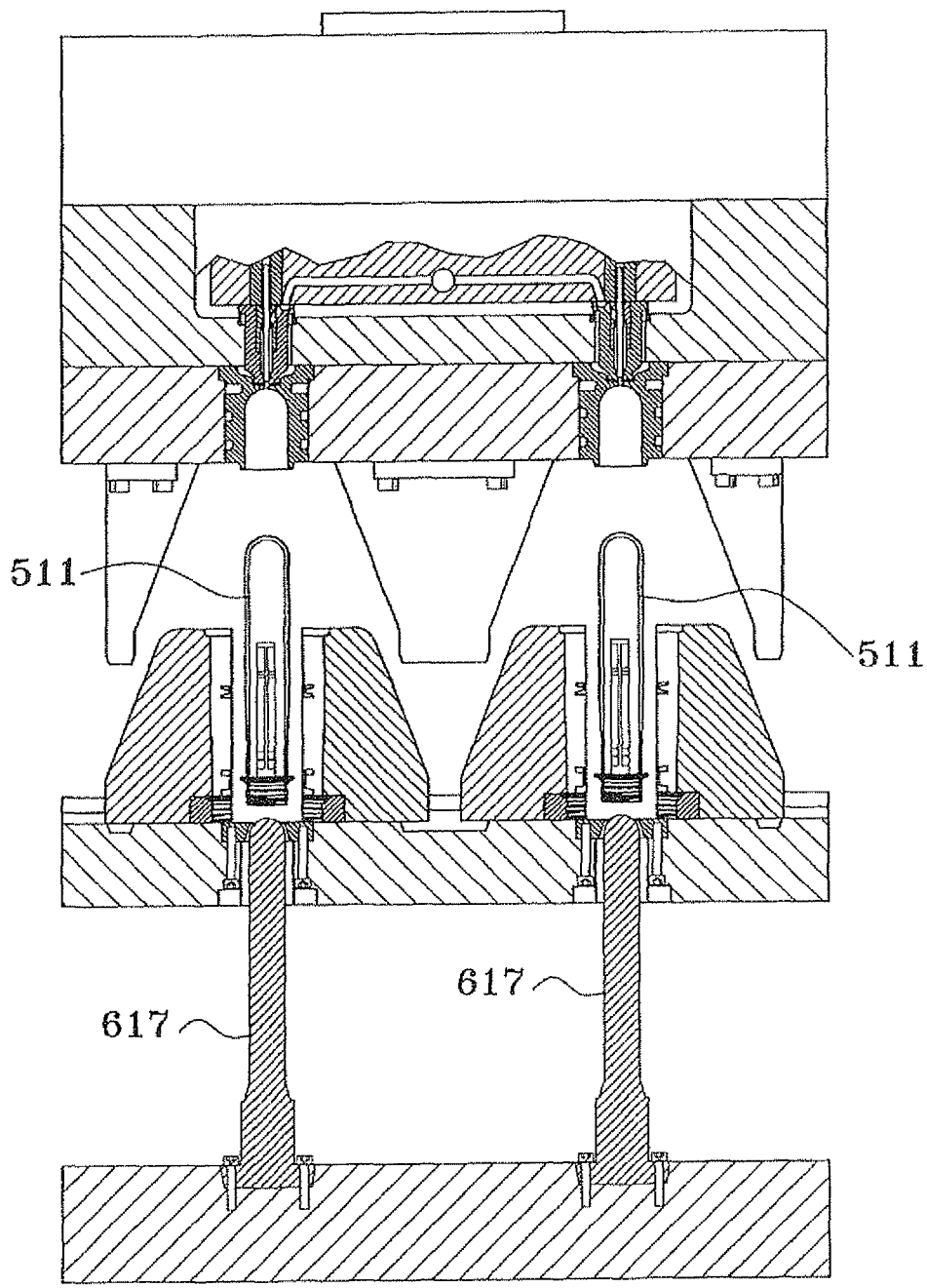
FIG. 69 is an end view of the mould of FIG. 62 showing a preform injection operation.
Figure 71:
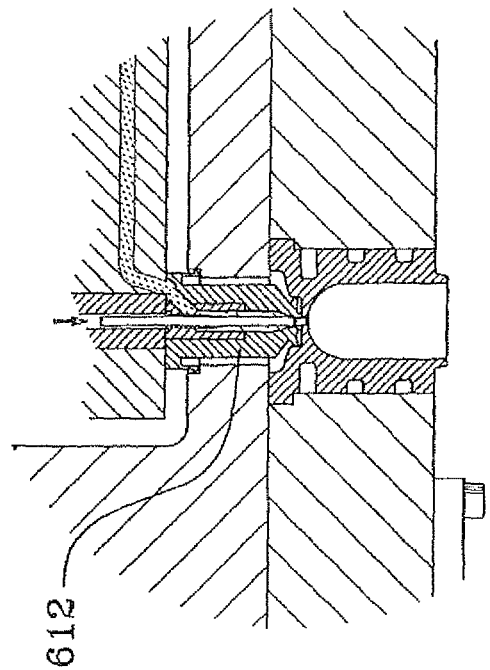
FIG. 71 illustrates the injector nozzle arrangement of in a shut off condition.
Figure 70:
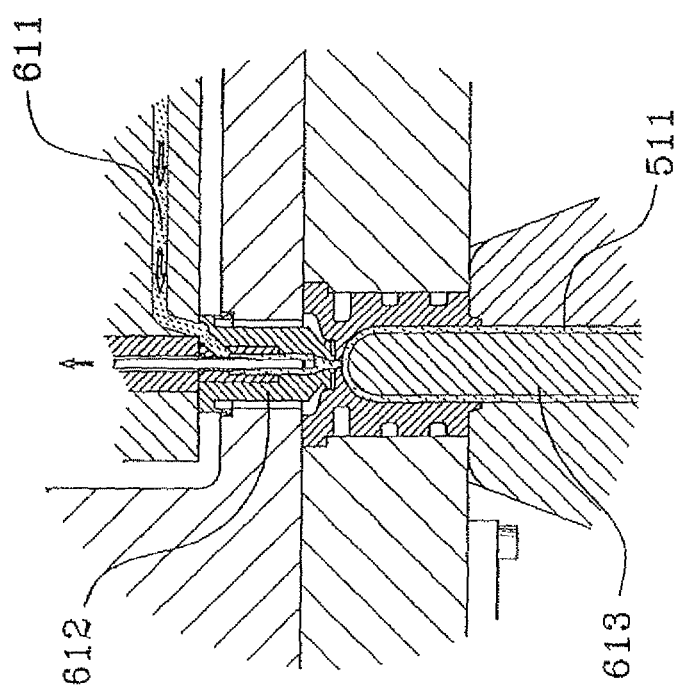
FIG. 70 illustrates detail of injector nozzles of the preform unit of FIG. 62.

With reference to FIG. 62 there is shown a perspective view of a 16 cavity preform mould 610 adapted to be seated in an injection moulding machine (now shown) which injects PET 611 (or like orientable plastics material) through injection nozzles 612 (refer FIGS. 70, 71) into preform shaped cavities 613 formed when the dye is in closed condition, as best seen in FIGS. 66 and 67. The dye cavity is then opened causing the splits 614, 615 to be forced apart by cams 616 thereby permitting ejection of the handled preforms when sliding cause 617 are withdrawn, as best seen in FIG. 69.

The injection stage typically takes between 45 seconds and one minute on a 500 tonne injection machine allowing the production of 16 preforms at one time during this time period.

In accordance with the modified two stage process the preforms 511, after ejection, are allowed to cool and cure for at least 6 hours before placement in the blow moulding machine described and shown with reference to FIGS. 55 to 61. Ideally the preforms are allowed to cool to room temperature during this time and, most preferably, are allowed to cure for at least 24 hours prior to introduction to the blow moulding machine in order to ensure consistency of structure of the preforms and, hence, consistency of blowing in the critical second stage.

A typical production rate for the blow moulder described in FIG. 55 onwards is of the order of 1500-2000 blown containers per hour thus matching the production rate of the 16 cavity preform mould.

Second Preferred Embodiment of a Second Stage of a Two-Stage Process

With reference to FIGS. 72 to 77, in a further example of a second stage 700 of a two-stage process, previously injection moulded preforms 712 proceed through the following stages:

2. handle orientation,
3. transfer to transport support,
4. rotation through heat conditioning,
5. blow-moulding.

Handle Orientation

Figure 76:
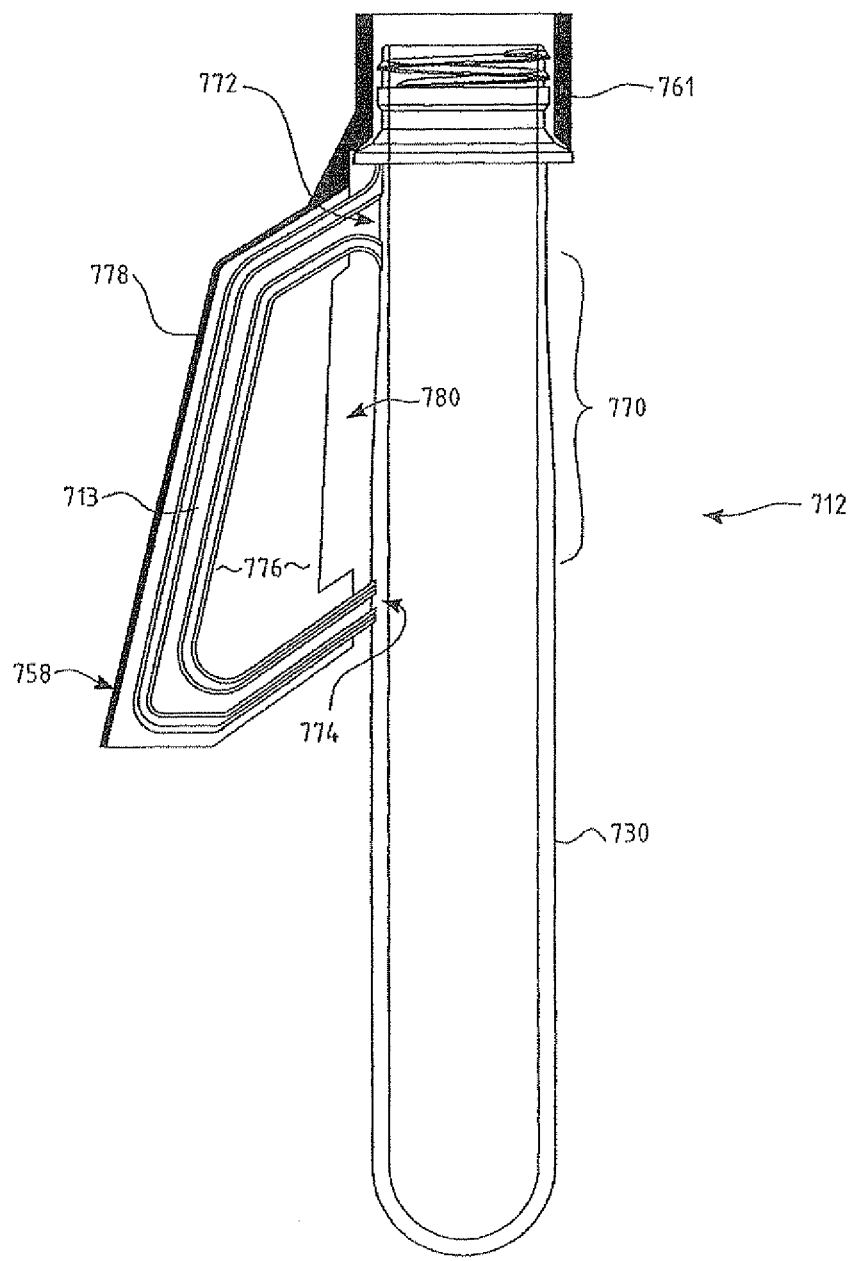
FIG. 76 is an enlarged sectioned side view of the preform and heat shield arrangement of FIG. 75.

The body portion 730 of preforms 712 must be heated to the required degree of plasticity so that the material in the body 730 of the preform can be bi-axially oriented in the stretch-blow-moulding process. However, neither the neck portion 729 nor the handle 713, should be subjected to bi-axial stretch blow moulding and must be shielded from excessive heat during the heating stage to prevent their crystallization with consequent loss of strength. Thus for transport through the heating stage 718, the handle 713 of the preform 712 is protected by a shield 758, and the neck portion 729 by a cylindrical socket 761, as shown in FIG. 76.

The orientation of the handle must be controlled at a point prior to the entry of the preform into the heating stage to enable the heat protective shield 758 to be correctly fitted over the handle 713 of a preform 712. Furthermore, it is essential that each preform 712 is presented to the moulding tool 720 with the handle correctly oriented so that the handle is correctly enclosed in the halves of the mould when this closes for the blowing stage.

Figure 72:
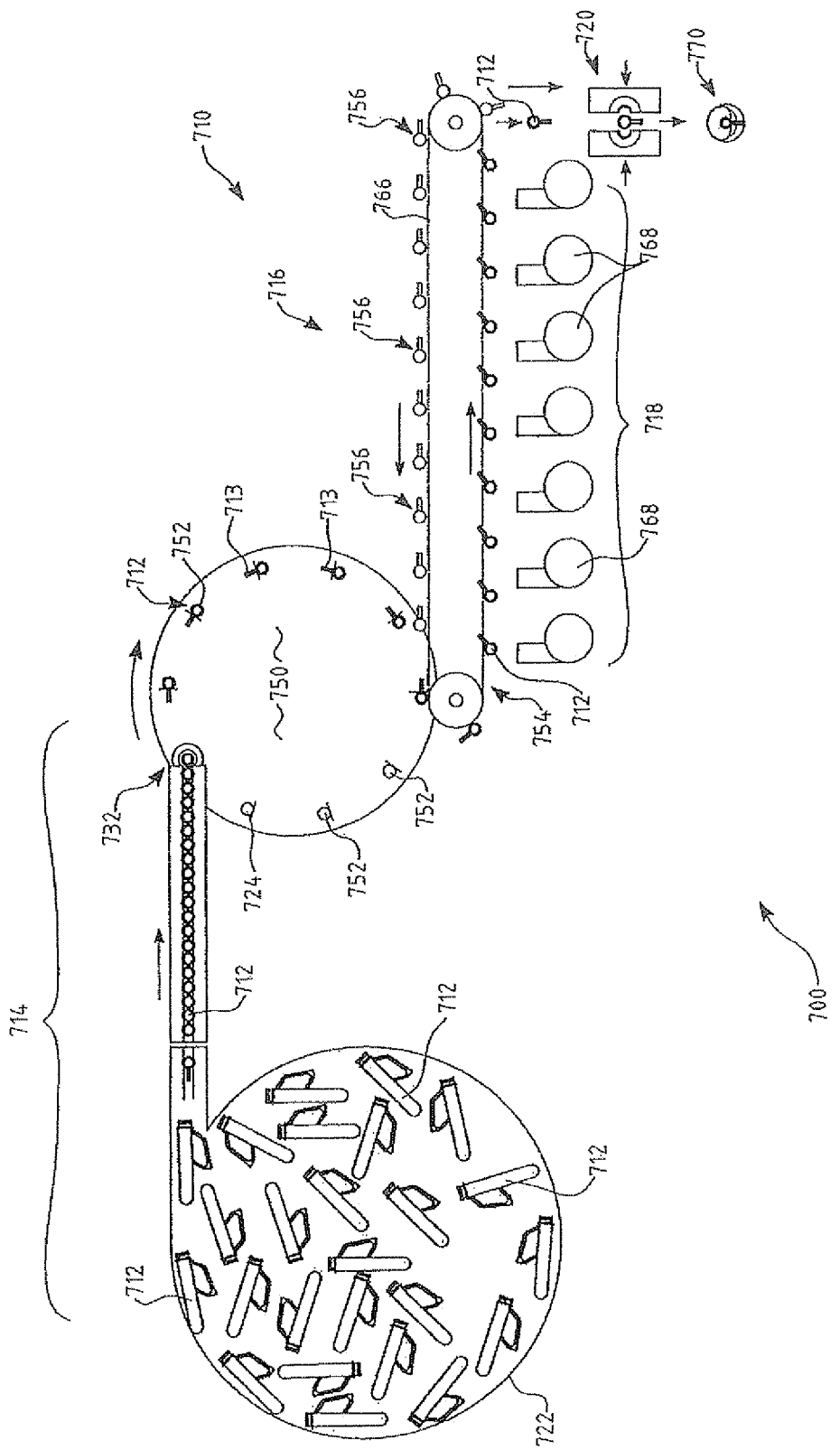
FIG. 72 is a schematic plan view of a stretch blow moulding machine of a two stage process.
Figure 73:
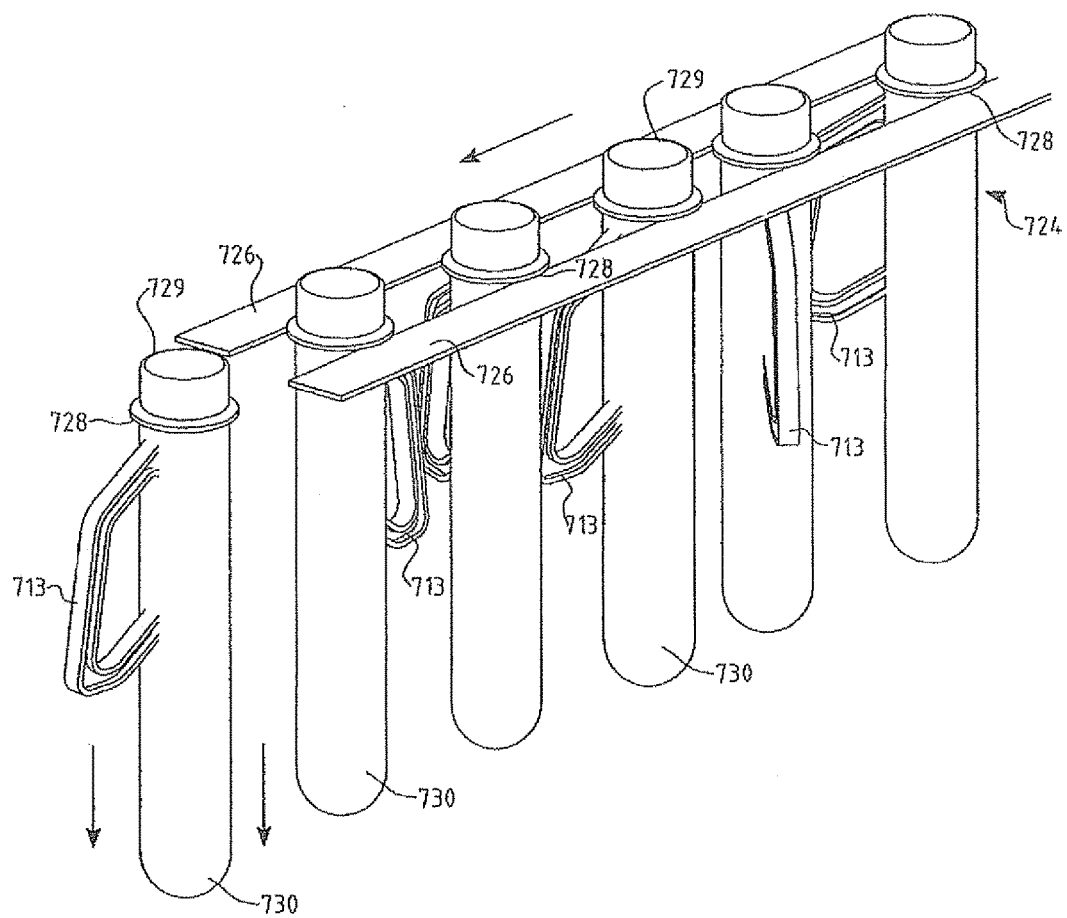
FIG. 73 is a perspective detail view of a preform handle orienting apparatus.
Figure 73:
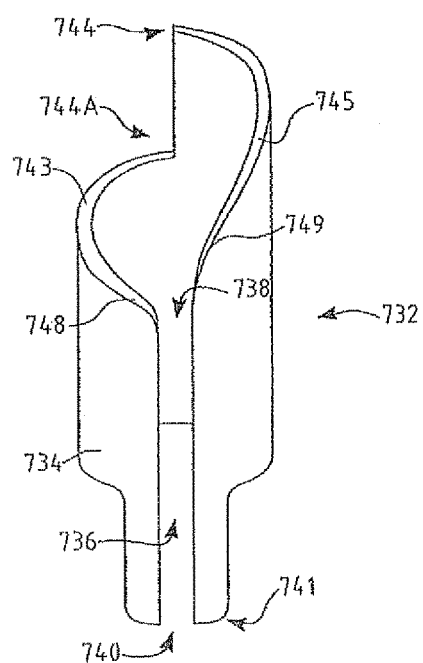

With reference to FIGS. 72 and 73, in one preferred form, preforms 712 are fed from a suitable supply source, such as for example a hopper or a vibratory bowl 722 to an infeed rail 724 at loading station 714. Infeed rail 724 is arranged so that preforms 712 progress along rail 724, either by gravity, vibration or other linear transporting means, supported between parallel rail elements 725 and 726 at the underside of locating ring 728, as shown in FIG. 73.

The orientation of the handles 713 of the preforms during transport along infeed rail 724, is preferably controlled by a guiding channel (not shown) to loosely constrain the handles from assuming an orientation approaching, or at right angles to the direction of travel. Preforms 712 are thus constrained to proceed along infeed rail 724 either with the handle 713 pointing generally forward of the body 730 or trailing it. An escapement (not shown) at the end of infeed rail 724 provides for control of sequential discharge of individual preforms 712 from the end of the rail.

Figure 74:
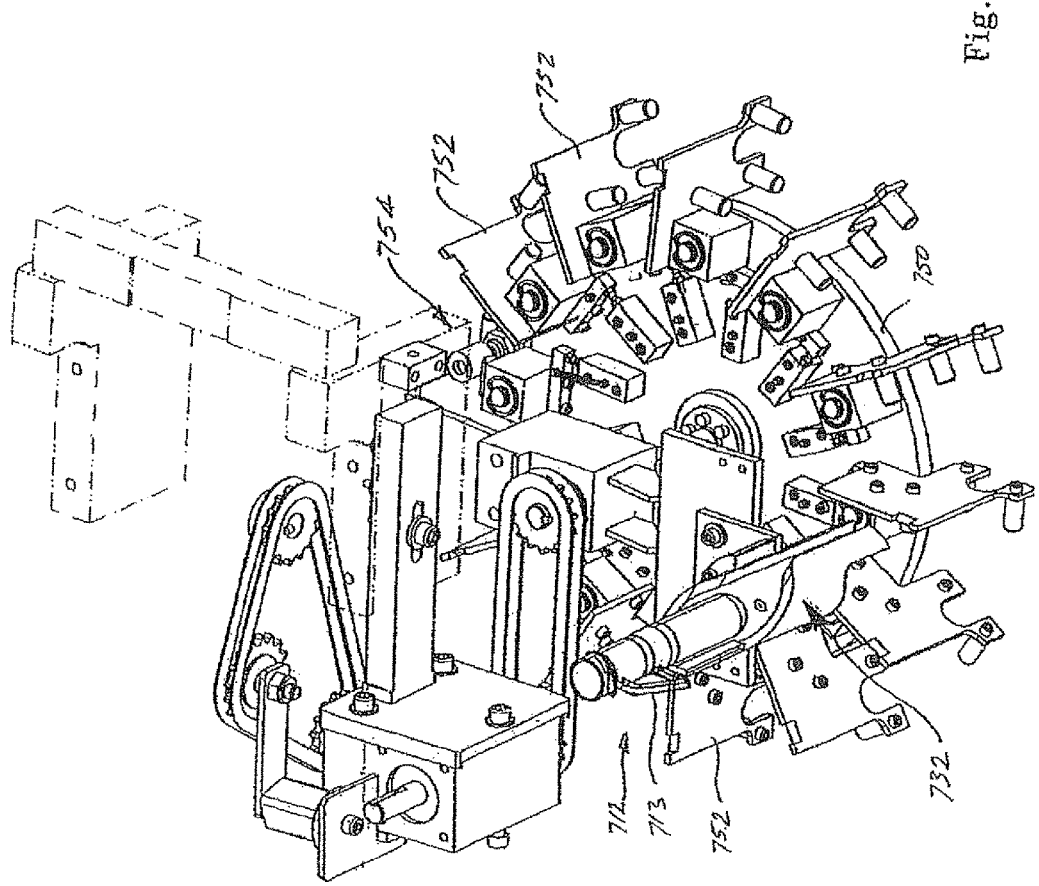
FIG. 74 is a perspective view of an indexing table for transferring oriented preforms to the mandrels of a preheating stage transport system.

As shown in FIGS. 73 and 74, preforms thus released from infeed rail 724, are allowed to drop vertically into an orienting apparatus 732 fixed directly below the end of infeed rail 724. In a preferred form, the orienting apparatus 732 shown in FIG. 73 consists of a truncated cylindrical sleeve 734 which has an internal diameter adapted to allow free sliding passage of the cylindrical body 730 of the preform and locating ring 728. The wall of the sleeve 734 is provided with a slit 736 extending the length of the sleeve 734 from a handle inlet opening 738 at the upper edge 749 of the sleeve 734, to a handle outlet, opening 740 at the lower edge 741. The slit is of sufficient width to allow sliding passage of the handle 713 of a preform 712.

The upper edges 745 and 743 of sleeve 734 are formed to guide a handle 713 into the slit 736. For this purpose the upper edges 745 and 743 are formed to slope steeply from respective high points 744 and 744A diametrically opposite the handle inlet, down to the handle inlet opening 738 of slit 736. To ensure that the handle does not fall onto and become lodged on the highest points on upper edges 743 and 745, the infeed rail 724 is arranged approximately at right angles to the radial position of slit 736. Thus handles 713 which, as described above are prevented from assuming this orientation while conducted along the infeed rail 724, cannot contact the upper edges 743 and 745 at the highest points, but will rather drop onto the orienting device with the handle contacting either sloping upper edge 743 or 745.

Sloping edges 743 and 745 slope down to respective sides of the slit 736, from the highest points 744 and 744A, ending in respective smoothly rounded corners 748 and 749 at the handle inlet opening 738. The slope is sufficient to ensure that the handle 713 of the preform 712 slides along the sloping edge sections.

A preform 712 falling into the apparatus 732 with a handle 713 not aligned with slit 736 will, as the handle makes contact with either sloping section 743 or 745, be rotated as it slides down under its own weight, until handle 713 is aligned with slit 736 and the preform 712 falls cleanly through the apparatus.

Transfer to Transport System and Heating Stage

FIG. 74 shows a section of the handle orientation and transfer to the heating stage of one preferred form of a blow moulding machine. As described above, a preform 712 is shown falling into the orienting apparatus 732.

Arranged immediately below apparatus 732 is an indexing table 750 provided around its periphery with a number of equally spaced nests 752, so situated that each successive nest 752 comes to an aligned position with the axis of apparatus 732 at each indexing of the table 750. Nests 752 are adapted to receive a preform 712 and retain it in such a way that the orientation of the handle 713 initially imposed by apparatus 732 is maintained relative to each nest 752 for the duration of the preform's retention in the nest. (Note all the nests shown in FIG. 74 are empty.)

Figure 75:
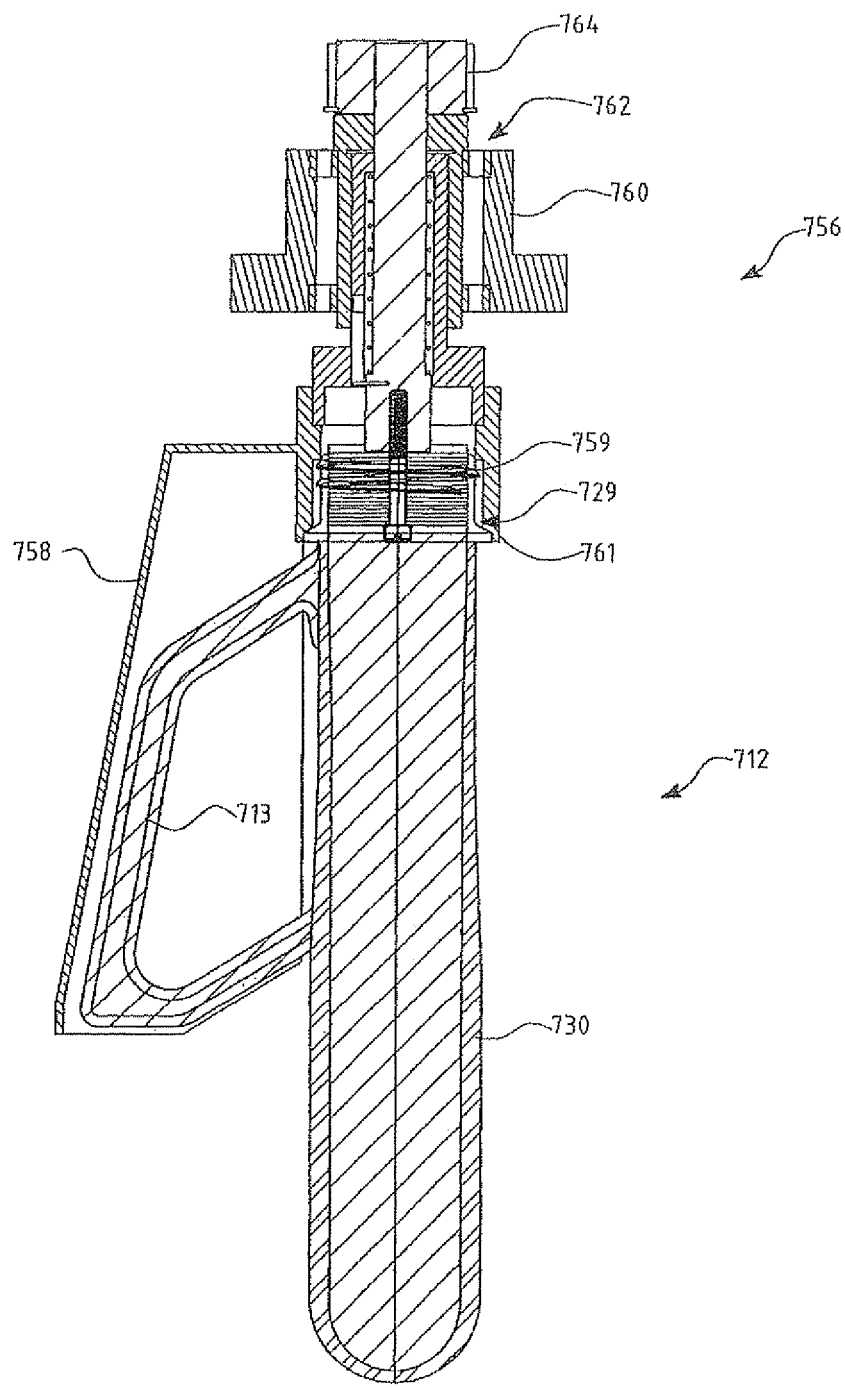
FIG. 75 is a sectioned view of an oriented preform attached to a mandrel of the preheating stage transport system with the preform handle located in a heat shield.

When, with the indexing of the table 750, a preform 712 reaches a transfer station 754, the preform is ejected upwardly out of the nest 752 in which it was supported, to engage with one of a series of mandrels 756 of the preform transport system 716, operating between the loading station 714 and the blow-moulding tool 720. A preferred mandrel arrangement with a preform attached is shown in FIG. 75.

When inserted into the mandrel, the open neck 729 of the preform 712 is pushed over a resilient plug 759 located in a cylindrical socket 761 at the base of the mandrel. The plug 759 enters the open neck as an interference fit sufficient for the weight of the preform 712 to be supported within the socket 761. The socket also acts to shield the neck 729 from excessive heat during the heating stage.

Heating Stage

The proper preparatory heating of a preform 712 is critical to the subsequent stretch blow moulding stage. The necessity to shield the handle 713 of the preforms of the present invention complicates the correct distribution of the heat energy applied to the preform and requires careful design of the heat shield 758 and the arrangement of the heating elements.

FIG. 76 is a more detailed sectioned view of a preform 712 fitted with a heat shield 758. The mandrel 756 and retaining means for supporting the preform are not shown in this view for clarity. It will be noticed that the shield 758 for the handle 713 of the preform 712 is carefully shaped to protect the handle 713 yet allow heat energy from the heating elements (shown in FIG. 77) to reach that region 770 of the body 730 of the preform lying between the upper and lower attachment points 772 and 774 of the handle 713. The heat shield 758 comprises side portions 776 (only one is visible in the sectioned view of FIG. 76) extending substantially over opposing sides of the handle 713. The side portions 776 extend from opposing edges of a spine element 778 which conforms to upper portions of the handle and which is attached to the mandrel socket 761. The shield is open at the underside of the handle to allow for the preform and its handle to be driven upwardly to engage with the mandrel, and subsequently, at the end of the heating stage to be withdrawn from the shield.

To ensure the optimum heat distribution, the sides 776 of the heat shield 758 have been shaped to leave a gap 780 to allow heat penetration to region 770 as the preform is rotated during its transition through the heating stage. The size and shape of gap 780 are determined empirically in combination with the optimal arrangement of the heating elements 782 of the heating system as shown in FIG. 77.

Figure 77:
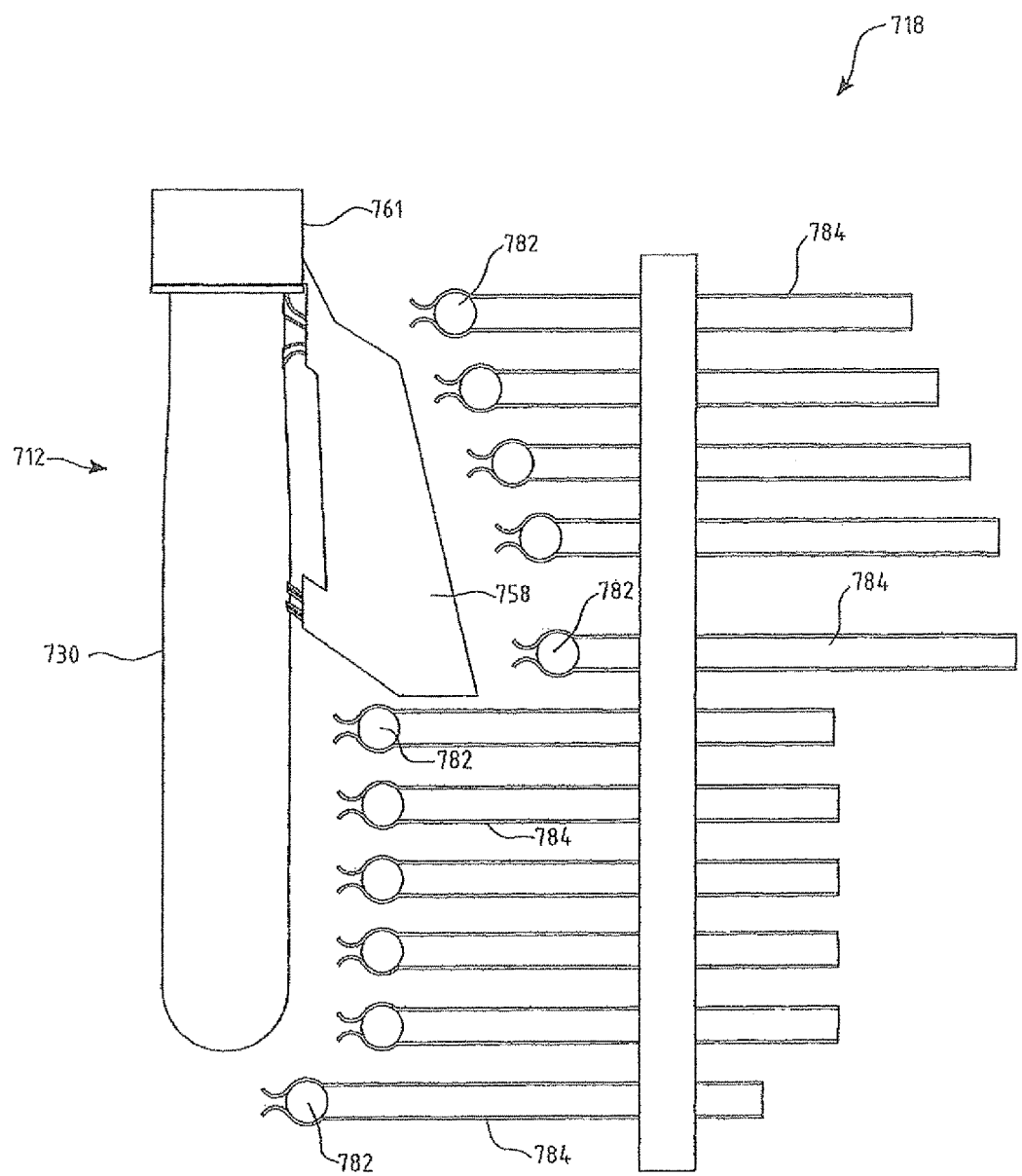
FIG. 77 is a preferred arrangement of a bank of heater elements arranged for preheating a preform according to the present invention.

With reference to FIG. 77, the heating system 718 comprises banks of heating elements 782 supported at their outer ends by adjustable racks 784 in a manner well known for preheating the preforms of conventional symmetrical containers.

In the present application however, the heating elements 782 are arranged in a pattern as shown in FIG. 77 and their individual intensity adjusted to take into account the handle and the particular energy density required to ensure that all parts of the preform are heated to the required degree of plasticity as the rotating preform 730 passes along the banks of heating elements.

In a first alternative preheating arrangement (not shown), a preform of the present invention is again attached to a supporting mandrel for passing through a heating stage. In this arrangement however, each mandrel is provided with an elongate cartridge heater, coaxial with the rotation axis of the mandrel and body portion of the preform, and extending substantially the length of the body portion of the preform. The preform is thus heated from the inside. The cartridge may be divided along its length into several individually controllable heating segments so that heating may be adjusted to suit any wall thickness variations of the preform body.

In a second alternative preheating arrangement (not shown), each preform is enclosed by two halves of a heating shroud as the preform enters the heating stage. The shroud is linked to a separate transport system which drives the shroud in synchronous movement with that of the mandrels. At the emergence of the preform from the heating stage, the shroud opens and the preform continues to transit to the blow moulding tool. The shroud can be arranged to fit relatively closely to the body of the preform, leaving the integrally attached handle substantially outside the shroud and thus protected from the preheating of the preform.

Rotation Through Heat Conditioning

To ensure even heating of the body 730, the preforms 712 must also be rotated as they pass through the heating stage 718 past the banks of heating elements 782 shown in FIGS. 72 and 77. A necessary feature of the mechanism driving this rotation is that orientation of the handle at the end of the heating stage 718 must be such as to ensure that the handle correctly enters the blow moulding tool 720. Two preferred arrangements for achieving this result are described.

First Example

Each mandrel 756 (shown in FIG. 75) includes a mounting 760 for attachment to the transport system 716. Transport system 716 may comprise a twin-strand chain conveyor supported at each end by pairs of sprockets, with the mandrels mounted at intervals between the chains. Bearings 762 within mounting 760, allow rotation of the preform 712 and its handle protecting heat shield 758.

A sprocket or toothed pulley 764 engages with a fixed rack or chain (not shown) of the transport system so as to induce rotation of the preform as it is carried past the heating stage 718. This rack or chain is arranged along the lower leg of the twin-strand conveyor, this being the leg along which the mandrels are carrying preforms through the heating stage. To maintain the orientation of the mandrels both at the preform loading and unloading stages, the mandrels are provided with a guiding surface which slidingly engages with a fixed rail, preventing rotation. The rack is of a length and number or teeth, which together with the pitch diameter of the toothed pulley 764, is designed to impart a whole number of rotations to the preforms so that the handle has the same orientation when leaving the end of the rack as it first had after insertion at the preform loading point.

Second Example

The containers of the present invention may be successfully blow moulded in suitably modified conventional blow moulding machines. Typically the rotation of the preforms through the heating stage of these machines is not adapted to ensure that preforms have any particular orientation at the point where they enter the blow moulding tool. Preforms generally are supported on a mandrel carriage travelling along a recirculating rail system with a sprocket on the carriage engaging a chain or rack as the carriage passes the heating banks, thereby inducing the rotation, of the preform. The sprocket, and hence the preform attached to the carriage mandrel, are freely rotating when not in contact with the rotation inducing system of the heating stage.

Typical also of conventional stretch blow moulding machines is that the transport rail, and the carriage and mandrel assembly pass through the blow moulding stage, the blown container only being ejected off the supporting mandrel when the container emerges from the moulding tool. The transport system moves incrementally, to allow the carriage (or carriages in the case of a multi-cavity tool) to remain stationary while in the moulding tool for the blowing cycle.

The present disclosure includes a means of controlling the orientation of the mandrels for moulding a container with integral handle of the present invention on such a conventional machine. The arrangement controls the orientation of the mandrels both at the fitting of the preforms to the mandrels prior to entry to the heating stage and at the entry into, and transit through the moulding tool.

For this purpose each of the conventional carriages of a standard stretch blow moulding machine is modified or replaced with carriages fitted with a spring-loaded locking pawl for engaging with a notch provided on a boss of the carriage sprocket. The pawl is activated into potentially engaging the notch and thus locking the sprocket, by a lever projecting from the side of the carriage contacting a fixed cam or ramp mounted adjacent the transport rail.

This activation occurs at a point on the transport rail prior to the carriage and mandrel entering the moulding tool. At that point the sprocket is no longer in contact with the rotation driving system; that is the sprocket is free to rotate. At the following incremental stop of the transport system after activation of the pawl, an electrically driven friction wheel engages the sprocket, rotating it until the notch comes into alignment with the spring-loaded pawl. The pawl engages the notch, arresting the rotation of the sprocket. The mandrel is then correctly aligned for the mandrel and handle of the preform to enter the cavity of the blow moulding tool.

When the carriage emerges from the tool, the sprocket is still locked. The blown container is ejected from the mandrel and the carriage increments to the loading station to accept a pre-oriented preform as described above. Prior to the carriage re-entering the heating stage, the lever controlling the pawl is brought into contact with a second fixed cam or ramp, which reverses the position of the lever, withdrawing the pawl from the notch to allow the machines rotation system to control the rotation of the preform through the heating stage.

Blow Moulding

In the First Example described above, the preforms are ejected from the heating stage transport system mandrels onto a transfer system (not shown), which carries each preform into the blow moulding tool, retaining the orientation of the handle. In this arrangement the handle is nested in a separate cavity of the mould such as for example illustrated in FIG. 16. The same transfer system, which may comprise a two-strand conveyor for example, also transfers the blown container (or containers) out of the moulding tool.

In the Second Example described above, in which the mandrels of a conventional but modified blow moulding machine, transit through the moulding tool with the preform, it is necessary to accommodate the heat shield in the mould tool. The heat shield shown in the example of FIGS. 75 and 76, is fixed relative to the mandrel and so the cavity for the handle must be sized to also accommodate the heat shield in its position covering the handle.

It is necessary however, that the upper and lower attachment points 772 and 774 of the handle 713 be closely confined in the moulding tool to prevent their movement during the stretching and blowing operation. The gaps between the body 730 and the heat shield 758 at the attachment points 772 and 774 are sufficient to shield these portions of the handle from excessive heat but still allow suitable structures in the moulding tool to engage and restrain the handle attachment points as the tool closes. A more preferable arrangement includes a mechanism (not shown) to lower the preform relative to the heat shield by an amount sufficient to expose the upper attachment point 772 of the handle through the larger gap 780 in the sides 776 of the shield 758. With the lower attachment point 774 then located below the lower edge of the shield, this arrangement allows a better access of the restraining structures to confine the handle.

In an alternative arrangement (see for example FIG. 58), the heat shield is not rigidly attached to the mandrel socket 761 but is hinged to it. In this arrangement a mechanism incorporated in the moulding tool rotates the heat shield away from the handle as the tool closes so that the handle is closely nested by the tool. The heat shield is then accommodated in its own cavity, separated from that of both the handle and the final body shape of the container.

It should be noted that although the region of the preform body defined by a narrow strip between the two attachment points 772 and 774 of handle 713 remains substantially stable during the stretching and blowing of the container, both the regions of the outer and inner surface layers laterally away from this narrow strip are subjected to biaxial stretching. Although the outer surface of the narrow strip remains substantially stable, the wall of the strip and the inner layers between the handle attachment points undergoes a degree of flow and thinning together with the surrounding regions as the plasticised material comes under the influence of the stretching and blowing forces.

It is important that those portions of the preform which are to be subjected to biaxial stretching and blowing, that is all of the body 730 below the neck or locating ring 728, do not come into contact with the walls of the moulding cavity until forced to do so when the process of biaxial orientation of the material of the preform is substantially complete. For this reason the region between the two connection points 772 and 774 of the handle is not initially in contact with the wall of the cavity when the tool has closed on the preform. Rather there is provision of a slight gap between the outer surface of the preform body and wall of the cavity to ensure that no premature crystallization occurs (for example in a cooled tool) and that a degree of material flow and biaxial orientation, particularly of the inner layers of the region between the connection points does occur.

The above describes only some embodiments of the present invention and modifications obvious to those skilled in the art can be made thereto without departing from the scope and spirit of the present invention.

INDUSTRIAL APPLICABILITY

Embodiments of the invention are applicable to the manufacture of containers made from orientable plastics material and incorporating a handle or like grasping fixture as an integral component of the container.

The invention claimed is:

1. An apparatus for controlling exposure to heat of an integrally formed handle of a preform during a preheating stage of a stretch blow moulding process; said apparatus including a mandrel provided with a shield for protecting said handle from excessive heat during said preheating stage.

2. The apparatus of claim 1 wherein said mandrel is one of a plurality of mandrels attached to a twin-strand conveyor system; each said mandrel rotatably mounted between strands of said twin-strand conveyor.

3. The apparatus of claim 1 wherein said preform is inserted into said mandrel at a preform loading location such that said handle is located within said shield.

4. The apparatus of claim 2 wherein said conveyor system extends between said preform loading location and a preform unloading location.

5. The apparatus of claim 1 wherein said heat shield is for the protection of said integrally formed handle of a preform; said heat shield protecting said handle from excessive heat as a body portion of said preform is pre-heated prior to entry into a stretch blow moulding tool.

6. The apparatus of claim 5 wherein said heat shield is attached to a mandrel of a preform transportation system; said heat shield adapted to at least partially enclose said handle.

7. The apparatus of claim 5 wherein said shield comprises side portions extending substantially over opposing sides of said handle; said side portions extending from opposing edges of a spine element attached to said mandrel; said spine element conforming to upper portions of said handle.

* * * * *